(12) United States Patent
Nakata et al.

(10) Patent No.: US 12,152,541 B2
(45) Date of Patent: Nov. 26, 2024

(54) METHOD FOR CREATING MAXIMUM OUTPUT IN GAS TURBINE, METHOD FOR CREATING OUTPUT FOR CONTROLLING GAS TURBINE, METHOD FOR CONTROLLING GAS TURBINE, DEVICE FOR EXECUTING SAID METHODS, AND PROGRAM FOR CAUSING COMPUTER TO EXECUTE SAID METHODS

(71) Applicant: MITSUBISHI HEAVY INDUSTRIES, LTD., Tokyo (JP)

(72) Inventors: Naoki Nakata, Yokohama (JP); Hidehiko Nishimura, Yokohama (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 78 days.

(21) Appl. No.: 18/033,700

(22) PCT Filed: Jul. 26, 2021

(86) PCT No.: PCT/JP2021/027545
§ 371 (c)(1),
(2) Date: Apr. 25, 2023

(87) PCT Pub. No.: WO2022/091505
PCT Pub. Date: May 5, 2022

(65) Prior Publication Data
US 2023/0417154 A1 Dec. 28, 2023

(30) Foreign Application Priority Data
Oct. 30, 2020 (JP) .................. 2020-182923

(51) Int. Cl.
*F02C 9/28* (2006.01)
*F02C 9/54* (2006.01)

(52) U.S. Cl.
CPC ................. *F02C 9/28* (2013.01); *F02C 9/54* (2013.01); *F05D 2270/05* (2013.01);
(Continued)

(58) Field of Classification Search
CPC ..................................... F02C 9/28; F02C 9/54
See application file for complete search history.

(56) References Cited

U.S. PATENT DOCUMENTS

2011/0160979 A1   6/2011   Muller

FOREIGN PATENT DOCUMENTS

| CN | 101779021 | * | 7/2010 | ................ F02C 9/54 |
| JP | 2009-19528 |   | 1/2009 | |
| JP | 2011-525590 |   | 9/2011 | |

OTHER PUBLICATIONS

JP 2009019528 translation (Year: 2024).*
(Continued)

*Primary Examiner* — Ted Kim
(74) *Attorney, Agent, or Firm* — Wenderoth, Lind & Ponack, L.L.P.

(57) ABSTRACT

A maximum output creator is provided with: a temperature reception unit that receives an intake temperature, which is the temperature of air taken in by a compressor of a gas turbine; a change reception unit that receives the details of a change to a maximum opening degree in an intake quantity adjuster of the compressor; a basic maximum output computation unit that determines a basic maximum output of the gas turbine on the basis of the intake temperature received by the temperature reception unit; a coefficient creation unit that creates a maximum output correction coefficient for correcting the basic maximum output on the basis of the details of the change to the maximum opening degree received by the change reception unit and the intake temperature received by the temperature reception unit; and a (Continued)

maximum output correction unit that corrects the basic maximum output using the maximum output correction coefficient.

27 Claims, 24 Drawing Sheets

(52) U.S. Cl.
 CPC .. *F05D 2270/053* (2013.01); *F05D 2270/303* (2013.01); *F05D 2270/313* (2013.01)

(56) References Cited

OTHER PUBLICATIONS

International Search Report issued Sep. 7, 2021 in International (PCT) Application No. PCT/JP2021/027545, with English translation.
International Written Opinion issued Sep. 7, 2021 in International (PCT) Application No. PCT/JP2021/027545, with English translation.

\* cited by examiner

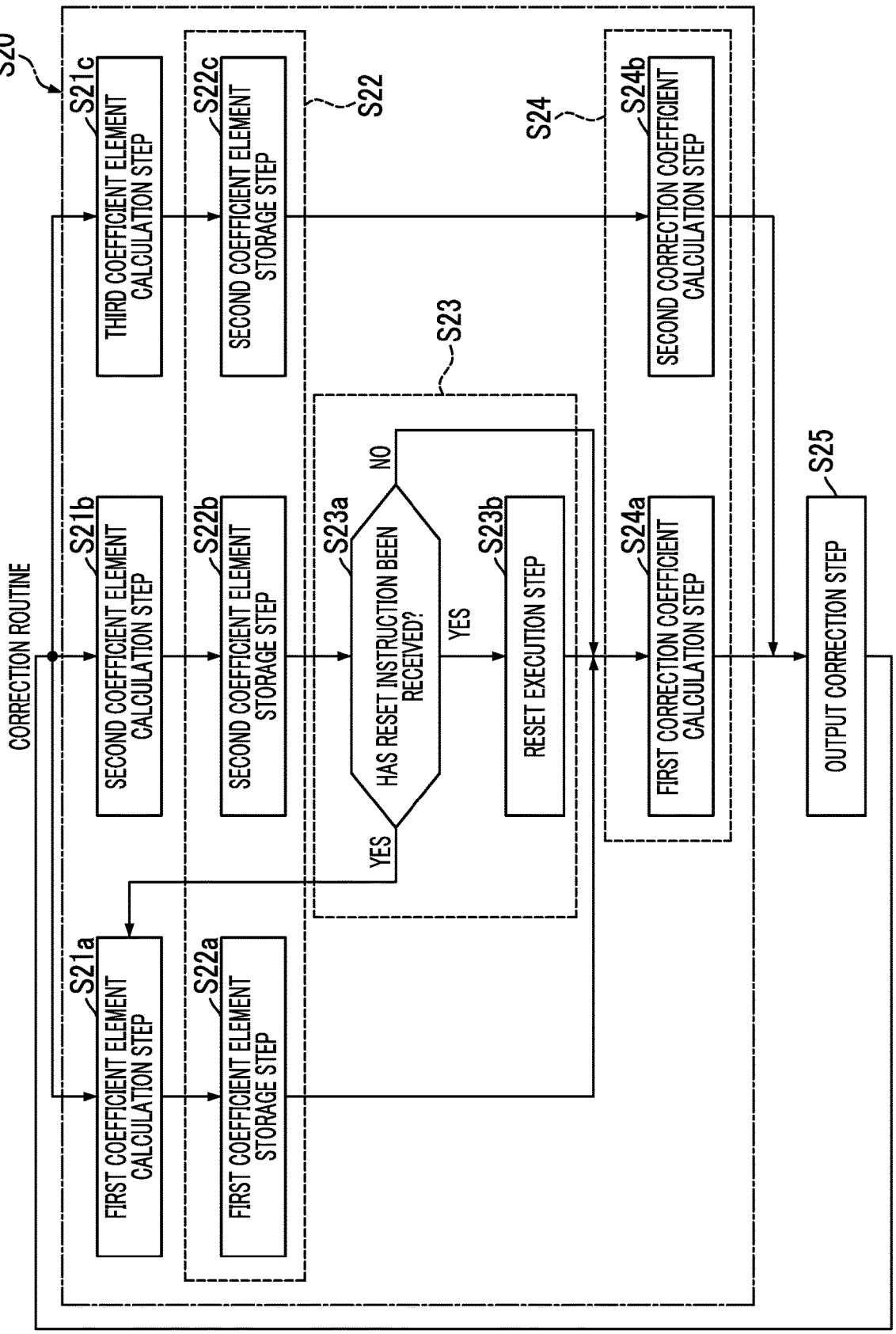

FIG. 25

| | REFERENCE TIME (PLANNING TIME) | DURING CONSTRUCTION TRIAL OPERATION | DURING FIRST MAIN OPERATION | DURING SECOND MAIN OPERATION | DURING PERIODIC INSPECTION | DURING TRIAL OPERATION | DURING FIRST MAIN OPERATION | DURING SECOND MAIN OPERATION |
|---|---|---|---|---|---|---|---|---|
| OUTPUT | 100 | 90 | 80 | 70 | — | 80 | 70 | 65 |
| e3 | — | 90/100 | 90/100 | 90/100 | — | 90/100 | 90/100 | 90/100 |
| e1 | — | 90/100 | 90/100 | 80/100 | — | 80/100 | 80/100 | 70/100 |
| e2 | — | 1 | 80/90 | 70/80 | — | 1 | 70/80 | 65/70 |
| 1500°CMW | — | 100 | 100 | 100 | — | 100 | 100 | 100 |
| K1 | — | 9/10×1 | 9/10× 8/9 | 8/10× 7/8 | — | 8/10×1 | 8/10× 7/8 | 7/10× 65/70 |
| | | | | | | | | |
| | | 90= 100×0.9 | 80= 100×0.8 | 70= 100×0.7 | — | 80= 100×0.8 | 70= 100×0.7 | 65= 100×0.65 |
| PW | — | 90 | 80 | 70 | — | 70 | 70 | 65 |
| K2 | — | 9/10×1 ÷9/10 | 9/10× 8/9÷ 9/10 | 8/10× 7/8÷ 9/10 | — | 8/10× 1÷ 9/10 | 8/10× 7/8÷ 9/10 | 7/10× 65/70÷ 9/10 |
| PWm | — | 90= 90÷1.0 | 90= 80÷0.89 | 90= 70÷0.78 | — | 79= 70÷0.89 | 90= 80÷0.78 | 90= 65÷0.72 |
| | ⋮ | ⋮ | ⋮ | ⋮ | ⋮ | ⋮ | ⋮ | ⋮ |

METHOD FOR CREATING MAXIMUM OUTPUT IN GAS TURBINE, METHOD FOR CREATING OUTPUT FOR CONTROLLING GAS TURBINE, METHOD FOR CONTROLLING GAS TURBINE, DEVICE FOR EXECUTING SAID METHODS, AND PROGRAM FOR CAUSING COMPUTER TO EXECUTE SAID METHODS

TECHNICAL FIELD

The present disclosure relates to a maximum output creation method for a gas turbine, a control output creation method for a gas turbine, a control method for a gas turbine, a device that executes the methods, and a program that causes a computer to execute the methods.

Priority is claimed on Japanese Patent Application No. 2020-182923, filed Oct. 30, 2020, the content of which is incorporated herein by reference.

BACKGROUND ART

A gas turbine includes a compressor that compresses air; a combustor that combusts fuel in the air compressed by the compressor, to generate combustion gas; and a turbine to be driven by the combustion gas. The compressor includes a compressor rotor; a compressor casing that covers the compressor rotor; and an intake air amount regulator (hereinafter, referred to as an inlet guide vane (IGV)). The IGV is provided at a suction port of the compressor casing, and regulates a flow rate of air to be sucked into the compressor casing. A rotor of a generator is connected to the compressor rotor.

The following PTL 1 discloses a technique of determining an IGV opening degree according to a temperature of air suctioned by the compressor and to a gas turbine output (=generator output). The IGV opening degree is limited not to exceed an IGV maximum opening degree for control determined in advance.

CITATION LIST

Patent Literature

[PTL 1] Japanese Unexamined Patent Application Publication No. 2009-019528

SUMMARY OF INVENTION

Technical Problem

At an installation site of the gas turbine, changing the setting of the IGV maximum opening degree for control depending on the result of a trial operation or the like may be desirable. In addition, when a region with a large summer/winter temperature difference is an installation site of the gas turbine, a change between the setting of the IGV maximum opening degree in the cold season and the setting of the IGV maximum opening degree in the warm season may be desirable.

When the setting of the IGV maximum opening degree changes, the flow rate of gas passing through the turbine, the flow rate of the fuel supplied to the combustor, and the like change. For this reason, even if the setting of the IGV maximum opening degree is changed, the setting of a maximum output for control of the gas turbine may not be changed, the temperature of the combustion gas at a gas inlet of the turbine may be higher than an upper limit value, or the temperature of the combustion gas may be much lower than the upper limit value. Therefore, when the setting of the IGV maximum opening degree is simply changed, a control failure of the gas turbine occurs, thereby causing a decrease in the life span of the gas turbine or a decrease in the output, which is a problem.

Therefore, an object of the present disclosure is to provide a technique of being able to suppress a control failure of a gas turbine even when the setting of an IGV maximum opening degree is changed.

Solution to Problem

According to one aspect to achieve the foregoing object, there is provided a maximum output creator for a gas turbine which includes a compressor that compresses air to generate compressed air, a combustor that combusts fuel in the compressed air to generate combustion gas, and a turbine to be driven by the combustion gas, and in which the compressor includes an intake air amount regulator that regulates a flow rate of the air suctioned by the compressor, the creator including: a temperature reception unit that receives an intake air temperature which is a temperature of the air suctioned by the compressor; a change reception unit that receives a change content of a maximum opening degree of the intake air amount regulator; a basic maximum output computation unit that obtains a basic maximum output of the gas turbine based on the intake air temperature received by the temperature reception unit; a coefficient creation unit that creates a maximum output correction coefficient for correcting the basic maximum output based on the change content of the maximum opening degree received by the change reception unit and on the intake air temperature received by the temperature reception unit; and a maximum output correction unit that corrects the basic maximum output using the maximum output correction coefficient, and that outputs the corrected basic maximum output as a maximum output for control.

In this aspect, the change content of the maximum opening degree of the intake air amount regulator can be received. Further, in this aspect, the maximum output for control of the gas turbine is corrected based on the change content and the intake air temperature. For this reason, in this aspect, even when the setting of the maximum opening degree for control is changed, it is possible to suppress a control failure of the gas turbine without causing a decrease in the life span of the gas turbine or a decrease in the output.

According to one aspect to achieve the foregoing object, there is provided a control output creator for a gas turbine, the creator including: the maximum output creator for the gas turbine according to the one aspect; and an output corrector that corrects a control output of the gas turbine. The output corrector includes a correction coefficient creation unit that creates a correction coefficient to be used when the control output is corrected, an output correction unit that corrects the control output using the correction coefficient, and that outputs the corrected control output as a correction control output, an output reception unit that receives at least an output from an output meter that detects an output of the gas turbine, and an output storage unit that stores the output received by the output reception unit. The correction coefficient creation unit includes a first coefficient element calculation unit that calculates a first coefficient element, a second coefficient element calculation unit that calculates a second coefficient element, and a correction coefficient calculation unit that calculates the correction coefficient using the first coefficient element and the second coefficient element. The output storage unit stores a reference output that is an output under a condition where the gas turbine outputs a maximum output at a reference time in the past, and an immediately preceding output that the output reception unit receives under a condition where the gas turbine outputs a maximum output in an immediately preceding time period closer to a current time than to the reference time. The first coefficient element is a ratio of the immediately preceding output stored in the output storage unit to the reference output stored in the output storage unit. The second coefficient element is a ratio of a current output that the output reception unit receives under a condition where the gas turbine outputs a maximum output in a current time period between the immediately preceding time period and the current time, to the immediately preceding output stored in the output storage unit. The output corrector corrects the maximum output for control output from the maximum output creator, as one control output.

In this aspect, the correction coefficient is obtained using the first coefficient element and the second coefficient element. The correction coefficient is a value indicating the degree of degradation of the output caused by a degradation in performance of the gas turbine. In addition, the first coefficient element and the second coefficient element are also values indicating the degrees of degradation of the output caused by a degradation in performance of the gas turbine. However, the first coefficient element and the second coefficient element indicate the degrees of degradation of the output in different time periods. Specifically, the first coefficient element indicates a degradation in output between the reference time and the immediately preceding time period, and the second coefficient element indicates a degradation in output from the immediately preceding time period to the current time period. As described above, in this aspect, the correction coefficient is obtained using a plurality of the coefficient elements that are different from each other, and the control output is corrected with the correction coefficient.

Therefore, in this aspect, it is possible to obtain the correction control output that appropriately reflects the degree of degradation of the output.

According to one aspect to achieve the foregoing object, there is provided a control device for a gas turbine, the device including: the maximum output creator for the gas turbine according to the one aspect; a command value creation unit that creates a command value for a control target of the gas turbine using the maximum output for control output from the maximum output creator; and a control signal output unit that outputs a control signal indicating the command value to the control target.

As described above, the maximum output creator of this aspect receives a change content of the maximum opening degree of the intake air amount regulator, and corrects the maximum output for control of the gas turbine based on the change content and the intake air temperature. In this aspect, a command value for a control target is created using the maximum output for control corresponding to the change content of the maximum opening degree of the intake air amount regulator, and a control signal indicating the command value is output to the control target. For this reason, in this aspect, even when the setting of the maximum opening degree for control is changed, it is possible to suppress a control failure of the control target.

According to another aspect to achieve the foregoing object, there is provided a control device for a gas turbine, the device including: the control output creator for the gas turbine according to the one aspect; a command value creation unit that creates a command value for a control target of the gas turbine using the correction control output output from the control output creator; and a control signal output unit that outputs a control signal indicating the command value to the control target.

As described above, the maximum output creator of the control output creator of this aspect receives a change content of the maximum opening degree of the intake air amount regulator, and corrects the maximum output for control of the gas turbine based on the change content and the intake air temperature. In addition, as described above, the output corrector of the control output creator can obtain the maximum output as the correction control output that appropriately reflects the degree of degradation of the output. In this aspect, a command value for a control target is created using the correction control output, and a control signal indicating the command value is output to the control target. For this reason, in this aspect, even when the setting of the maximum opening degree for control is changed, it is possible to suppress a control failure of the control target caused by this change, and a control failure of the control target caused by a degradation in performance of the gas turbine.

According to one aspect to achieve the foregoing object, there is provided a maximum output creation method for a gas turbine which includes a compressor that compresses air to generate compressed air, a combustor that combusts fuel in the compressed air to generate combustion gas, and a turbine to be driven by the combustion gas, and in which the compressor includes an intake air amount regulator that regulates a flow rate of the air suctioned by the compressor.

The maximum output creation method includes: executing a temperature reception step of receiving an intake air temperature which is a temperature of the air suctioned by the compressor; executing a change reception step of receiving a change content of a maximum opening degree of the intake air amount regulator; executing a basic maximum output computation step of obtaining a basic maximum output of the gas turbine based on the intake air temperature received in the temperature reception step; executing a coefficient creation step of creating a maximum output correction coefficient for correcting the basic maximum output based on the change content of the maximum opening degree received in the change reception step and on the intake air temperature received in the temperature reception step; and executing a maximum output correction step of correcting the basic maximum output using the maximum output correction coefficient, and outputting the corrected basic maximum output as a maximum output for control.

According to one aspect to achieve the foregoing object, there is provided a control output creation method for a gas turbine, the method including: executing the maximum output creation method for the gas turbine according to the one aspect; and executing an output correction method for correcting a control output of the gas turbine. The output correction method includes executing a correction coefficient creation step of creating a correction coefficient to be used when the control output of the gas turbine is corrected, executing an output correction step of correcting the control output using the correction coefficient, and outputting the corrected control output as a correction control output, executing an output reception step of receiving at least an output from an output meter that detects an output of the gas turbine, and executing an output storage step of storing the output received in the output reception step. The correction coefficient creation step includes a first coefficient element calculation step of calculating a first coefficient element, a second coefficient element calculation step of calculating a second coefficient element, and a correction coefficient calculation step of calculating the correction coefficient using the first coefficient element and the second coefficient element. In the output storage step, a reference output that is an output under a condition where the gas turbine outputs a maximum output at a reference time in the past, and an immediately preceding output received in the output reception step under a condition where the gas turbine outputs a maximum output in an immediately preceding time period closer to a current time than to the reference time are stored. The first coefficient element is a ratio of the immediately preceding output stored in the output storage step to the reference output stored in the output storage step. The second coefficient element is a ratio of a current output received in the output reception step under a condition where the gas turbine outputs a maximum output in a current time period between the immediately preceding time period and the current time, to the immediately preceding output stored in the output storage step.

According to one aspect to achieve the foregoing object, there is provided a control method for a gas turbine, the method including: executing the maximum output creation method for the gas turbine according to the one aspect; executing a command value creation step of creating a command value for a control target of the gas turbine using the maximum output for control obtained by the maximum output creation method; and executing a control signal output step of outputting a control signal indicating the command value to the control target.

According to one aspect to achieve the foregoing object, there is provided a control method for a gas turbine, the method including: executing the control output creation method for the gas turbine according to the one aspect; executing a command value creation step of creating a command value for a control target of the gas turbine using the correction control output obtained by the control output creation method; and executing a control signal output step of outputting a control signal indicating the command value to the control target.

According to one aspect to achieve the foregoing object, there is provided a maximum output creation program for a gas turbine which includes a compressor that compresses air to generate compressed air, a combustor that combusts fuel in the compressed air to generate combustion gas, and a turbine to be driven by the combustion gas, and in which the compressor includes an intake air amount regulator that regulates a flow rate of the air suctioned by the compressor.

The maximum output creation program causes a computer to execute: a temperature reception step of receiving an intake air temperature which is a temperature of the air suctioned by the compressor; a change reception step of receiving a change content of a maximum opening degree of the intake air amount regulator; a basic maximum output computation step of obtaining a basic maximum output of the gas turbine based on the intake air temperature received in the temperature reception step; a coefficient creation step of creating a maximum output correction coefficient for correcting the basic maximum output based on the change content of the maximum opening degree received in the change reception step and on the intake air temperature received in the temperature reception step; and a maximum output correction step of correcting the basic maximum output using the maximum output correction coefficient, and outputting the corrected basic maximum output as a maximum output for control.

According to one aspect to achieve the foregoing object, there is provided a control output creation program for a gas turbine, the program including: the maximum output creation program for the gas turbine according to the one aspect; and an output correction program for correcting a control output of the gas turbine. The output correction program causes the computer to execute a correction coefficient creation step of creating a correction coefficient to be used when the control output of the gas turbine is corrected, an output correction step of correcting the control output using the correction coefficient, and outputting the corrected control output as a correction control output, an output reception step of receiving at least an output from an output meter that detects an output of the gas turbine, and an output storage step of storing the output received in the output reception step. The correction coefficient creation step includes a first coefficient element calculation step of calculating a first coefficient element, a second coefficient element calculation step of calculating a second coefficient element, and a correction coefficient calculation step of calculating the correction coefficient using the first coefficient element and the second coefficient element. In the output storage step, a reference output that is an output under a condition where the gas turbine outputs a maximum output at a reference time in the past, and an immediately preceding output received in the output reception step under a condition where the gas turbine outputs a maximum output in an immediately preceding time period closer to a current time than to the reference time are stored. The first coefficient element is a ratio of the immediately preceding output stored in the output storage step to the reference output stored in the output storage step. The second coefficient element is a ratio of a current output received in the output reception step under a condition where the gas turbine outputs a maximum output in a current time period between the immediately preceding time period and the current time, to the immediately preceding output stored in the output storage step.

According to one aspect to achieve the foregoing object, there is provided a control program for a gas turbine, which includes the maximum output creation program for the gas turbine according to the one aspect, the program causing the computer to execute a command value creation step of creating a command value for a control target of the gas turbine using the maximum output for control obtained by executing the maximum output creation program; and a control signal output step of outputting a control signal indicating the command value to the control target.

According to one aspect to achieve the foregoing object, there is provided a control program for a gas turbine, which includes the control output creation program for the gas turbine according to the one aspect, the program causing the computer to execute: a command value creation step of creating a command value for a control target of the gas turbine using the correction control output obtained by executing the control output creation program; and a control signal output step of outputting a control signal indicating the command value to the control target.

Advantageous Effects of Invention

In one aspect of the present disclosure, a change content of the maximum opening degree of the intake air amount regulator can be received. Further, in this aspect, even when the setting of the maximum opening degree is changed, it is possible to suppress a control failure of the gas turbine.

BRIEF DESCRIPTION OF DRAWINGS

FIG. 24 is a flowchart showing a correction routine executed by the output corrector according to one embodiment of the present disclosure.

FIG. 25 is a description table showing changes in each coefficient element, each correction coefficient, and each correction control output over time according to one embodiment of the present disclosure.

DESCRIPTION OF EMBODIMENTS

Hereinafter, one embodiment of a maximum output creator, a control output creator including the maximum output creator, a control device including the control output creator, and gas turbine equipment including the control device according to the present invention will be described with reference to the drawings.

Figure 1:
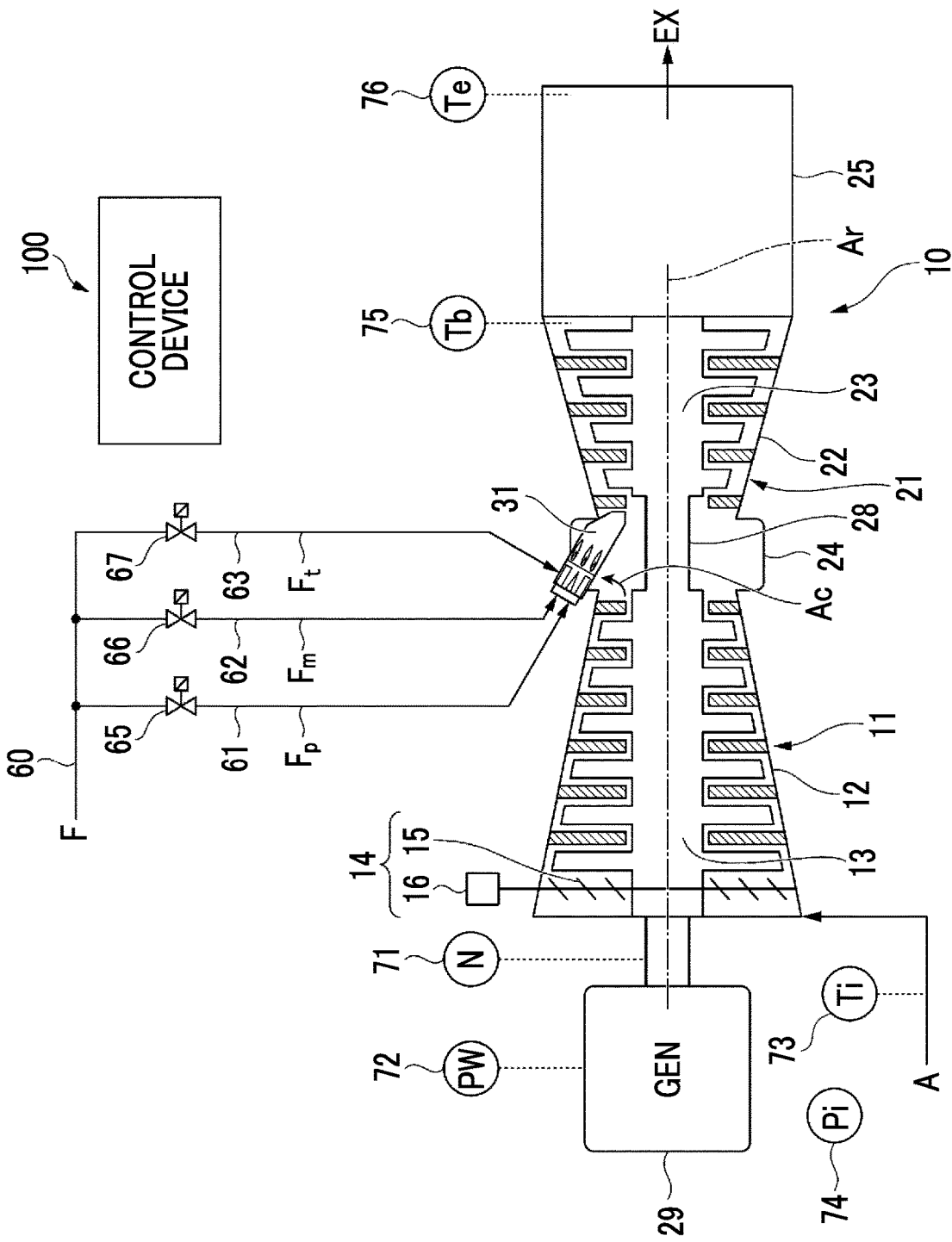
FIG. 1 is a schematic configuration view of gas turbine equipment according to one embodiment of the present disclosure.

As shown in FIG. 1, the gas turbine equipment of the present embodiment includes a gas turbine 10; a generator 29 that generates electricity through driving of the gas turbine 10; and a control device 100 that controls control targets in the gas turbine 10.

The gas turbine 10 includes a compressor 11 that compresses air A; a combustor 31 that combusts fuel F in the air compressed by the compressor 11, to generate combustion gas; and a turbine 21 to be driven by the combustion gas of high temperature and high pressure.

The compressor 11 includes a compressor rotor 13 that rotates about an axis Ar; a compressor casing 12 that rotatably covers the compressor rotor 13; and an intake air amount regulator (hereinafter, referred to as an inlet guide vane (IGV)) 14 provided at a suction port of the compressor casing 12. The IGV 14 includes a plurality of guide vanes 15 and a driver 16 that drives the plurality of guide vanes 15. The IGV 14 regulates the flow rate of air to be sucked into the compressor casing 12.

The turbine 21 includes a turbine rotor 23 that is rotated about the axis Ar by the combustion gas from the combustor 31, and a turbine casing 22 that rotatably covers the turbine rotor 23. The turbine rotor 23 and the compressor rotor 13 are connected to each other so as to be rotatable about the same axis Ar, to form a gas turbine rotor 28. A rotor of the generator 29 is connected to the gas turbine rotor 28.

The gas turbine 10 further includes an intermediate casing 24 and an exhaust casing 25. The intermediate casing 24 is disposed between the compressor casing 12 and the turbine casing 22 in a direction in which the axis Ar extends, and connects the compressor casing 12 and the turbine casing 22. Compressed air Ac discharged from the compressor 11 flows into the intermediate casing 24. The exhaust casing 25 is disposed opposite a side on which the intermediate casing 24 is disposed, with respect to the turbine casing 22. Exhaust gas that is the combustion gas exhausted from the turbine 21 flows inside the exhaust casing 25.

Figure 2:
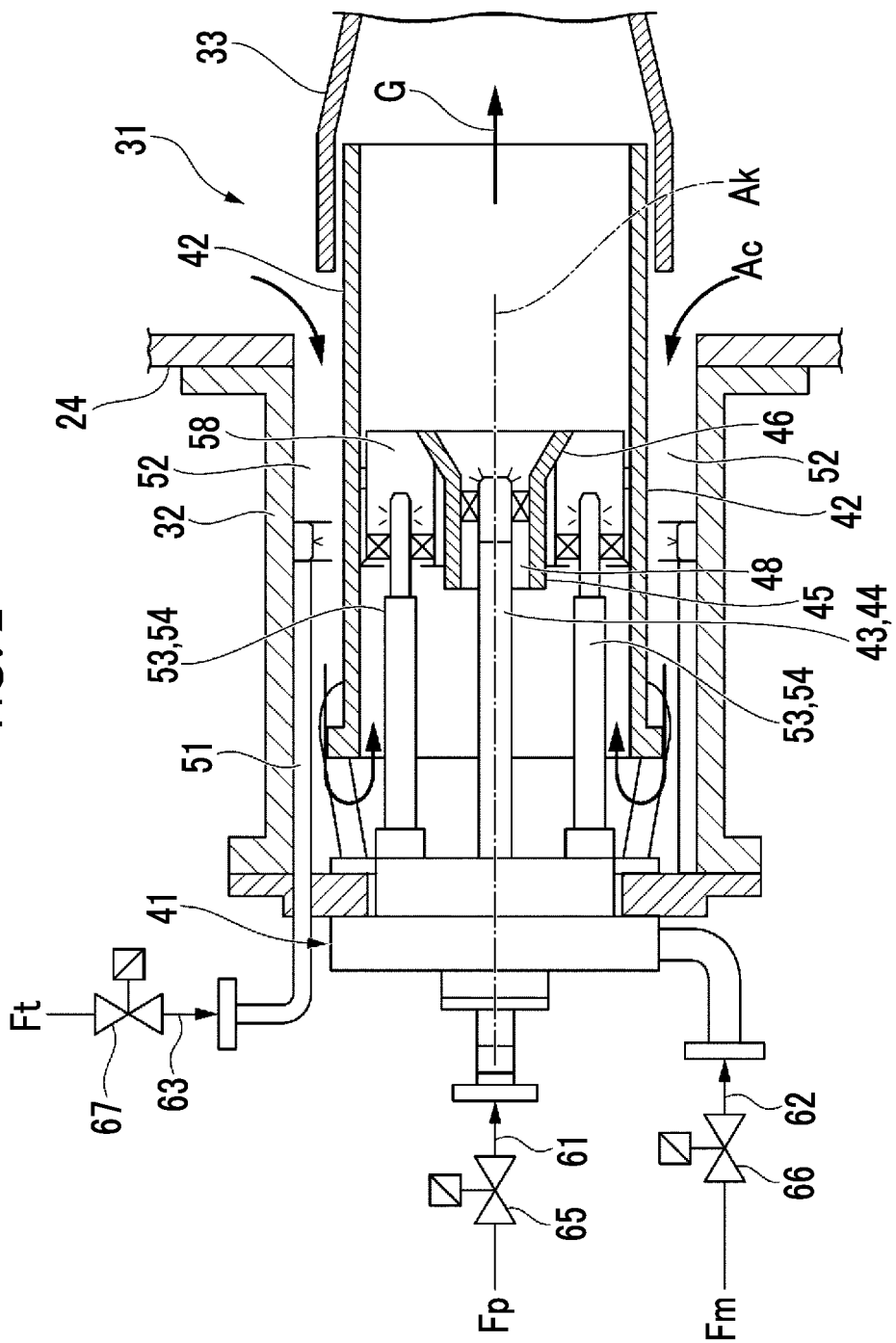
FIG. 2 is a cross-sectional view of a combustor according to one embodiment of the present disclosure.

The combustor 31 is fixed to the intermediate casing 24. As shown in FIG. 2, the combustor 31 includes an outer cylinder 32 fixed to the intermediate casing 24; a combustion cylinder (or a transition piece) 33 that is disposed inside the intermediate casing 24, and that delivers the combustion gas into a combustion gas flow path of the turbine 21; and a fuel nozzle 41 that sprays fuel and air into the combustion cylinder 33.

Figure 3:
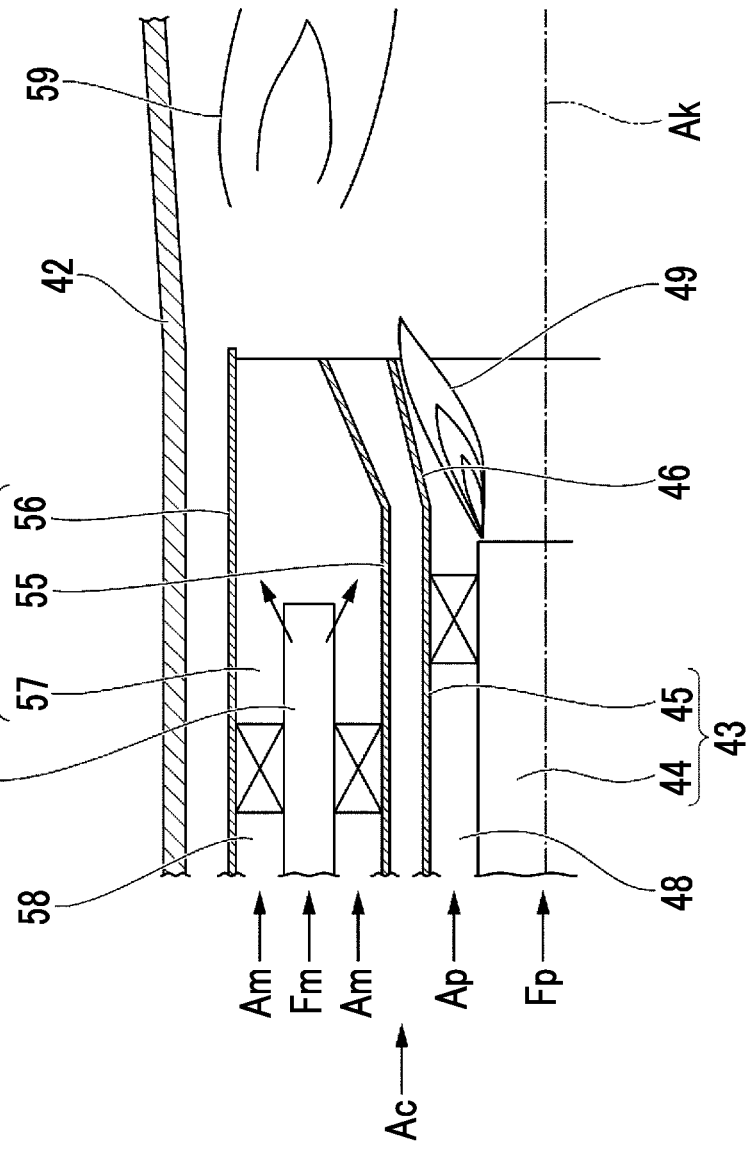
FIG. 3 is a cross-sectional view of main parts of the combustor according to one embodiment of the present disclosure.

As shown in FIGS. 2 and 3, the fuel nozzle 41 includes an inner cylinder 42; a pilot burner 43 disposed on a central axis Ak of the inner cylinder 42; a plurality of main burners 53 disposed around the pilot burner 43 at regular intervals in a circumferential direction; and a top hat nozzle 51 disposed on an inner peripheral side of the outer cylinder 32 and on an outer peripheral side of the inner cylinder 42. In the following description, a side to which combustion gas G flows inside the combustion cylinder 33 in a direction in which the central axis Ak of the inner cylinder 42 extends is referred to as a downstream side, and an opposite side is referred to as an upstream side.

The pilot burner 43 includes a pilot nozzle 44 disposed on the central axis Ak of the inner cylinder 42, and a pilot air cylinder 45 having a tubular shape and surrounding an outer periphery of the pilot nozzle 44. A downstream side of the pilot air cylinder 45 forms a pilot cone 46 that is gradually increased in diameter toward the downstream side. An inner peripheral side of the pilot air cylinder 45 forms a pilot air flow path 48 through which the compressed air Ac from the compressor 11 flows as pilot air Ap. Pilot fuel Fp sprayed from the pilot nozzle 44 is combusted in the pilot air Ap sprayed from the pilot air flow path 48 (diffusion combustion), to form a diffusion flame 49.

The main burner 53 includes a main air inner cylinder 55 having a tubular shape and surrounding an outer periphery of the pilot air cylinder 45; a main air outer cylinder 56 having a tubular shape and surrounding an outer periphery of the main air inner cylinder 55; partition plates 57 that divide an annular space between an outer peripheral side of the main air inner cylinder 55 and an inner peripheral side of the main air outer cylinder 56 into a plurality of spaces in the circumferential direction; and main nozzles 54 disposed between a plurality of the partition plates 57. The plurality of spaces defined by the main air inner cylinder 55, the main air outer cylinder 56, and the plurality of partition plates 57 form a main air flow path 58 through which the compressed air Ac from the compressor 11 flows as main air Am. Main fuel Fm is sprayed to the main air Am flowing through the main air flow path 58, from the main nozzles 54 disposed in the main air flow path 58. For this reason, a premixed gas in which the main air Am and the main fuel Fm are mixed flows on a downstream side of tips (downstream ends) of the main nozzles 54 in the main air flow path 58. When the premixed gas flows out from the main air flow path 58, the premixed gas is combusted (premixed combustion) to form a premixed flame 59. The above-described diffusion flame 49 plays a role of holding the premixed flame 59.

A space between the inner peripheral side of the outer cylinder 32 and the outer peripheral side of the inner cylinder 42 forms a compressed air flow path 52 that guides the compressed air Ac from the compressor 11 into the inner cylinder 42. The top hat nozzle 51 sprays top hat fuel Ft into the compressed air flow path 52. For this reason, when the top hat fuel Ft is sprayed into the compressed air flow path 52, the top hat fuel Ft is mixed in the main air Am and the pilot air Ap.

As shown in FIGS. 1 and 2, the gas turbine equipment of the present embodiment further includes a pilot fuel line 61 that delivers the pilot fuel Fp to the pilot nozzle 44; a main fuel line 62 that delivers the main fuel Fm to the main nozzles 54; a top hat fuel line 63 that delivers the top hat fuel Ft to the top hat nozzle 51; a pilot fuel valve 65 that regulates the flow rate of the pilot fuel Fp; a main fuel valve 66 that regulates the flow rate of the main fuel Fm; and a top hat fuel valve 67 that regulates the flow rate of the top hat fuel Ft.

All the pilot fuel line 61, the main fuel line 62, and the top hat fuel line 63 are lines branched from a fuel line 60. The pilot fuel valve 65 is provided in the pilot fuel line 61, the main fuel valve 66 is provided in the main fuel line 62, and the top hat fuel valve 67 is provided in the top hat fuel line 63.

The control targets of the gas turbine 10 in the present embodiment are the pilot fuel valve 65, the main fuel valve 66, the top hat fuel valve 67, and the IGV 14.

As shown in FIG. 1, the gas turbine equipment of the present embodiment further includes a rotation speed meter 71 that detects a rotation speed N of the gas turbine rotor 28; an output meter 72 that detects an output PW of the generator 29; an intake air temperature sensor 73 that detects an intake air temperature Ti which is a temperature of air A to be suctioned by the compressor 11; an intake air pressure gauge 74 that detects an intake air pressure (atmospheric pressure) Pi that is a pressure of the air to be suctioned by the compressor 11; a blade path temperature sensor 75 that detects a blade path temperature Tb which is a temperature of the combustion gas immediately after a final stage of the turbine 21; and an exhaust gas temperature sensor 76 that detects an exhaust gas temperature Te inside the exhaust casing 25 on a downstream side of the final stage of the turbine 21.

Figure 4:
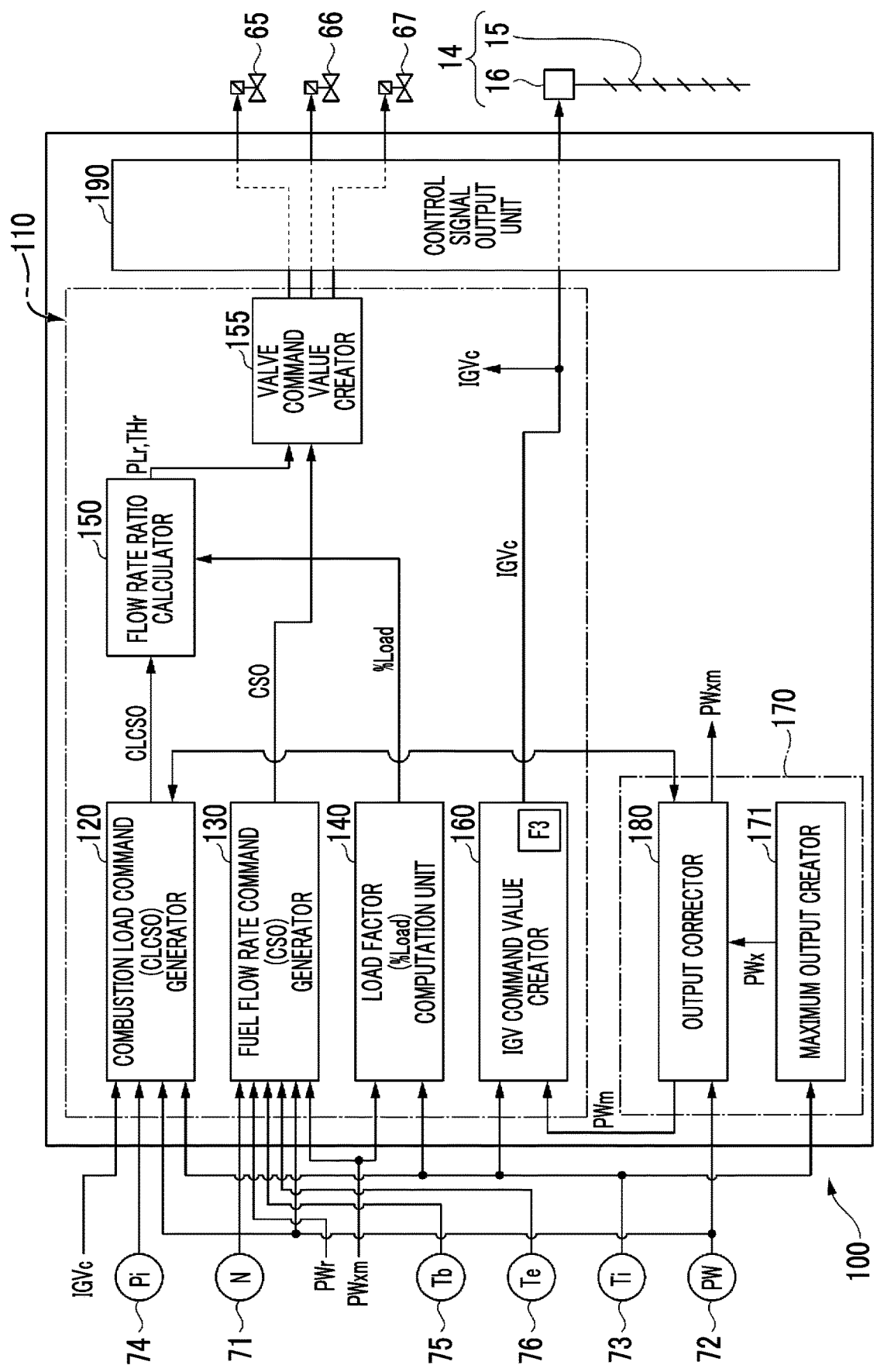
FIG. 4 is a functional block diagram of a control device according to one embodiment of the present disclosure.

As shown in FIG. 4, the control device 100 includes a command value creation unit 110 that creates a command value for a control target of the gas turbine 10; a control output creator 170 that creates a control output of the gas turbine 10; and a control signal output unit 190 that outputs a control signal indicating the command value to the control target. The control output creator 170 includes a maximum output creator 171 that creates a maximum output for control, and an output corrector 180 that corrects the control output of the gas turbine 10.

The command value creation unit 110 includes a combustion load command generator 120 that generates a combustion load command value CLCSO; a fuel flow rate command generator 130 that generates a fuel flow rate command value CSO; a load factor computation unit 140 that obtains a load factor (% Load) of the gas turbine 10; a flow rate ratio calculator 150 that calculates fuel flow rate ratios (PLr and THr); a valve command value creator 155 that creates a valve command value for each of the fuel valves 65, 66, and 67; and an IGV command value creator 160 that creates an IGV command value indicating an IGV opening degree.

The combustion load command value CLCSO is a dimensionless parameter of temperature of the combustion gas at an inlet of the turbine 21 (hereinafter, referred to as an inlet temperature), and is a parameter having a positive correlation with the inlet temperature. The combustion load command value CLCSO is set to be 0% when the inlet temperature is a lower limit value, and to be 100% when the inlet temperature is an upper limit value. For example, when the lower limit value of the inlet temperature is 700° C. and the upper limit value of the inlet temperature is 1500° C., the combustion load command value CLCSO is expressed by the following equation.

$$\text{CLCSO (\%)} = \{(\text{measured value of gas turbine output} - 700° \text{ C. MW})/(1500° \text{ C. MW} - 700° \text{ C. MW})\} \times 100$$

700° C. MW is a gas turbine output when the inlet temperature is 700° C. which is the lower limit value, and 1500° C. MW is a gas turbine output when the inlet temperature is 1500° C. which is the upper limit value. The gas turbine output herein is a generator output.

Figure 5:
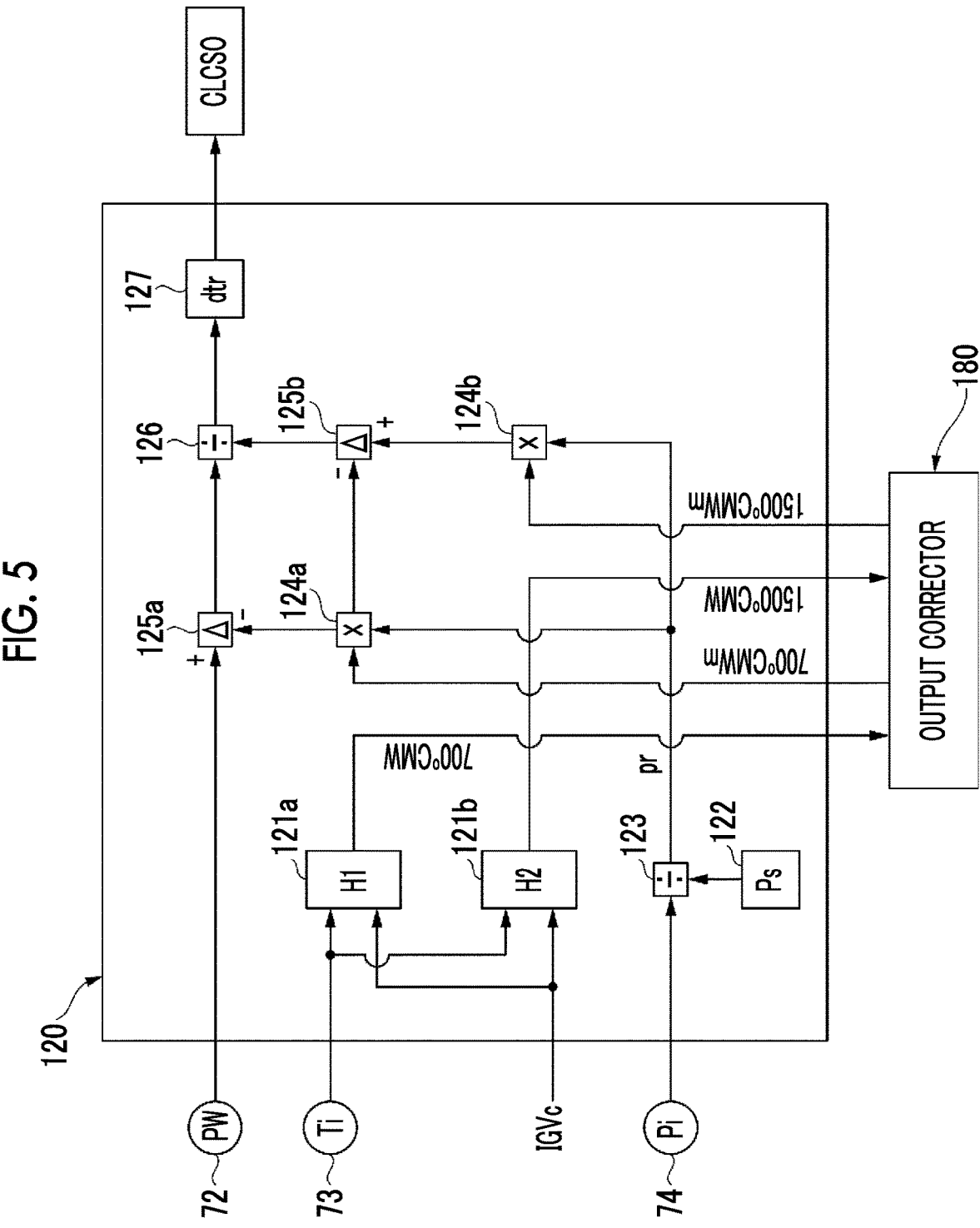
FIG. 5 is a functional block diagram of a combustion load command generator according to one embodiment of the present disclosure.

As shown in FIG. 5, the combustion load command generator 120 includes a 700° C. MW computation unit 121a, a 1500° C. MW computation unit 121b, a standard atmospheric pressure generator 122, a first divider 123, a first multiplier 124a, a second multiplier 124b, a first subtractor 125a, a second subtractor 125b, a second divider 126, and a limiter 127.

The 700° C. MW computation unit 121a obtains the gas turbine output 700° C. MW when the inlet temperature is 700° C., using a function H1 with the intake air temperature Ti and an IGV command value IGVc as variation parameters. In addition, the 1500° C. MW computation unit 121b obtains the gas turbine output 1500° C. MW when the inlet temperature is 1500° C., using a function H2 with the intake air temperature Ti and the IGV command value IGVc as variation parameters. Here, the IGV command value IGVc is a command value that is provided to the driver 16 of the IGV 14 by the control device 100. The MW computation units 121a and 121b change known values of 700° C. MW and 1500° C. MW in a case where the intake air temperature and the IGV command value IGVc are reference values, to values corresponding to the actual intake air temperature Ti and the IGV command value IGVc, and output the changed values as 700° C. MW and 1500° C. MW.

Both 700° C. MW and 1500° C. MW are one type of control output of the gas turbine 10. 700° C. MW is corrected to correction 700° C. MWm by the output corrector 180. In addition, 1500° C. MW is corrected to correction 1500° C. MWm by the output corrector 180. Both the correction 700° C. MWm and the correction 1500° C. MWm are one type of correction control output of the gas turbine 10.

The correction 700° C. MWm and the correction 1500° C. MWm from the output corrector 180 are corrected based on an actual measured value Pi of the intake air pressure (atmospheric pressure). Specifically, the first divider 123 obtains an intake air pressure ratio Pr that is a ratio of the intake air pressure (atmospheric pressure) Pi detected by the intake air pressure gauge 74, to a standard intake air pressure (standard atmospheric pressure) Ps from the standard atmospheric pressure generator 122. The first multiplier 124a corrects the correction 700° C. MWm to a value corresponding to the intake air pressure ratio Pr, by multiplying the correction 700° C. MWm from the output corrector 180 by the intake air pressure ratio Pr. The second multiplier 124b corrects the correction 1500° C. MWm to a value corresponding to the intake air pressure ratio Pr, by multiplying the correction 1500° C. MWm from the output corrector 180 by the intake air pressure ratio Pr. Namely, in the above description, the known values of 700° C. MW and 1500° C. MW in a case where the intake air temperature and the IGV command value IGVc are the reference values are corrected to values corresponding to the actual measured intake air temperature Ti, the IGV command value IGVc, and the actual measured intake air pressure ratio Pr.

The first subtractor 125a subtracts the correction 700° C. MWm corrected with the intake air pressure ratio Pr, from the actual measured output PW of the gas turbine 10 detected by the output meter 72. Namely, the first subtractor 125a obtains a value of the numerator of the above equation. The second subtractor 125b subtracts the correction 700° C. MWm corrected with the intake air pressure ratio Pr, from the correction 1500° C. MWm corrected with the intake air pressure ratio Pr.

Namely, the second subtractor 125b obtains a value of the denominator of the above equation.

The second divider 126 divides the value of the numerator of the above equation obtained by the first subtractor 125a by the value of the denominator of the above equation obtained by the second subtractor 125b, and outputs the value as the combustion load command value. The limiter 127 limits an increase and decrease rate of the combustion load command value such that the increase and decrease rate, which is the amount of change per unit time in the combustion load command value from the second divider 126, becomes equal to or less than a value determined in advance.

In the above description, the lower limit value of the inlet temperature of the combustion gas in the turbine 21 is 700° C., and the upper limit value is 1500° C.; however, depending on the model of the combustor 31 or the like, the lower limit value and the upper limit value of the inlet temperature of the combustion gas in the turbine 21 may be set to values different from the above examples.

The combustion load command value CLCSO that is limited in the increase and decrease rate by the limiter 127 is output from the combustion load command generator 120.

Figure 6:
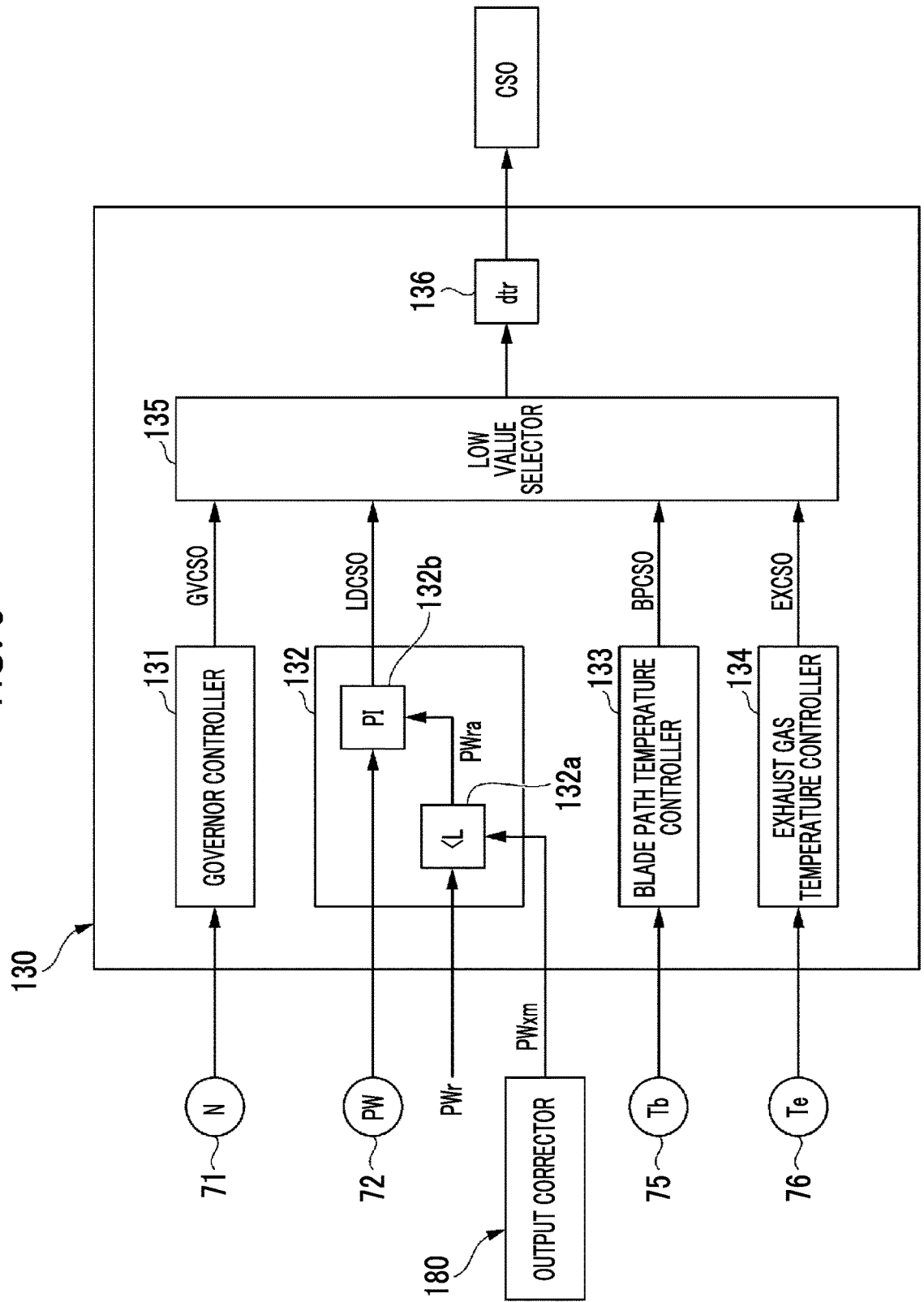
FIG. 6 is a functional block diagram of a fuel flow rate command generator according to one embodiment of the present disclosure.

The fuel flow rate command value CSO is a value indicating the total flow rate of the fuel to be supplied to the combustor 31 (hereinafter, referred to as a total fuel flow rate). Therefore, the fuel flow rate command generator 130 obtains the total fuel flow rate. As shown in FIG. 6, the fuel flow rate command generator 130 includes a governor controller 131, a load controller 132, a blade path temperature controller 133, an exhaust gas temperature controller 134, a low value selector 135, and a limiter 136.

The governor controller 131 receives the rotation speed N of the gas turbine rotor 28 from the rotation speed meter 71. Then, the governor controller 131 outputs a command value GVCSO to control the total fuel flow rate such that the rotation speed N of the gas turbine rotor 28 coincides with a target rotation speed. Specifically, the governor controller 131 compares the actual measured rotation speed N of the gas turbine rotor 28 and a GV set value set in advance, and outputs a proportional control signal as the command value GVCSO.

The load controller 132 receives the measured output PW of the gas turbine 10 from the output meter 72, receives a demand output PWr for the gas turbine 10 from a higher-level control device, and a correction maximum output PWxm from the output corrector 180. The load controller 132 includes a low value selector 132a and a proportional integration computation unit 132b. The low value selector 132a outputs the smaller one of the demand output PWr and the correction maximum output PWxm as a demand output PWra. As will be described later, since the output corrector 180 sequentially updates the correction maximum output PWxm, the low value selector 132a uses the latest correction maximum output PWxm. Specifically, the proportional integration computation unit 132b compares the measured output PW and the demand output PWra, performs proportional integration computation, and outputs the result as a command value LDCSO.

The blade path temperature controller 133 receives the blade path temperature Tb from the blade path temperature sensor 75. Then, the blade path temperature controller 133 outputs a command value BPCSO to control the total fuel flow rate such that the blade path temperature Tb does not become higher than an upper limit value. Specifically, the blade path temperature controller 133 compares the actual measured blade path temperature Tb and the upper limit value thereof, performs proportional integration computation, and outputs the result as the command value BPCSO.

The exhaust gas temperature controller 134 receives the exhaust gas temperature Te from the exhaust gas temperature sensor 76. Then, the exhaust gas temperature controller 134 outputs a command value EXCSO to control the total fuel flow rate such that the exhaust gas temperature Te does not become higher than an upper limit value. Specifically, the exhaust gas temperature controller 134 compares the actual measured exhaust gas temperature Te and the upper limit value thereof, performs proportional integration computation, and outputs the result as the command value EXCSO.

The low value selector 135 selects a minimum command value among the command values from the controllers 131 to 134, and outputs the command value. The limiter 136 limits the increase and decrease rate of the command from the low value selector 135, and outputs the result as the fuel flow rate command value (total fuel flow rate command value) CSO.

Figure 7:
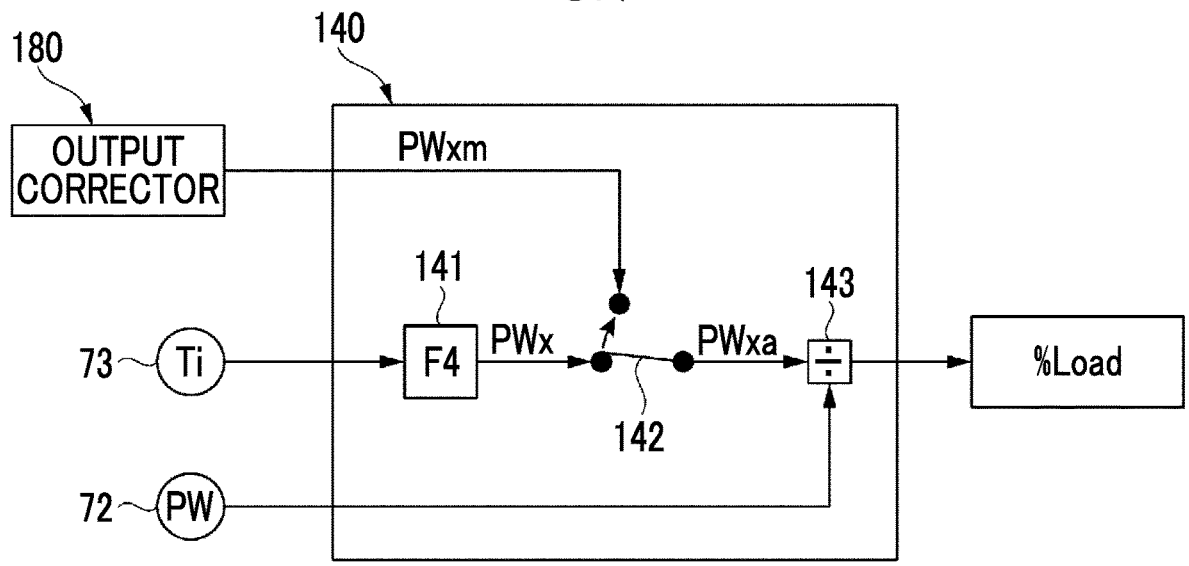
FIG. 7 is a functional block diagram of a load factor computation unit according to one embodiment of the present disclosure.
Figure 17:
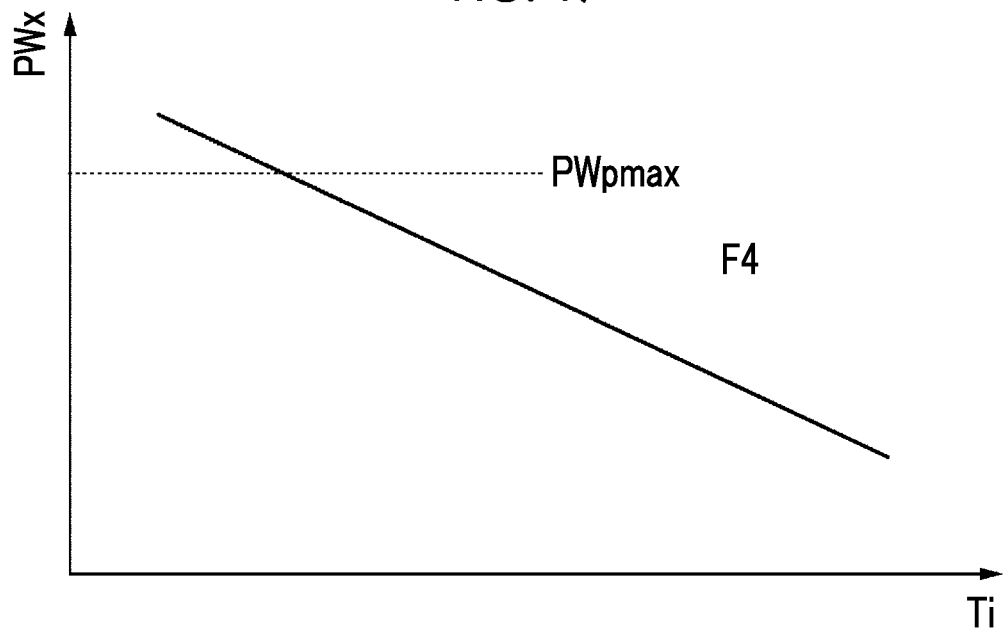
FIG. 17 is a graph for describing a function F4 according to one embodiment of the present disclosure.

As described above, the load factor computation unit 140 obtains a load factor (% Load) of the gas turbine 10. The load factor (% Load) is a ratio of the measured output PW to the maximum output for control. As shown in FIG. 7, the load factor computation unit 140 receives the measured output PW from the output meter 72, the intake air temperature Ti from the intake air temperature sensor 73, and the correction maximum output PWxm from the output corrector 180. The load factor computation unit 140 includes a maximum output generator 141, a switcher 142, and a divider 143. The maximum output generator 141 has a function F4 representing a relationship between a maximum output PWx for control of the gas turbine 10 and the intake air temperature Ti. As shown in FIG. 17, the function F4 is a function in which the maximum output PWx for control gradually decreases as the intake air temperature Ti increases. The maximum output generator 141 obtains the maximum output PWx for control corresponding to the intake air temperature Ti, using the function F4. The switcher 142 outputs only one of the maximum output PWx from the maximum output generator 141 and the correction maximum output PWxm from the output corrector 180 as a maximum output PWxa. When the correction maximum output PWxm is input from the output corrector 180, the switcher 142 outputs the correction maximum output PWxm as the maximum output PWxa. As will be described later, since the output corrector 180 sequentially updates the correction maximum output PWxm, the switcher 142 outputs the latest correction maximum output PWxm as the maximum output PWxa. The divider 143 obtains a load factor (% Load) by dividing the measured output PW from the output meter 72 by the maximum output PWxa from the switcher 142.

Figure 8:
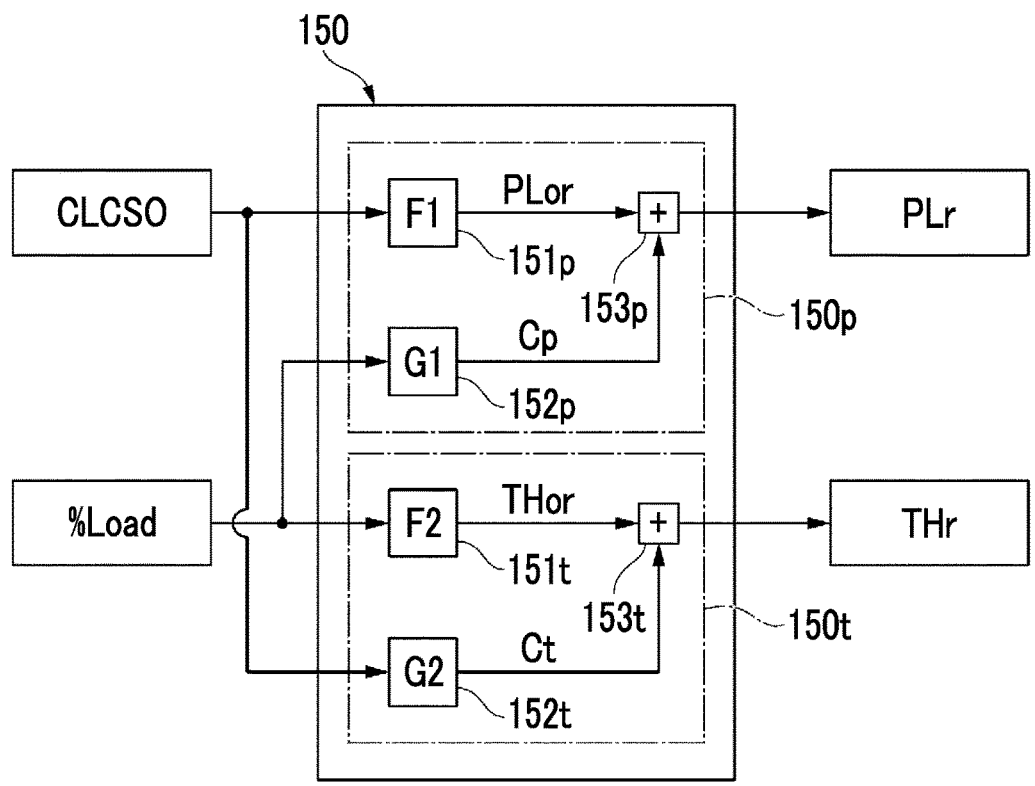
FIG. 8 is a functional block diagram of a flow rate ratio calculator according to one embodiment of the present disclosure.

As shown in FIG. 8, the flow rate ratio calculator 150 includes a pilot ratio calculator 150p that obtains a pilot ratio PLr, and a top hat ratio calculator 150t that obtains a top hat ratio THr. The pilot ratio PLr is a ratio of a pilot fuel flow rate Fpf to the total fuel flow rate. The top hat ratio THr is a ratio of a top hat fuel flow rate Ftf to the total fuel flow rate.

The pilot ratio calculator 150p includes a PLor computation unit 151p, a correction value computation unit 152p, and a corrector 153p.

Figure 12:
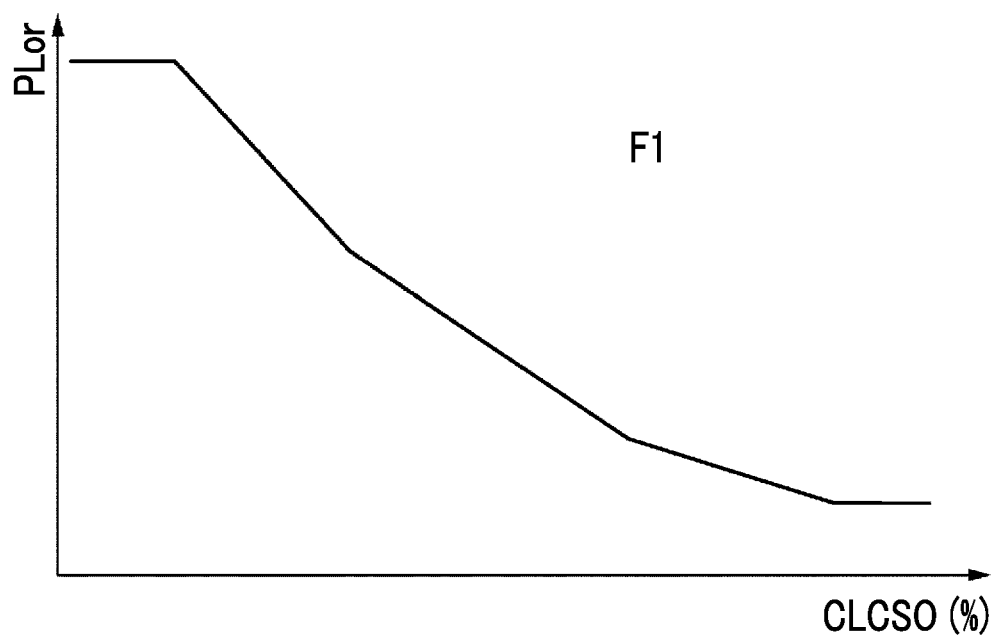
FIG. 12 is a graph for describing a function F1 according to one embodiment of the present disclosure.

The PLor computation unit 151p has a function F1 that defines a relationship between a pilot ratio PLor and the combustion load command value CLCSO having a positive correlation with the inlet temperature of the combustion gas in the turbine 21. As shown in FIG. 12, the function F1 is a function in which the pilot ratio PLor gradually decreases as the combustion load command value CLCSO increases, namely, as the inlet temperature of the combustion gas increases. The PLor computation unit 151p receives the combustion load command value CLCSO from the combustion load command generator 120, and obtains the pilot ratio PLor corresponding to the combustion load command value CLCSO, using the function F1. Here, the relationship between the combustion load command value CLCSO and the pilot ratio PLor is defined by the function F1, but the relationship may be defined by a map.

Figure 14:
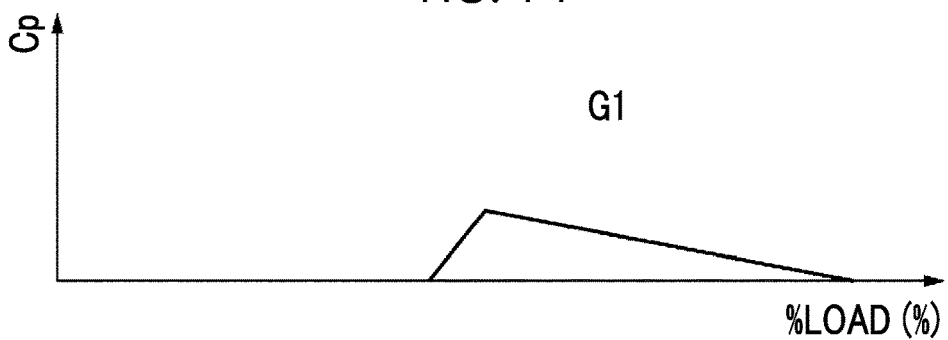
FIG. 14 is a graph for describing a function G1 according to one embodiment of the present disclosure.

The correction value computation unit 152p has a function G1 (refer to FIG. 14) that defines a relationship between the load factor % Load and a correction value Cp. The correction value computation unit 152p receives the load factor % Load from the load factor computation unit 140, and obtains the correction value Cp corresponding to the current load factor % Load, using the function G1. Here, the relationship between the load factor % Load and the correction value Cp is defined by the function G1, but the relationship may be defined by a map.

The function G1 is determined as follows.

First, a region (region determined by the pilot ratio PLor and the load factor % Load) where the combustion state is unstabilized in a case where the combustion load command value CLCSO is kept constant and the load factor % Load is changed is determined in advance by a test or the like. Next, a relationship between the pilot ratio PLor and the load factor % Load that can avoid a region where the combustion state is unstabilized when the combustion load command value CLCSO is kept constant is determined. The function G1 represents this relationship.

The corrector 153p adds the correction value Cp from the correction value computation unit 152p to the pilot ratio PLor from the PLor computation unit 151p, and outputs the result as the pilot ratio PLr. Therefore, the corrector 153p is an adder.

The top hat ratio calculator 150t includes a THor computation unit 151t, a correction value computation unit 152t, and a corrector 153t.

Figure 13:
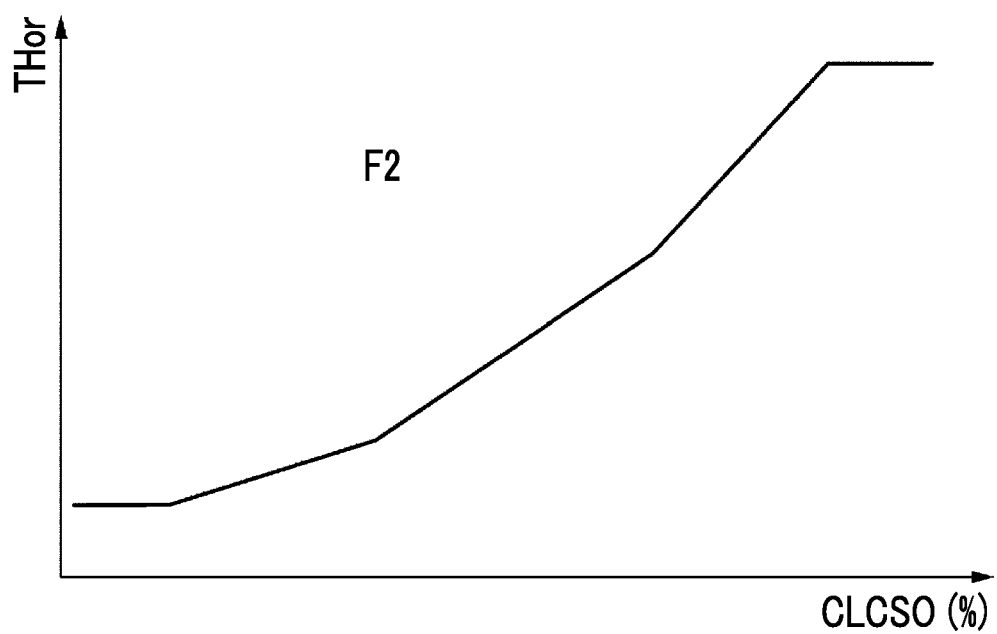
FIG. 13 is a graph for describing a function F2 according to one embodiment of the present disclosure.

The THor computation unit 151t has a function F2 that defines a relationship between a top hat ratio THor and the combustion load command value CLCSO having a positive correlation with the inlet temperature of the combustion gas in the turbine 21. As shown in FIG. 13, the function F2 is a function in which the top hat ratio THor gradually decreases as the combustion load command value CLCSO increases, namely, as the inlet temperature of the combustion gas increases. The THor computation unit 151t receives the combustion load command value CLCSO from the combustion load command generator 120, and obtains the top hat ratio THor corresponding to the combustion load command value CLCSO, using the function F2. Here, the relationship between the combustion load command value CLCSO and the top hat ratio THor is defined by the function F2, but the relationship may be defined by a map.

Figure 15:
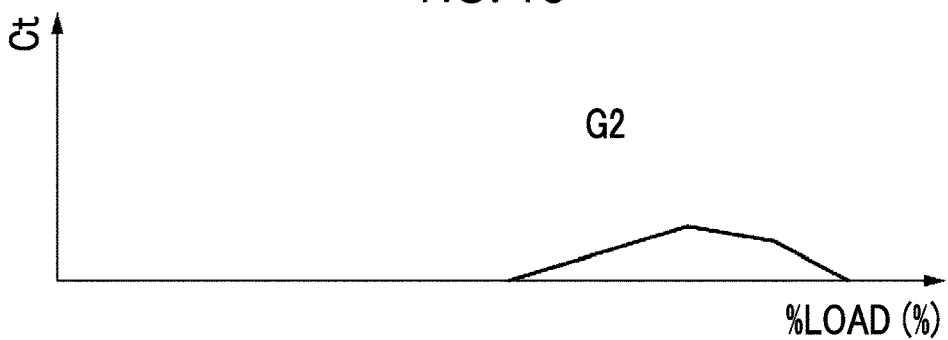
FIG. 15 is a graph for describing a function G2 according to one embodiment of the present disclosure.

The correction value computation unit 152t has a function G2 (refer to FIG. 15) that defines a relationship between the load factor % Load and a correction value Ct. The correction value computation unit 152t receives the load factor % Load from the load factor computation unit 140, and obtains the correction value Ct according to the current load factor % Load, using the function G2. Here, the relationship between the load factor % Load and the correction value Ct is defined by the function G2, but the relationship may be defined by a map.

Similarly to the function G1, the function G2 is also determined as follows.

First, a region (region determined by the top hat ratio THor and the load factor % Load) where the combustion state is unstabilized in a case where the combustion load command value CLCSO is kept constant and the load factor % Load is changed is determined in advance by a test or the like. Next, a relationship between the top hat ratio THor and the load factor % Load that can avoid a region where the combustion state is unstabilized when the combustion load command value CLCSO is kept constant is determined. The function G2 represents this relationship.

The corrector 153t adds the correction value Ct from the correction value computation unit 152t to the top hat ratio THor from the THor computation unit 151t, and outputs the result as the top hat ratio THr. Therefore, the corrector 153t is an adder.

Figure 9:
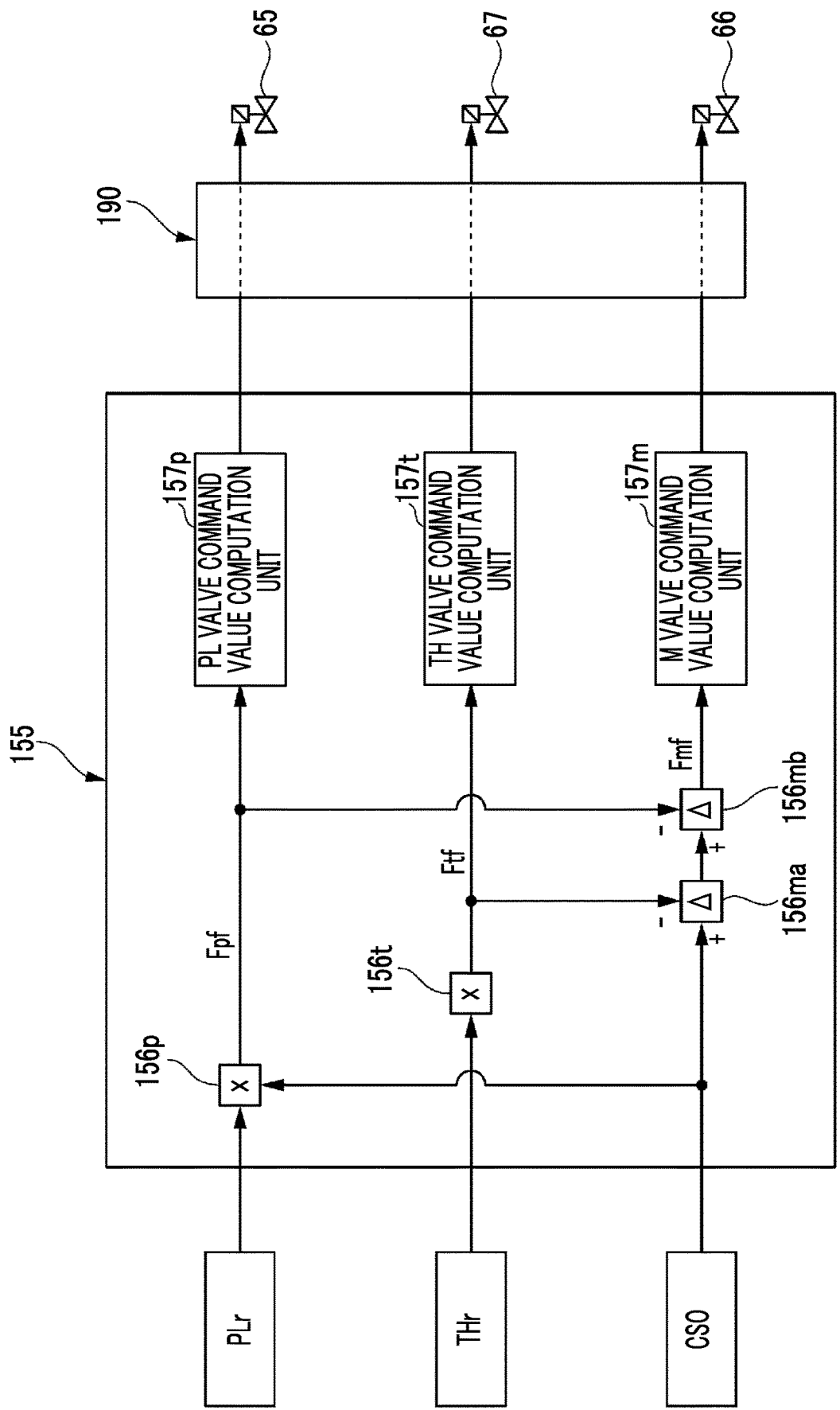
FIG. 9 is a functional block diagram of a valve command value creator according to one embodiment of the present disclosure.

As shown in FIG. 9, the valve command value creator 155 includes a first multiplier 156p, a second multiplier 156t, a first subtractor 156ma, a second subtractor 156mb, a PL valve command value computation unit 157p, an M valve command value computation unit 157m, and a TH valve command value computation unit 157t.

The first multiplier 156p obtains the pilot fuel flow rate Fpf by multiplying the fuel flow rate command value CSO indicating the total fuel flow rate by the pilot ratio PLr. The PL valve command value computation unit 157p obtains a command value for the pilot fuel valve 65 to set the flow rate of the pilot fuel Fp to be sprayed from the pilot nozzle 44, to the pilot fuel flow rate Fpf.

The second multiplier 156t obtains the top hat fuel flow rate Ftf by multiplying the fuel flow rate command value CSO indicating the total fuel flow rate by the top hat ratio THr. The TH valve command value computation unit 157t obtains a command value for the top hat fuel valve 67 to set the flow rate of the top hat fuel Ft to be sprayed from the top hat nozzle 51, to the top hat fuel flow rate Ftf.

The first subtractor 156ma subtracts the top hat fuel flow rate Ftf from the fuel flow rate command value CSO indicating the total fuel flow rate. The second subtractor 156mb further subtracts the pilot fuel flow rate Fpf from the subtraction result of the first subtractor 156ma, and outputs the subtraction result to the M valve command value computation unit 157m, as a main fuel flow rate Fmf. The M valve command value computation unit 157m obtains a command value for the main fuel valve 66 to set the total flow rate of the main fuel Fm to be sprayed from a plurality of the main nozzles 54, to the main fuel flow rate Fmf.

The control signal output unit 190 outputs a control signal including the command value obtained by the PL valve command value computation unit 157p, to the pilot fuel valve 65. The control signal output unit 190 outputs a control signal including the command value obtained by the TH valve command value computation unit 157t, to the top hat fuel valve 67. The control signal output unit 190 outputs a control signal including the command value obtained by the M valve command value computation unit 157m, to the main fuel valve 66.

Figure 10:
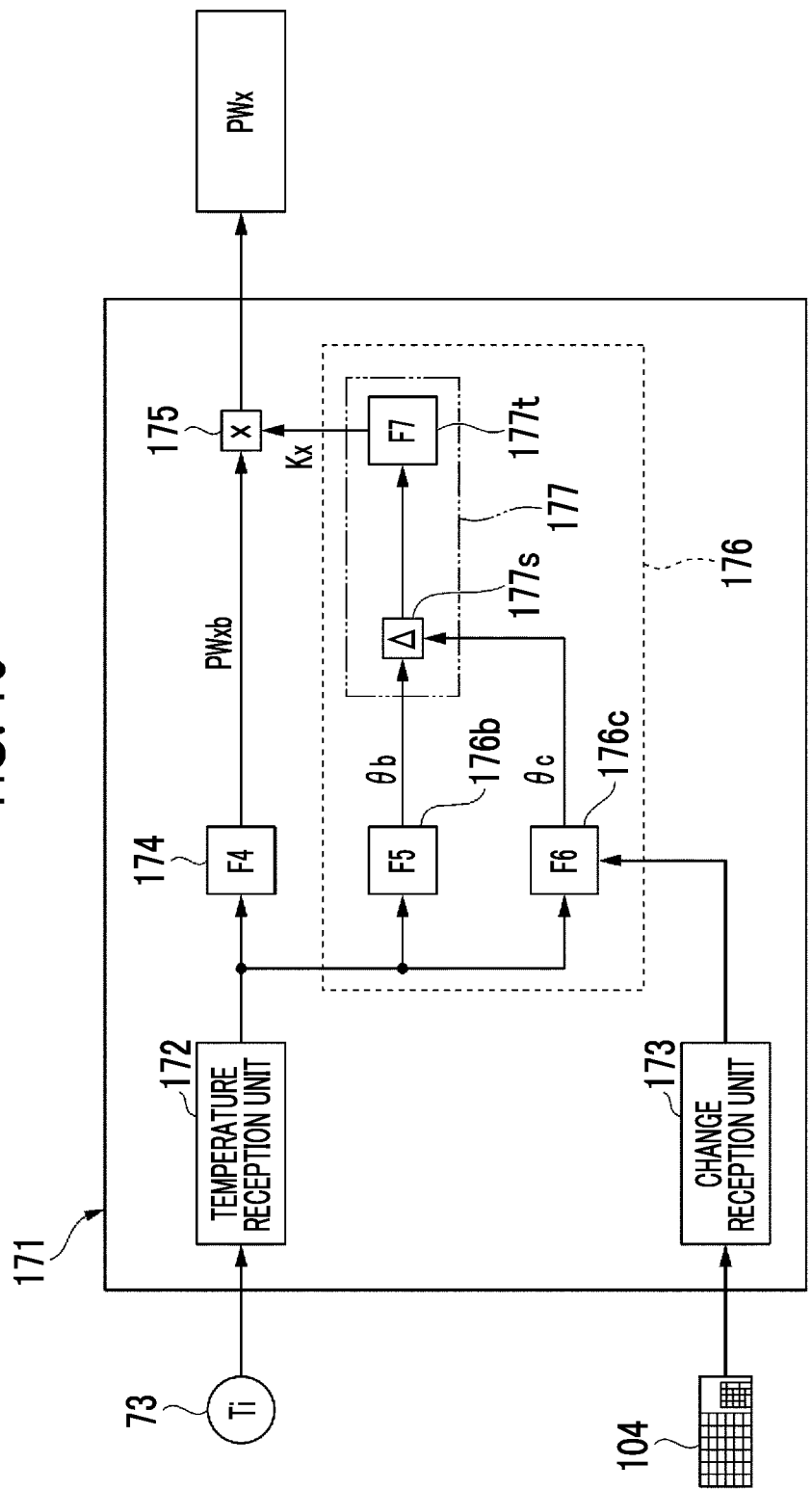
FIG. 10 is a functional block diagram of a maximum output creator according to one embodiment of the present disclosure.

As shown in FIG. 10, the maximum output creator 171 of the control output creator 170 includes a temperature reception unit 172, a change reception unit 173, a basic maximum output computation unit 174, a coefficient creation unit 176, and a maximum output correction unit 175.

The temperature reception unit 172 receives the intake air temperature Ti from the intake air temperature sensor 73. The change reception unit 173 receives, for example, a change content of a maximum opening degree for control in the IGV 14 from an input device 104 such as a keyboard. The change content is a changed relationship that is a relationship between a changed maximum opening degree of the IGV 14 and the intake air temperature Ti.

The basic maximum output computation unit 174 has a function F4 that defines a relationship between the intake air temperature Ti and the maximum output PWx for control of the gas turbine. As described above with reference to FIG. 17, the function F4 is a function in which the maximum output PWx for control gradually decreases as the intake air temperature Ti increases. The basic maximum output computation unit 174 obtains a basic maximum output PWxb corresponding to the intake air temperature Ti, using the function F4.

The coefficient creation unit 176 creates a maximum output correction coefficient Kx for correcting the basic maximum output PWxb based on the above-described changed relationship and the intake air temperature Ti. The coefficient creation unit 176 includes a basic maximum opening degree computation unit 176b, a changed maximum opening degree computation unit 176c, and a coefficient computation unit 177.

The basic maximum opening degree computation unit 176b has a function F5 (refer to FIG. 18) that defines a relationship between the intake air temperature Ti and a basic maximum opening degree θb for control in the IGV 14. The basic maximum opening degree computation unit 176b obtains the basic maximum opening degree θb for control according to the intake air temperature Ti, using the function F5.

The changed maximum opening degree computation unit 176c has a function F6 (refer to FIG. 18) that defines a relationship between the intake air temperature Ti and a changed maximum opening degree θc for control in the IGV 14. The function F6 is a function that defines the above-described changed relationship. Therefore, the function F6 is a function received by the change reception unit 173. The changed maximum opening degree computation unit 176c obtains the changed maximum opening degree θc for control according to the intake air temperature Ti, using the function F6. In the example shown in FIG. 18, the function F5 described above is a function in which the basic maximum opening degree θb does not change with respect to a change in the intake air temperature Ti. On the other hand, the function F6 is a function in which the basic maximum opening degree θb changes with respect to a change in the intake air temperature Ti.

Figure 19:
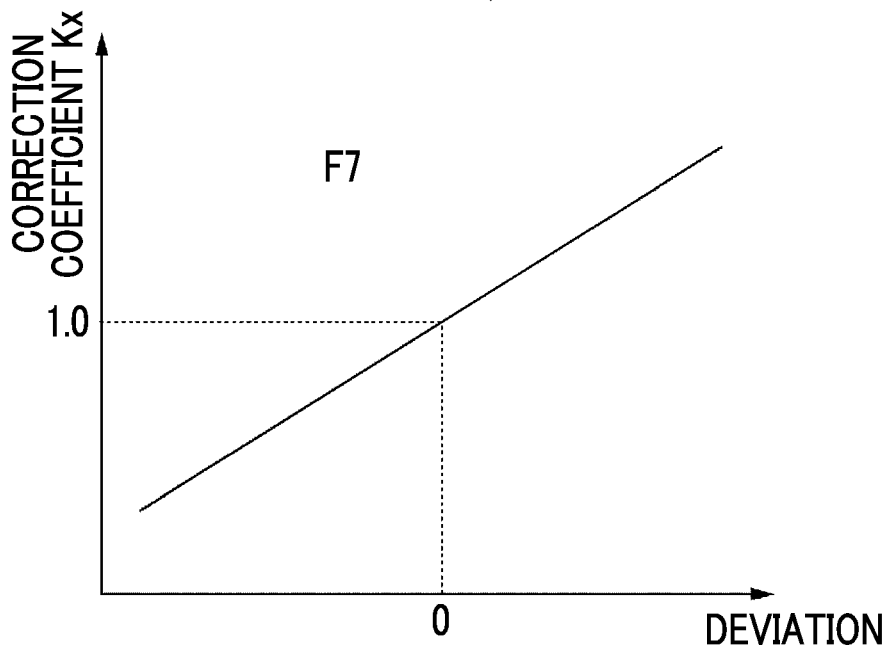
FIG. 19 is a graph for describing a function F7 according to one embodiment of the present disclosure.

The coefficient computation unit 177 obtains the correction coefficient Kx for correcting the basic maximum output PWxb using the basic maximum opening degree θb and the changed maximum opening degree θc. The coefficient computation unit 177 includes a deviation calculation unit 177s and a coefficient calculation unit 177t. The deviation calculation unit 177s calculates a deviation between the basic maximum opening degree θb and the changed maximum opening degree θc. Therefore, the deviation calculation unit 177s is a subtractor. The coefficient calculation unit 177t has a function F7 that defines a relationship between the deviation and the correction coefficient Kx. As shown in FIG. 19, the function F7 is, for example, a function in which the correction coefficient Kx gradually increases as the deviation increases. Further, the function F7 is a function in which the correction coefficient Kx is 1 when the deviation is 0, the correction coefficient Kx is less than 1 when the deviation is a negative value, and the correction coefficient Kx is larger than 1 when the deviation is a positive value. The coefficient calculation unit 177t calculates the correction coefficient Kx corresponding to the deviation obtained by the deviation calculation unit 177s, using the function F7.

The maximum output correction unit 175 corrects the basic maximum output PWxb using the correction coefficient Kx, and outputs the corrected basic maximum output PWxb as the maximum output PWx for control. Specifically, the maximum output correction unit 175 corrects the basic maximum output PWxb by multiplying the basic maximum output PWxb by the correction coefficient Kx. Therefore, the maximum output correction unit 175 is a multiplier.

Each relationship represented by the function F4, the function F5, the function F6, and the function F7 may be defined by a map.

As described above, the maximum output PWx created by the maximum output creator 171 described above is one type of control output of the gas turbine 10. The maximum output PWx is corrected to the correction maximum output PWxm by the output corrector 180. In addition, the correction maximum output PWxm is one type of correction control output of the gas turbine 10.

As shown in FIG. 4, the output corrector 180 of the control output creator 170 corrects the measured output PW of the gas turbine 10 from the output meter 72, and outputs the result as a correction output PWm. The measured output PW is one type of control output of the gas turbine 10. In addition, the correction output PWm is one type of correction control output of the gas turbine 10.

Figure 16:
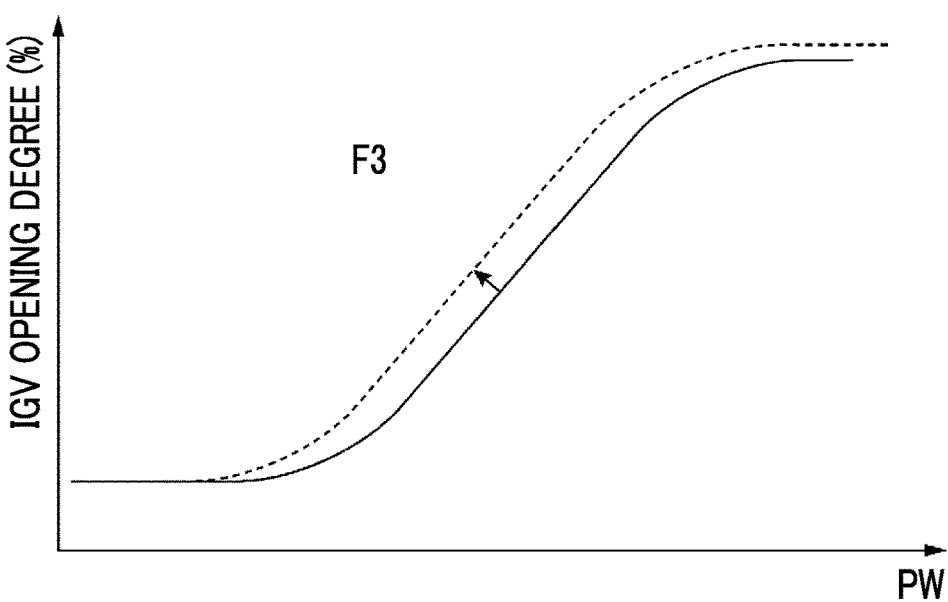
FIG. 16 is a graph for describing a function F3 according to one embodiment of the present disclosure.

The intake air temperature Ti from the intake air temperature sensor 73 and the correction output PWm from the output corrector 180 are input to the IGV command value creator 160. The IGV command value creator 160 has a function F3 that defines a relationship between an output of the gas turbine 10 and an IGV opening degree. As shown in FIG. 16, the function F3 is a function in which the IGV opening degree gradually increases with increase in the output of the gas turbine 10. First, the IGV command value creator 160 corrects the correction output PWm with the intake air temperature Ti. Next, the IGV command value creator 160 obtains an IGV opening degree corresponding to the correction output PWm corrected with the intake air temperature Ti, using the function F3. Here, the relationship between the output of the gas turbine 10 and the IGV opening degree is defined by the function F3, but the relationship may be defined by a map. The IGV command value creator 160 outputs the IGV command value IGVc indicating the IGV opening degree to the combustion load command generator 120 and to the control signal output unit 190. As described above, the combustion load command generator 120 creates the combustion load command value CLCSO using the IGV command value IGVc. In addition, the control signal output unit 190 outputs a control signal including the IGV command value IGVc output by the IGV command value creator 160, to the IGV 14.

Essentially, the function F3 is incorporated into the control device 100 at the initial setting of the control device 100. The function F3 incorporated at the initial setting is a function determined when the gas turbine 10 is designed. After the construction of the gas turbine 10, a trial operation of the gas turbine 10 is performed. In many cases, the function F3 incorporated at the initial setting is changed, for example, as shown by a broken line in FIG. 16, depending on a result of the trial operation.

Figure 11:
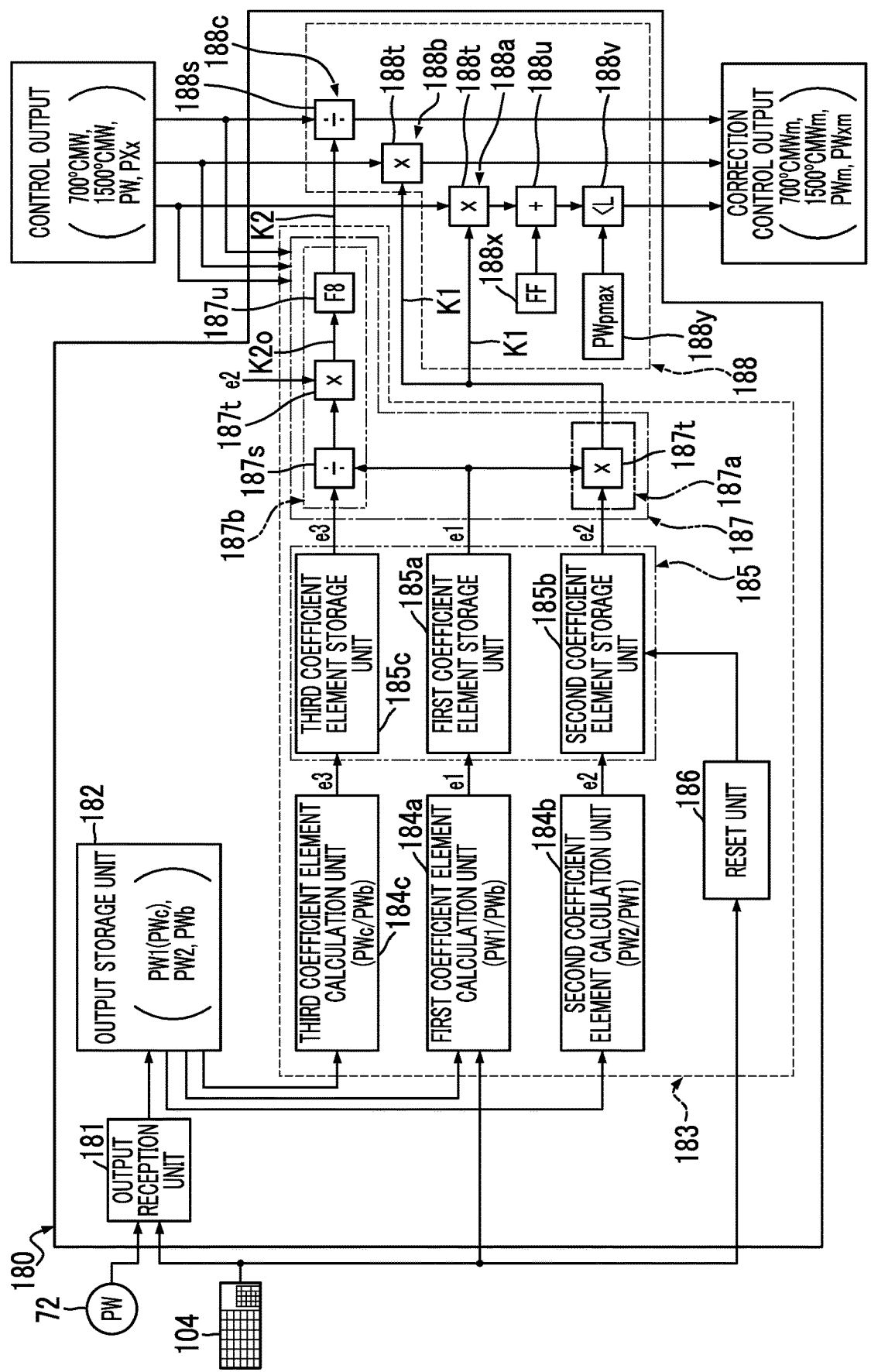
FIG. 11 is a functional block diagram of an output corrector according to one embodiment of the present disclosure.

As shown in FIG. 11, the output corrector 180 corrects a control output, and outputs the result as a correction control output. In the present embodiment, as described above, examples of the control output include the gas turbine output 700° C. MW, the gas turbine output 1500° C. MW, the measured output PW, and the maximum output PWx. For this reason, in the present embodiment, examples of the correction control output include the correction 700° C. MWm, the correction 1500° C. MWm, the correction output PWm, and the correction maximum output PWxm.

The output corrector 180 includes an output reception unit 181, an output storage unit 182, a coefficient creation unit 183, and an output correction unit 188.

The output reception unit 181 receives a reference output PWb, an immediately preceding output PW1, and a current output PW2. The reference output PWb is an output under a condition where the gas turbine 10 can output a maximum output at a reference time in the past. The reference time is, for example, the time of design of the gas turbine 10. When the reference output PWb is an output at the time of design of the gas turbine 10, for example, the output reception unit 181 receives the reference output PWb from an input device 104 such as a keyboard. The immediately preceding output PW1 is an actual measured output that the output reception unit 181 receives from the output meter 72 under a condition where the gas turbine 10 can output a maximum output in an immediately preceding time period closer to a current time than to the reference time (time of design). The immediately preceding time period includes a trial operation time period during a trial operation of the gas turbine 10 and a main operation time period during a main operation after the trial operation. For this reason, the immediately preceding time period includes a time period during a construction trial operation that is a trial operation performed after the gas turbine 10 is constructed, and that excludes a trial operation performed after the gas turbine 10 is inspected or repaired. Therefore, examples of the immediately preceding output include a construction output PWc that is an output that the output reception unit 181 receives from the output meter 72 under a condition where the gas turbine 10 can output a maximum output in the time period during the construction trial operation. The current output PW2 is an actual measured output that the output reception unit 181 receives from the output meter 72 under a condition where the gas turbine 10 can output a maximum output in a current time period between the immediately preceding time period and the current time. The current time period also includes a trial operation time period during a trial operation of the gas turbine 10 and a main operation time period during a main operation after the trial operation.

The output reception unit 181 cannot recognize whether an actual measured output is the immediately preceding output PW1, the current output PW2, or the construction output PWc, merely by receiving the actual measured output from the output meter 72 in each time period described above. For this reason, the output reception unit 181 receives an actual measured output from the output meter 72 from the input device 104 such as a keyboard, and also receives a time period in which the actual measured output is obtained.

The output storage unit 182 stores the reference output PWb, the immediately preceding output PW1, the current output PW2, and the construction output PWc received from the output reception unit 181.

The correction coefficient creation unit 183 includes a first coefficient element calculation unit 184a, a second coefficient element calculation unit 184b, a third coefficient element calculation unit 184c, a coefficient element storage unit 185, a reset unit 186, and a correction coefficient calculation unit 187.

The first coefficient element calculation unit 184a obtains a first coefficient element e1. The first coefficient element e1 is a value obtained by dividing the immediately preceding output PW1 stored in the output storage unit 182 by the reference output PWb stored in the output storage unit 182, namely, a ratio of the immediately preceding output PW1 to the reference output PWb (PW1/PWb). Therefore, the first coefficient element e1 represents the degree of degradation of the output during a period between the reference time and the immediately preceding time period.

When the first coefficient element calculation unit 184a receives a reset instruction from the input device 104 such as a keyboard, the first coefficient element calculation unit 184a defines a value obtained by dividing the current output PW2 stored in the output storage unit 182 by the reference output PWb stored in the output storage unit 182, namely, a ratio of the current output PW2 to the reference output PWb (PW2/PWb), as the first coefficient element e1. The reset instruction is sent to the first coefficient element calculation unit 184a during a period between when the gas turbine 10 is completely stopped and immediately before a trial operation is started.

The second coefficient element calculation unit 184b obtains a second coefficient element e2. The second coefficient element e2 is a value obtained by dividing the current output PW2 stored in the output storage unit 182 by the immediately preceding output PW1 stored in the output storage unit 182, namely, a ratio of the current output PW2 to the immediately preceding output PW1 (PW2/PW1). Therefore, the second coefficient element e2 represents the degree of degradation of the output during a period when the immediately preceding time period and the current time period.

The third coefficient element calculation unit 184c obtains a third coefficient element e3. The third coefficient element e3 is a value obtained by dividing the construction output PWc stored in the output storage unit 182 by the reference output PWb stored in the output storage unit 182, namely, a ratio of the construction output PWc to the reference output PWb (PWc/PWb). Therefore, the third coefficient element e3 represents the degree of degradation of the output during a period between the reference time and the time period during the construction trial operation.

The coefficient element storage unit 185 includes a first coefficient element storage unit 185a that stores the first coefficient element e1, a second coefficient element storage unit 185b that stores the second coefficient element e2, and a third coefficient element storage unit 185c that stores the third coefficient element e3.

The above-described reset instruction is input to the reset unit 186 from the input device 104 such as a keyboard during the period between when the gas turbine 10 is completely stopped and immediately before a trial operation is started. The reset unit 186 receives the reset instruction, and resets the second coefficient element e2 stored in the second coefficient element storage unit 185b to a value that does not affect a calculation result of a correction coefficient by the correction coefficient calculation unit 187, here, to "1".

The correction coefficient calculation unit 187 includes a first correction coefficient calculation unit 187a that calculates a first correction coefficient K1, and a second correction coefficient calculation unit 187b that calculates a second correction coefficient K2. The first correction coefficient K1 is a correction coefficient for correcting the maximum output PWx that is one type of control output, and 1500° C. MW and 700° C. MW that are one type of control output. The second correction coefficient K2 is a correction coefficient for correcting the actual measured output PW that is one type of control output.

The first correction coefficient calculation unit 187a has a multiplier 187t. The multiplier 187t multiplies the first coefficient element e1 stored in the first coefficient element storage unit 185a by the second coefficient element e2 stored in the second coefficient element storage unit 185b, and outputs a value of the multiplication result as the first correction coefficient K1.

Figure 20:
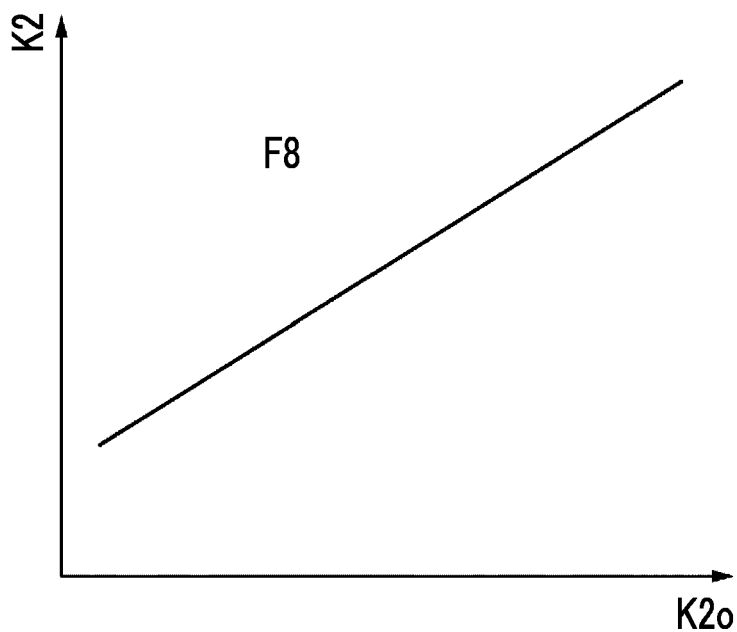
FIG. 20 is a graph for describing a function F8 according to one embodiment of the present disclosure.

The second correction coefficient calculation unit 187b includes a divider 187s, the multiplier 187t, and a correction coefficient adjustor 187u. The divider 187s divides the first coefficient element e1 stored in the first coefficient element storage unit 185a by the third coefficient element e3 stored in the third coefficient element storage unit 185c. The multiplier 187t multiplies a value of the division result by the divider 187s, by the second coefficient element e2 stored in the second coefficient element storage unit 185b. A value of the multiplication result by the multiplier 187t is a second correction coefficient K2o before adjustment. The correction coefficient adjustor 187u has a function F8 that defines a relationship between the second correction coefficient K2o before adjustment and the second correction coefficient K2 after adjustment. As shown in FIG. 20, the function F8 is a function in which the second correction coefficient K2 after adjustment increases with increase in the second correction coefficient K2o before adjustment. The correction coefficient adjustor 187u obtains the second correction coefficient K2 after adjustment corresponding to the second correction coefficient K2o before adjustment, using the function F8. Here, the relationship between the second correction coefficient K2o before adjustment and the second correction coefficient K2 after adjustment is defined by the function F5, but the relationship may be defined by a map.

The second correction coefficient calculation unit 187b obtains the second correction coefficient K2o before adjustment via computation represented by the following equation.

$$K2o = e1 \div e3 \times e2 = (PW1/PWb) \div (PWc/PWb) \times (PW2/PW1) = (PW1/PWb) \div (PWc/PWb) \times (PW2/PW1)$$

In the computation represented by the above equation, the reference output PWb used in the computation of the first coefficient element e1 and the reference output PWb used in the computation of the third coefficient element e3 cancel each other out. For this reason, the second correction coefficients K2o and K2 are not elements of the reference output PWb at the time of design, but indicate the degree of degradation of the output until the current time period with reference to the construction output PWc that is an actual measured output during the construction trial operation.

As described above, the second correction coefficient K2 is used to correct the actual measured output PW in order to obtain the correction output PWm. In addition, the IGV command value creator 160 obtains an IGV opening degree corresponding to the correction output PWm, using the function F3. In many cases, as described with reference to FIG. 16, the function F3 is changed during the construction trial operation. For this reason, the second correction coefficient K2 used to obtain the IGV opening degree is set to a value indicating the degree of degradation of the output until the current time period with reference to the construction output PWc that is an actual measured output during the construction trial operation.

A control output is input not only to the output correction unit 188 but also to the correction coefficient calculation unit 187. In response to the control output, the correction coefficient calculation unit 187 outputs a correction coefficient corresponding to the control output, out of the first correction coefficient K1 and the second correction coefficient K2, to the output correction unit 188.

The output correction unit 188 includes a first output correction unit 188*a* that corrects the maximum output PWx using the first correction coefficient K1; a second output correction unit 188*b* that corrects 1500° C. MW and 700° C. MW using the first correction coefficient K1; and a third output correction unit 188*c* that corrects the measured output PW using the second correction coefficient K2.

The first output correction unit 188*a* includes a multiplier 188*t*; an adder 188*u*; a low value selector 188*v*; a first storage unit 188*x* that stores an amplitude output FF that is an output for the amplitude of the frequency in a system electrically connected to the generator 29; and a second storage unit 188*y* that stores an allowable maximum output PWpmax of the generator 29. The multiplier 188*t* multiplies the maximum output PWx that is one type of control output, by the first correction coefficient K1. The adder 188*u* adds the amplitude output FF stored in the first storage unit 188*x*, to a value of the multiplication result by the multiplier 188*t*. The low value selector 188*v* outputs the smaller one of a value of the result of addition by the adder 188*u* and the allowable maximum output PWpmax stored in the second storage unit 188*y*, as the correction maximum output PWxm. As shown in FIG. 17, the allowable maximum output PWpmax is a value that does not change even when the intake air temperature Ti changes. In addition, the allowable maximum output PWpmax is a value smaller than a maximum output PWx for control in a low temperature range when the intake air temperature Ti is within a low temperature range, and is a value larger than the maximum output PWx for control in the other temperature range when the intake air temperature Ti is within the other temperature range.

The second output correction unit 188*b* includes the multiplier 188*t*. The multiplier 188*t* corrects 1500° C. MW and 700° C. MW by multiplying each of 1500° C. MW and 700° C. MW that are one type of control output, by the first correction coefficient K1, and outputs the correction results as the correction 1500° C. MWm and the correction 700° C. MWm.

The third output correction unit 188*c* includes a divider 188*s*. The divider 188*s* corrects the actual measured output PW by dividing the actual measured output PW that is one type of control output, by the second correction coefficient K2, and outputs the correction result as the correction output PWm.

Figure 21:
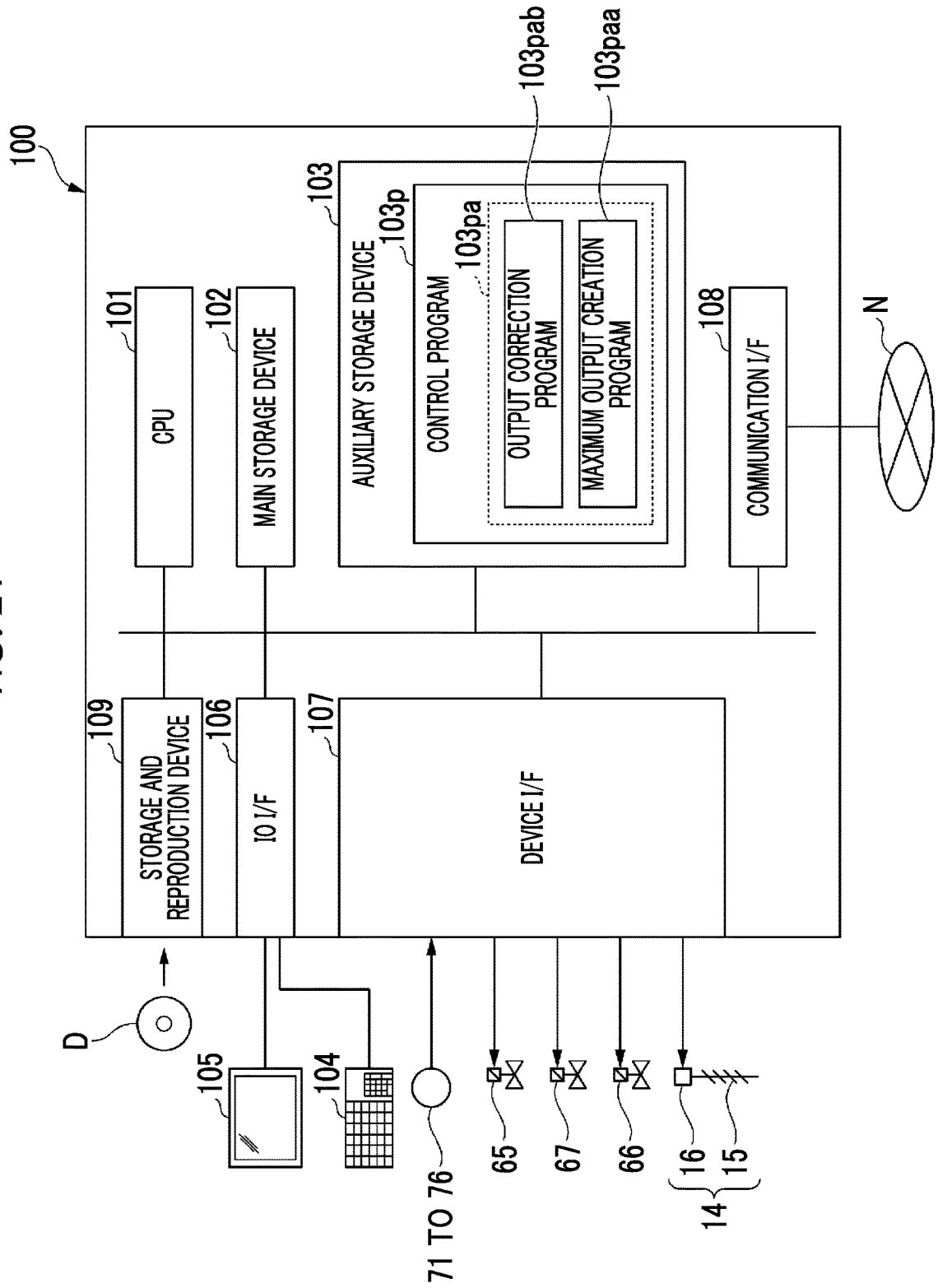
FIG. 21 is a description diagram showing a hardware configuration of the control device according to one embodiment of the present disclosure.

The control device 100 described above is a computer. In terms of hardware, as shown in FIG. 21, the control device 100 includes a central processing unit (CPU) 101 that performs various computations; a main storage device 102 such as a memory serving as a work area of the CPU 101; an auxiliary storage device 103 such as a hard disk drive device; the input device 104 such as a keyboard or a mouse; a display device 105; an input/output interface 106 of the input device 104 and the display device 105; a device interface 107; a communication interface 108 for communicating with the outside via a network N; and a storage and reproduction device 109 that performs storage processing or reproduction processing of data on a disk-type storage medium D.

Each of the detectors 71 to 76, each of the fuel valves 65 to 67, and the IGV 14 described above are connected to the device interface 107 via signal lines or the like.

A control program 103*p* and the like are stored in the auxiliary storage device 103 in advance. A control output creation program 103*pa* is incorporated in the control program 103*p*. The control output creation program 103*pa* has a maximum output creation program 103*paa* and an output correction program 103*pab*. For example, the control program 103*p* is taken into the auxiliary storage device 103 from the disk-type storage medium D via the storage and reproduction device 109. The control program 103*p* may be incorporated into the auxiliary storage device 103 from an external device via the communication interface 108.

All the functional elements of the control device 100 described with reference to FIGS. 4 to 11 function when the CPU 101 executes the control program 103*p* stored in the auxiliary storage device 103. Particularly, among the functional elements of the control device 100, the control output creator 170 functions when the CPU 101 executes the control output creation program 103*pa* in the control program 103*p* stored in the auxiliary storage device 103. In addition, among the functional elements of the control device 100, the maximum output creator 171 functions when the CPU 101 executes the maximum output creation program 103*paa* in the control output creation program 103*pa*. In addition, among the functional elements of the control device 100, the output corrector 180 functions when the CPU 101 executes the output correction program 103*pab* in the control output creation program 103*pa*.

Figure 22:
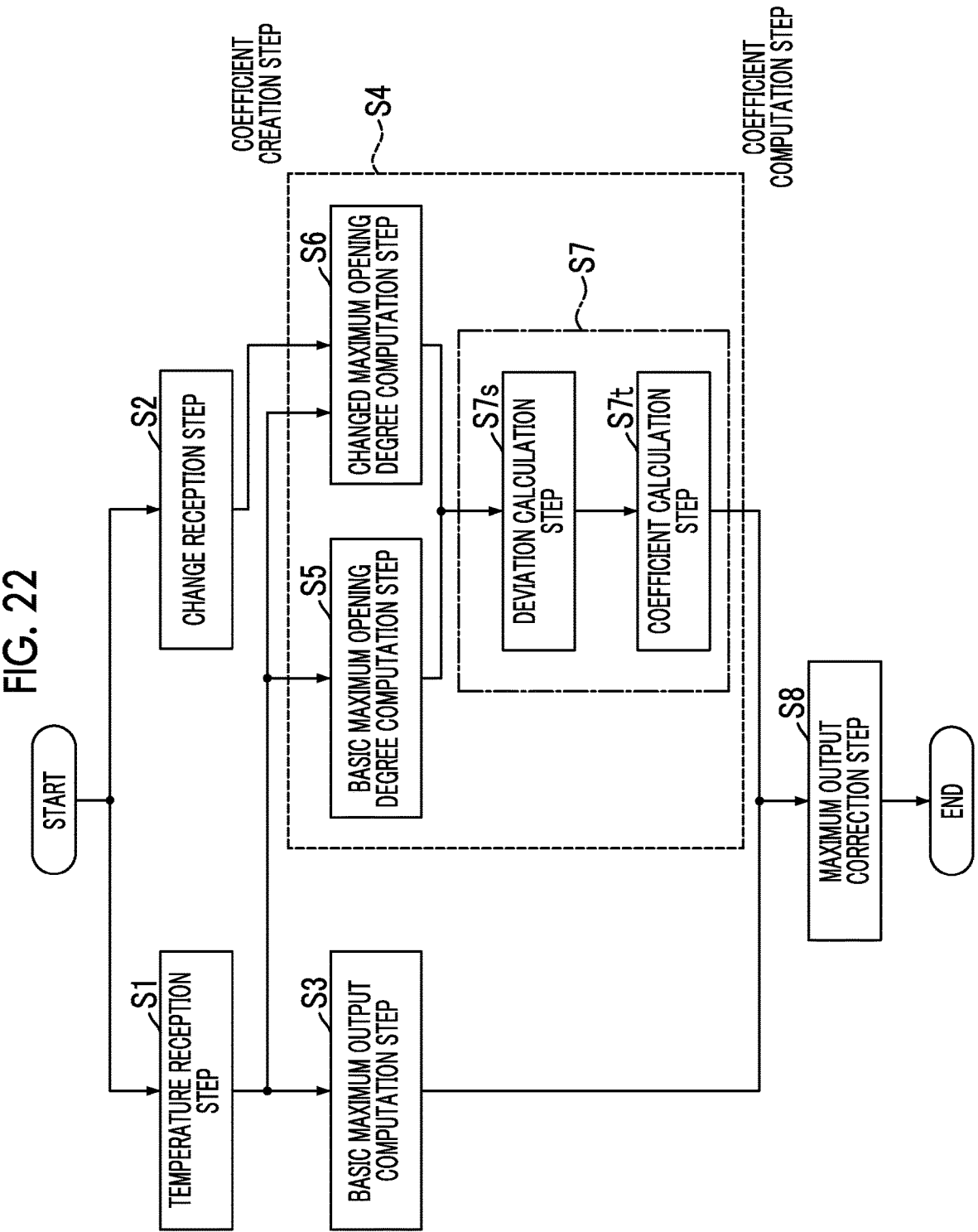
FIG. 22 is a flowchart showing operation of the maximum output creator according to one embodiment of the present disclosure.

Next, an operation sequence of the maximum output creator 171 described above will be described with reference to a flowchart shown in FIG. 22.

The temperature reception unit 172 of the maximum output creator 171 receives the intake air temperature Ti from the intake air temperature sensor 73 (temperature reception step S1). In addition, the change reception unit 173 of the maximum output creator 171 receives the function F6 that is a change content of the maximum opening degree for control in the IGV 14, from the input device 104 such as a keyboard (change reception step S2).

Figure 18:
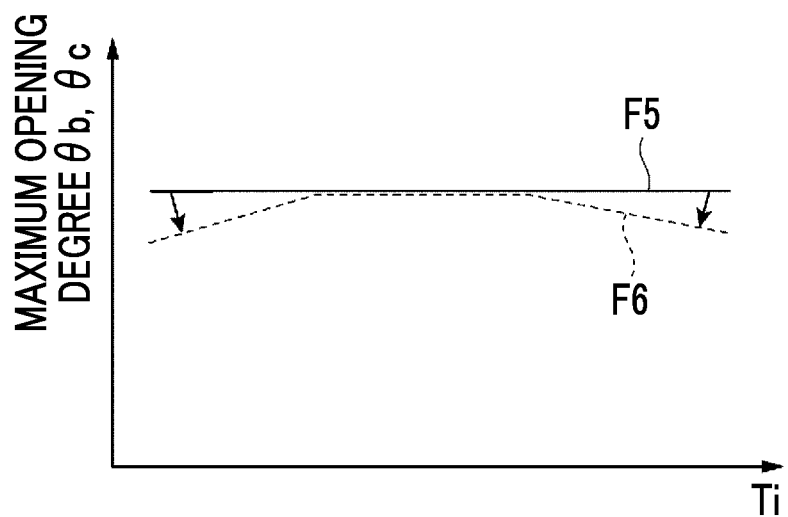
FIG. 18 is a graph for describing a function F5 and a function F6 according to one embodiment of the present disclosure.

The basic maximum output computation unit 174 of the maximum output creator 171 obtains the basic maximum opening degree θb for control corresponding to the intake air temperature Ti using the function F5 shown in FIG. 18 (basic maximum output computation step S3).

The coefficient creation unit 176 of the maximum output creator 171 creates the maximum output correction coefficient Kx for correcting the basic maximum output PWxb using the intake air temperature Ti (coefficient creation step S4). In the coefficient creation step S4, a basic maximum opening degree computation step S5, a changed maximum opening degree computation step S6, and a coefficient computation step S7 are executed.

In the basic maximum opening degree computation step S5, the basic maximum opening degree computation unit 176*b* obtains the basic maximum opening degree θb for control corresponding to the intake air temperature Ti using the function F5 (refer to FIG. 18). In the changed maximum opening degree computation step S6, the changed maximum opening degree computation unit 176*c* obtains the changed maximum opening degree θc for control corresponding to the intake air temperature Ti using the function F6 indicating the change content (refer to FIG. 18).

In the coefficient computation step S7, the correction coefficient Kx for correcting the basic maximum output PWxb is obtained. In the coefficient computation step S7, a deviation calculation step S7*s* and a coefficient calculation step S7*t* are executed. In the deviation calculation step S7*s*, the deviation calculation unit 177*s* calculates a deviation between the basic maximum opening degree θb and the changed maximum opening degree θc. In the coefficient calculation step S7*t*, the coefficient calculation unit 177*t* calculates the correction coefficient Kx corresponding to the deviation obtained by the deviation calculation unit 177s, using the function F7 shown in FIG. 19.

The maximum output correction unit 175 of the maximum output creator 171 corrects the basic maximum output PWxb using the correction coefficient Kx, and outputs the corrected basic maximum output PWxb as the maximum output PWx for control (maximum output correction step S8).

The creation of the maximum output PWx by the maximum output creator 171 is completed as described above. The above operation is executed each time the change reception unit 173 receives a change content of the maximum opening degree.

Next, an operation sequence of the output corrector 180 described above will be described with reference to flowcharts shown in FIGS. 23 and 24.

Figure 23:
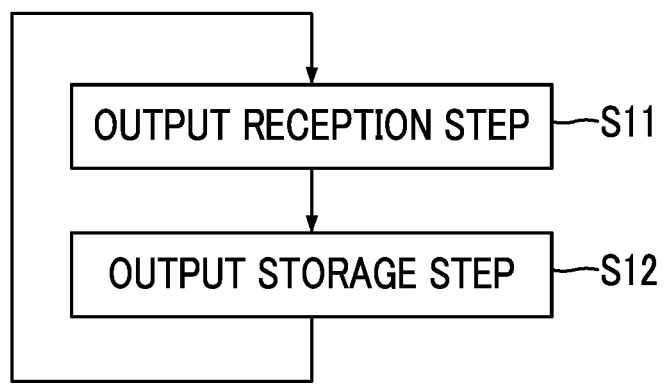
FIG. 23 is a flowchart showing a output reception routine executed by the output corrector according to one embodiment of the present disclosure.

The flowchart shown in FIG. 23 is a flowchart of an output reception routine executed by the output corrector 180. In the output reception routine, the output reception unit 181 receives an output from the input device 104 such as a keyboard or from the output meter 72 (output reception step S11). The output storage unit 182 stores the output (output storage step S12). In the output reception routine, the reference output PWb, the construction output PWc, the immediately preceding output PW1 (excluding the construction output PWc), and the current output PW2 are stored in the output storage unit 182 by repeatedly executing the output reception step S11 and the output storage step S12. Once the reference output PWb and the construction output PWc are stored in the output storage unit 182, the reference output PWb and the construction output PWc are not updated thereafter. On the other hand, once the immediately preceding output PW1 (excluding the construction output PWc) and the current output PW2 are stored in the output storage unit 182, the immediately preceding output PW1 and the current output PW2 are sequentially updated.

The flowchart shown in FIG. 24 is a flowchart of a correction routine executed by the output corrector 180. In the correction routine, a correction coefficient creation step S20 and an output correction step S25 are repeatedly executed.

The correction coefficient creation step S20 includes a first coefficient element calculation step S21a, a second coefficient element calculation step S21b, a third coefficient element calculation step S21c, a coefficient element storage step S22, a reset step S23, and a correction coefficient calculation step S24.

In the first coefficient element calculation step S21a, the first coefficient element calculation unit 184a obtains the first coefficient element e1 by dividing the immediately preceding output PW1 stored in the output storage unit 182 by reference output PWb stored in the output storage unit 182 (=PW1/PWb). However, when the first coefficient element calculation unit 184a receives a reset instruction from the input device 104 such as a keyboard or the like, the first coefficient element calculation unit 184a obtains the first coefficient element e1 by dividing the current output PW2 stored in the output storage unit 182 by the reference output PWb stored in the output storage unit 182 (=PW2/PWb).

In the second coefficient element calculation step S21b, the second coefficient element calculation unit 184b obtains the second coefficient element e2 by dividing the current output PW2 stored in the output storage unit 182 by the immediately preceding output PW1 stored in the output storage unit 182 (=PW2/PW1).

In the third coefficient element calculation step S21c, the third coefficient element calculation unit 184c obtains the third coefficient element e3 by dividing the construction output PWc stored in the output storage unit 182 by the reference output PWb stored in the output storage unit 182 (=PWc/PWb).

Essentially, the coefficient element calculation steps S21a, S21b, and S21c are not executed at the same time. The coefficient element calculation steps S21a, S21b, and S21c are executed each time the outputs to be used in the coefficient element calculation steps S21a, S21b, and S21c are stored in the output storage unit 182.

The coefficient element storage step S22 includes a first coefficient element storage step S22a, a second coefficient element storage step S22b, and a third coefficient element storage step S22c.

In the first coefficient element storage step S22a, the first coefficient element storage unit 185a stores the first coefficient element e1 calculated in the first coefficient element calculation step S21a.

In the second coefficient element storage step S22b, the second coefficient element storage unit 185b stores the second coefficient element e2 calculated in the second coefficient element calculation step S21b.

In the third coefficient element storage step S22c, the third coefficient element storage unit 185c stores the third coefficient element e3 calculated in the third coefficient element calculation step S21c.

The reset step S23 includes a reception determination step S23a and a reset execution step S23b. In the reception determination step S23a, it is determined whether or not the reset unit 186 has received a reset instruction from the input device 104 such as a keyboard. When the reset unit 186 determines that the reset instruction has been received, the reset execution step S23b is executed. In the reset execution step S23b, the reset unit 186 resets the second coefficient element e2 stored in the second coefficient element storage unit 185b, to a value that does not affect a calculation result of a correction coefficient by the correction coefficient calculation unit 187, here, to "1". The first coefficient element calculation unit 184a receives the reset instruction at the time when the reset unit 186 receives the reset instruction. As a result, as described above, the first coefficient element calculation unit 184a sets the value obtained by dividing the current output PW2 by the reference output PWb, as the first coefficient element e1 (=PW2/PWb). The first coefficient element e1 is stored in the first coefficient element storage unit 185a.

The correction coefficient calculation step S24 includes a first correction coefficient calculation step S24a and a second correction coefficient calculation step S24b.

In the first correction coefficient calculation step S24a, the first correction coefficient calculation unit 187a calculates the first correction coefficient K1. In the second correction coefficient calculation step S24b, the second correction coefficient calculation unit 187b calculates the second correction coefficient K2.

In the output correction step S25, the output correction unit 188 corrects a control output using a correction coefficient, and outputs the correction result as a correction control output. At this time, the output correction unit 188 corrects a control output with a correction coefficient corresponding to the control output of a correction target among a plurality of the correction coefficients obtained by the correction coefficient calculation unit 187. Specifically, in the output correction step S25, as described above, the first output correction unit 188a of the output correction unit 188 corrects the maximum output PWx using the first correction coefficient K1, the amplitude output FF stored in the first storage unit 188*x*, and the allowable maximum output PWpmax stored in the second storage unit 188*y*, and outputs the correction result as the correction maximum output PWxm. Further, in the output correction step S25, the second output correction unit 188*b* of the output correction unit 188 corrects each of 1500° C. MW and 700° C. MW using the first correction coefficient K1 as described above. The correction result is output as the correction 1500° C. MWm and the correction 700° C. MWm. Further, in the output correction step S25, the third output correction unit 188*c* of the output correction unit 188 corrects the actually measured output PW using the second correction coefficient K2, and outputs this correction result as the correction output PWm.

Next, changes in each coefficient element, each correction coefficient, and each correction control output over time will be described with reference to FIG. 25.

Here, it is assumed that a reference output PWb at the reference time (planning time) is 100 MW.

It is assumed that the construction output PWc, which is a measured output that the output reception unit 181 receives from the output meter 72 under a condition where the gas turbine 10 can output a maximum output during a construction trial operation, is 90 MW.

It is assumed that a measured output that the output reception unit 181 receives from the output meter 72 under a condition where the gas turbine 10 can output a maximum output during a first main operation thereafter is 80 MW.

It is assumed that a measured output that the output reception unit 181 receives from the output meter 72 under a condition where the gas turbine 10 can output a maximum output during a second main operation thereafter is 70 MW.

It is assumed that the gas turbine 10 has undergone a periodic inspection after a second main operation.

It is assumed that a measured output that the output reception unit 181 receives from the output meter 72 under a condition where the gas turbine 10 can output a maximum output during a trial operation after the periodic inspection is 80 MW. Therefore, here, as a result of the periodic inspection, the measured output (80 MW) is larger than the measured output (70 MW) during the second main operation before the periodic inspection.

It is assumed that a measured output that the output reception unit 181 receives from the output meter 72 under a condition where the gas turbine 10 can output a maximum output during a first main operation thereafter is 70 MW.

It is assumed that a measured output that the output reception unit 181 receives from the output meter 72 under a condition where the gas turbine 10 can output a maximum output during a second main operation thereafter is 65 MW.

Before the start of the construction trial operation, the correction coefficient creation unit 183 receives a reset instruction. For this reason, during the construction trial operation, the first coefficient element calculation unit 184*a* sets a value obtained by dividing the current output PW2 by the reference output PWb, as the first coefficient element e1 (=PW2/PWb). For this reason, the first coefficient element e1 becomes 9/10 (=90/100), and the first coefficient element e1 is stored in the first coefficient element storage unit 185*a*. In addition, during the construction trial operation, "1" is stored in the second coefficient element storage unit 185*b* as the second coefficient element e2 by the operation of the reset unit 186. In addition, during the construction trial operation, the third coefficient element calculation unit 184*c* sets a value obtained by dividing the construction output PWc by the reference output PWb, as the third coefficient element e3 (=PWc/PWb). For this reason, the third coefficient element e3 becomes 9/10 (=90/100), and the third coefficient element e3 is stored in the third coefficient element storage unit 185*c*. The third coefficient element e3 stored in the third coefficient element storage unit 185*c* is not updated thereafter.

As described above, as a result of determining each coefficient element during the construction trial operation, each correction coefficient during the construction trial operation is obtained. During the construction trial operation, for example, the first correction coefficient K1 (e1×e2) becomes 0.9 (=9/10×1). In addition, the second correction coefficient K2 (e1×e2÷e3) becomes 1.0 (=9/10×1÷9/10). For the sake of simplicity, values of the second correction coefficient K2 and of the second correction coefficient K2 to be described below are set to values where the coefficients are not adjusted by the correction coefficient adjustor 187*u*.

For this reason, during the construction trial operation, when 1500° C. MW that is one type of control output is 100 MW, the correction 1500° C. MWm obtained using the first correction coefficient K1 becomes 90 MW (=100×0.9). In addition, when the measured output PW that is one type of control output is 90 MW, the correction output PWm obtained using the second correction coefficient K2 becomes 90 MW (90÷1.0).

During the first main operation after the construction trial operation, unlike during the construction trial operation, the first coefficient element calculation unit 184*a* sets a value obtained by dividing the immediately preceding output PW1 by the reference output PWb, as the first coefficient element e1 (=PW2/PWb). For this reason, the first coefficient element e1 becomes 9/10 (=90/100), and the first coefficient element e1 is stored in the first coefficient element storage unit 185*a*. During the first main operation, the second coefficient element calculation unit 184*b* sets a value obtained by dividing the current output PW2 by the immediately preceding output PW1, as the second coefficient element e2 (=PW2/PW1). For this reason, the second coefficient element e2 becomes 8/9 (=80/90), and the second coefficient element e2 is stored in the second coefficient element storage unit 185*b*. As described above, the third coefficient element e3 stored in the third coefficient element storage unit 185*c* does not change even when a transition is made from the construction trial operation to the first main operation.

As described above, as a result of determining each coefficient element during the first main operation, each correction coefficient during the first main operation is obtained. During the first main operation, the first correction coefficient K1 (e1×e2) becomes 0.8 (=9/10×8/9). In addition, the second correction coefficient K2 (e1×e2÷e3) becomes 0.89 (=9/10×8/9÷9/10).

For this reason, during the first main operation, when 1500° C. MW that is one type of control output is 100 MW, the correction 1500° C. MWm obtained using the first correction coefficient K1 becomes 80 MW (=100×0.8). In addition, when the measured output PW that is one type of control output is 80 MW, the correction output PWm obtained using the second correction coefficient K2 becomes 90 MW (80÷0.89).

During the second main operation after the first main operation, similarly to the first main operation, the first coefficient element calculation unit 184*a* and the second coefficient element calculation unit 184*b* obtain the coefficient elements. For this reason, the first coefficient element e1 (=PW2/PWb) becomes 8/10 (=80/100), and the first coefficient element e1 is stored in the first coefficient element storage unit 185*a*. In addition, the second coefficient element e2 (=PW2/PW1) becomes 7/8 (=70/80), and the second coefficient element e2 is stored in the second coefficient element storage unit 185b.

As described above, as a result of determining each coefficient element during the second main operation, each correction coefficient during the second main operation is obtained. During the second main operation, the first correction coefficient K1 (e1×e2) becomes 0.7 (=8/10×7/8). In addition, the second correction coefficient K2 (e1×e2÷e3) becomes 0.78 (=8/10×7/8÷9/10).

For this reason, during the second main operation, when 1500° C. MW that is one type of control output is 100 MW, the correction 1500° C. MWm obtained using the first correction coefficient K1 becomes 70 MW (=100×0.7). In addition, when the measured output PW that is one type of control output is 70 MW, the correction output PWm obtained using the second correction coefficient K2 becomes 90 MW (70÷0.78).

When the second main operation ends, as described above, a periodic inspection is performed.

Before the start of a trial operation after the periodic inspection, the correction coefficient creation unit 183 receives a reset instruction. For this reason, during the trial operation after the periodic inspection, the first coefficient element calculation unit 184a sets a value obtained by dividing the current output PW2 by the reference output PWb, as the first coefficient element e1 (=PW2/PWb). For this reason, the first coefficient element e1 becomes 8/10 (=80/100), and the first coefficient element e1 is stored in the first coefficient element storage unit 185a. In addition, during the trial operation, "1" is stored in the second coefficient element storage unit 185b as the second coefficient element e2 by the operation of the reset unit 186.

As described above, as a result of determining each coefficient element during the trial operation, each correction coefficient during the trial operation is obtained. During the trial operation, the first correction coefficient K1 (e1×e2) becomes 0.8 (=80/10×1). In addition, the second correction coefficient K2 (e1×e2÷e3) becomes 0.89 (=8/10×1÷9/10).

For this reason, during the trial operation, when 1500° C. MW that is one type of control output is 100 MW, the correction 1500° C. MWm obtained using the first correction coefficient K1 becomes 80 MW (=100×0.8). In addition, when the measured output PW that is one type of control output is 70 MW, the correction output PWm obtained using the second correction coefficient K2 becomes 79 MW (70÷0.89).

During the first main operation after the preceding trial operation, unlike during the preceding trial operation, the first coefficient element calculation unit 184a sets a value obtained by dividing the immediately preceding output PW1 by the reference output PWb, as the first coefficient element e1 (=PW2/PWb). For this reason, the first coefficient element e1 becomes 8/10 (=80/100), and the first coefficient element e1 is stored in the first coefficient element storage unit 185a. During the first main operation, the second coefficient element calculation unit 184b sets a value obtained by dividing the current output PW2 by the immediately preceding output PW1, as the second coefficient element e2 (=PW2/PW1). For this reason, the second coefficient element e2 becomes 7/8 (=70/80), and the second coefficient element e2 is stored in the second coefficient element storage unit 185b.

As described above, as a result of determining each coefficient element during the first main operation, each correction coefficient during the first main operation is obtained. During the first main operation, the first correction coefficient K1 (e1×e2) becomes 0.7 (=8/10×7/8). In addition, the second correction coefficient K2 (e1×e2÷e3) becomes 0.78 (=8/10×7/8÷9/10).

For this reason, during the first main operation, when 1500° C. MW that is one type of control output is 100 MW, the correction 1500° C. MWm obtained using the first correction coefficient K1 becomes 70 MW (=100×0.7). In addition, when the measured output PW that is one type of control output is 70 MW, the correction output PWm obtained using the second correction coefficient K2 becomes 90 MW (70÷0.78).

During the second main operation after the first main operation, similarly to the first main operation, the first coefficient element calculation unit 184a and the second coefficient element calculation unit 184b obtain the coefficient elements. For this reason, the first coefficient element e1 (=PW2/PWb) becomes 7/10 (=70/100). In addition, the second coefficient element e2 (=PW2/PW1) becomes 6.5/7 (=65/70).

During the second main operation, the first correction coefficient K1 (e1×e2) becomes 0.65 (=7/10×65/70). In addition, the second correction coefficient K2 (e1×e2÷e3) becomes 0.72 (=7/10×65/70÷9/10). In addition, when 1500° C. MW that is one type of control output is 100 MW, the correction 1500° C. MWm obtained using the first correction coefficient K1 becomes 65 MW (=100×0.65). In addition, when the measured output PW that is one type of control output is 65 MW, the correction output PWm obtained using the second correction coefficient K2 becomes 90 MW (65÷0.72).

As described above, the output corrector 180 of the control device 100 corrects the control output based on the degree of degradation of the output caused by a degradation in performance of the gas turbine.

When the first coefficient element calculation unit 184a in the present embodiment receives a reset instruction during a period between when the gas turbine 10 is completely stopped and when a trial operation is started, as described above, during the trial operation, the first coefficient element calculation unit 184a calculates the first coefficient element e1 using the current output PW2 in the current time period instead of using the immediately preceding output PW1 in the immediately preceding time period. In addition, when the reset unit 186 in the present embodiment receives the reset instruction during the period between when the gas turbine 10 is completely stopped and when the trial operation is started, the reset unit 186 resets the second coefficient element e2 stored in the coefficient element storage unit 185, to a value that does not affect a calculation result of a correction coefficient by the correction coefficient calculation unit 187, specifically, to "1".

If a periodic inspection has been performed before a trial operation and the performance of the gas turbine has been improved by the periodic inspection, even when the first coefficient element e1 and the second coefficient element e2 are calculated using the immediately preceding output PW1 in the immediately preceding time period before the trial operation, the first coefficient element e1 and the second coefficient element e2 do not appropriately represent the degree of degradation of the output. For this reason, as described above, when the first coefficient element calculation unit 184a in the present embodiment receives a reset instruction, the first coefficient element calculation unit 184a calculates the first coefficient element e1 using the current output PW2 in the current time period. Further, when the reset unit 186 in the present embodiment receives the reset instruction, the reset unit 186 resets the second coefficient element e2 stored in the coefficient element storage unit 185, to a value that does not affect a calculation result of a correction coefficient by the correction coefficient calculation unit 187.

Therefore, in the present embodiment, even when the trial operation is started from a state where the gas turbine 10 is completely stopped, it is possible to obtain a correction control output that appropriately reflects the degree of degradation of the output.

Figure 26:
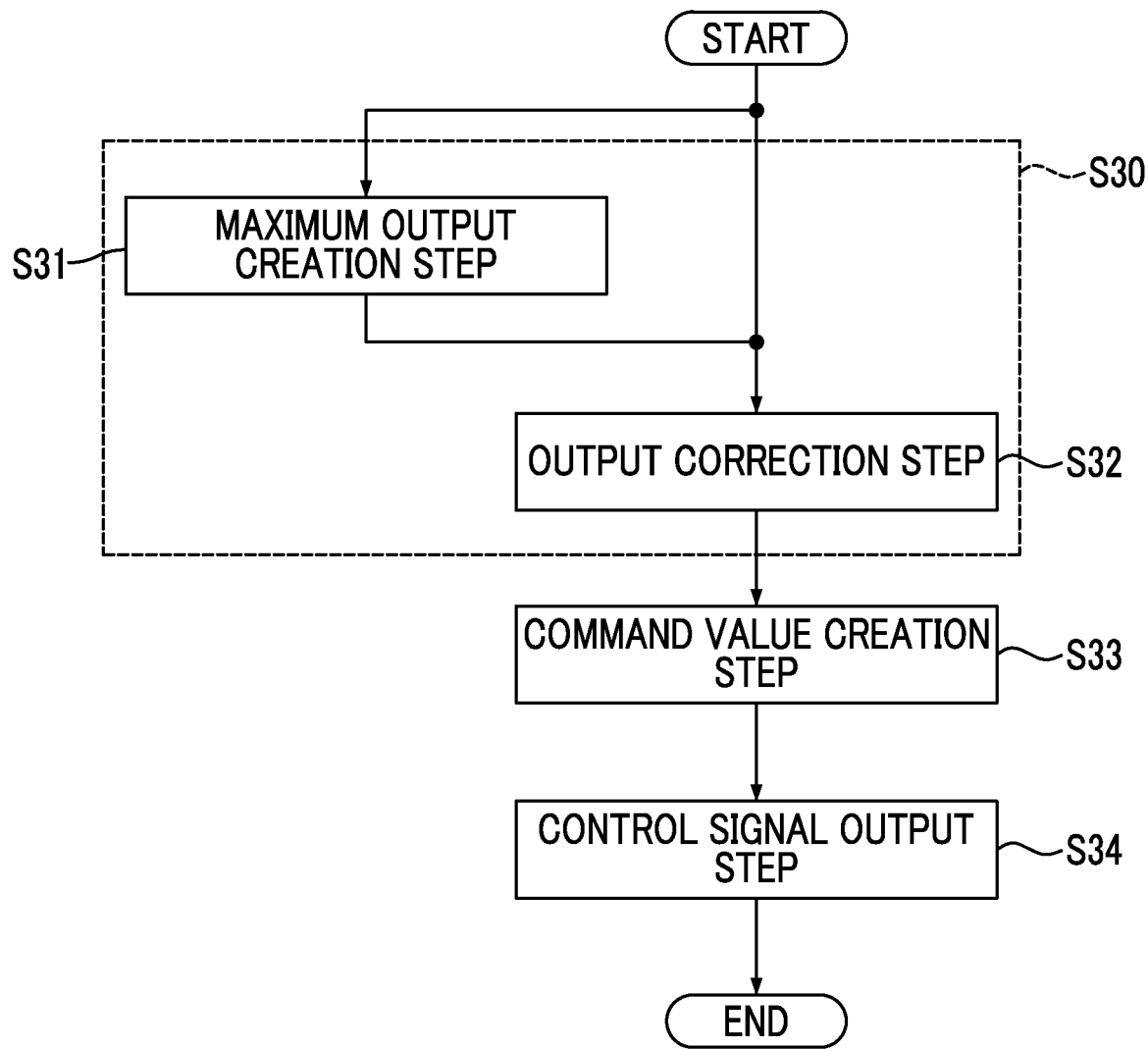
FIG. 26 is a flowchart showing operation of the control device according to one embodiment of the present disclosure.

Next, an overall operation of the control device 100 will be described with reference to a flowchart shown in FIG. 26.

As described above, the control output creator 170 of the control device 100 creates a control output (control output creation step S30). In the control output creation step S30, a maximum output creation step S31 and an output correction step S32 are executed.

In the maximum output creation step S31, as described above, when the maximum output creator 171 receives a change content of the maximum opening degree for control in the IGV 14, the maximum output creator 171 creates the maximum output PWx for control corresponding to the change content.

In the output correction step S32, as described above, the output corrector 180, corrects the control output based on the degree of degradation of an output caused by a degradation in performance of the gas turbine. As a result, in the present embodiment, the correction output PWm, the correction 1500° C. MWm, the correction 700° C. MWm, and the correction maximum output PWxm are obtained as the correction control outputs.

The command value creation unit 110 of the control device 100 creates a command value for a control target of the gas turbine 10 using the correction control output obtained in the execution of the output correction step S32 (command value creation step S33).

Specifically, the combustion load command generator 120 creates the combustion load command CLCSO using the correction 1500° C. MWm and the correction 700° C. MWm. The fuel flow rate command generator 130 generates the fuel flow rate command value (total fuel flow rate command value) CSO using the correction maximum output PWxm and the like. The load factor computation unit 140 obtains a load factor (% Load) using the correction maximum output PWxm and the measured output PW. The flow rate ratio calculator 150 obtains the pilot ratio PLr and the top hat ratio THr using the combustion load command CLCSO and the load factor (% Load). The valve command value creator 155 creates a command value for each of the fuel valves 65, 66, and 67 using the pilot ratio PLr and the top hat ratio THr from the flow rate ratio calculator 150 and the total flow rate of the fuel, which is indicated by the fuel flow rate command value CSO, from the fuel flow rate command generator 130. The IGV command value creator 160 creates the IGV command value IGVc using the correction output PWm.

The control signal output unit 190 of the control device 100 outputs a control signal indicating the command value to the control target (control signal output step S34). The control signal output unit 190 creates a control signal for each of a plurality of the fuel valves 65, 66, and 67 based on the command value for each of the plurality of fuel valves 65, 66, and 67 created by the valve command value creator 155, and outputs each control signal to one of the fuel valves 65, 66, and 67. In addition, the control signal output unit 190 creates a control signal based on the IGV command value IGVc created by the IGV command value creator 160, and outputs the control signal to the IGV 14.

As described above, in the present embodiment, the change content of the maximum opening degree of the IGV 14 can be received. Further, in the present embodiment, the maximum output for control of the gas turbine is corrected based on the change content and the intake air temperature. For this reason, in the present embodiment, even when the setting of the maximum opening degree is changed, it is possible to suppress a control failure of the gas turbine without causing a decrease in the life span of the gas turbine or a decrease in the output.

In addition, in the present embodiment, the control output is corrected according to the degree of degradation of an output caused by a degradation in performance of the gas turbine. For this reason, in the present embodiment, even if the performance of the gas turbine degrades, it is possible to suppress a control failure.

Particularly, in the present embodiment, the correction coefficient is obtained using a plurality of the coefficient elements e1, e2, and e3. The correction coefficient is a value indicating the degree of degradation of the output caused by a degradation in performance of the gas turbine. In addition, each of the plurality of coefficient elements e1, e2, and e3 is also a value indicating the degree of degradation of the output caused by a degradation in performance of the gas turbine. However, the plurality of coefficient elements e1, e2, and e3 indicate the degrees of degradation of the output in different time periods. In the present embodiment, correction coefficients are obtained using the plurality of coefficient elements e1, e2, and e3 that are different from each other, and the control output is corrected with the correction coefficients. Therefore, in the present embodiment, it is possible to obtain a correction control output that appropriately reflects the degree of degradation of the output.

Modification Examples

As described with reference to FIG. 10, the coefficient computation unit 177 of the maximum output creator 171 in the above embodiment includes the deviation calculation unit 177s that calculates a deviation between the basic maximum opening degree θb and the changed maximum opening degree θc, and the coefficient calculation unit 177t that calculates the correction coefficient Kx corresponding to the deviation obtained by the deviation calculation unit 177s. However, the coefficient computation unit may obtain the correction coefficient Kx in another form.

Figure 27:
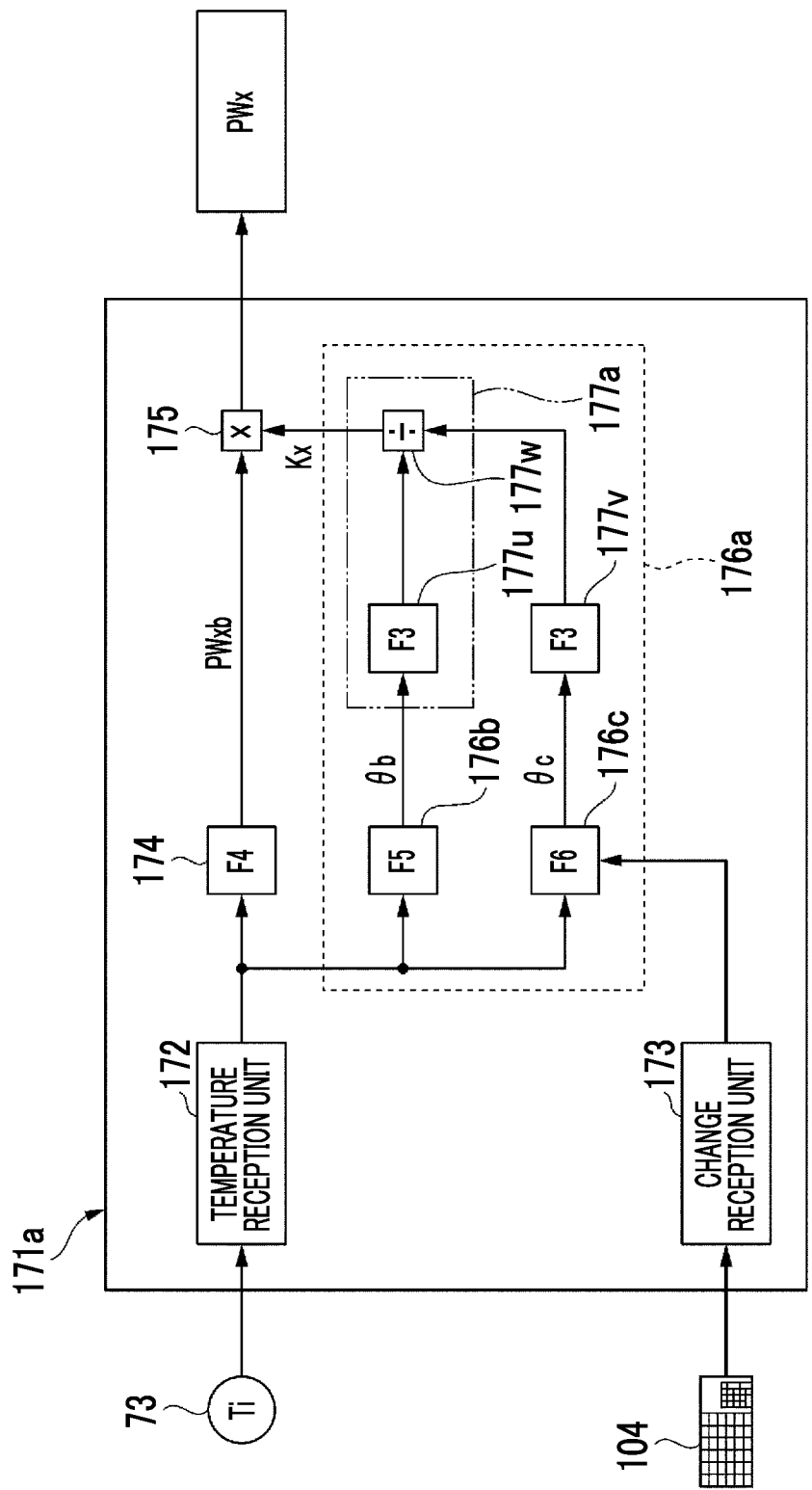
FIG. 27 is a functional block diagram of a maximum output creator according to a first modification example of one embodiment of the present disclosure.
Figure 28:
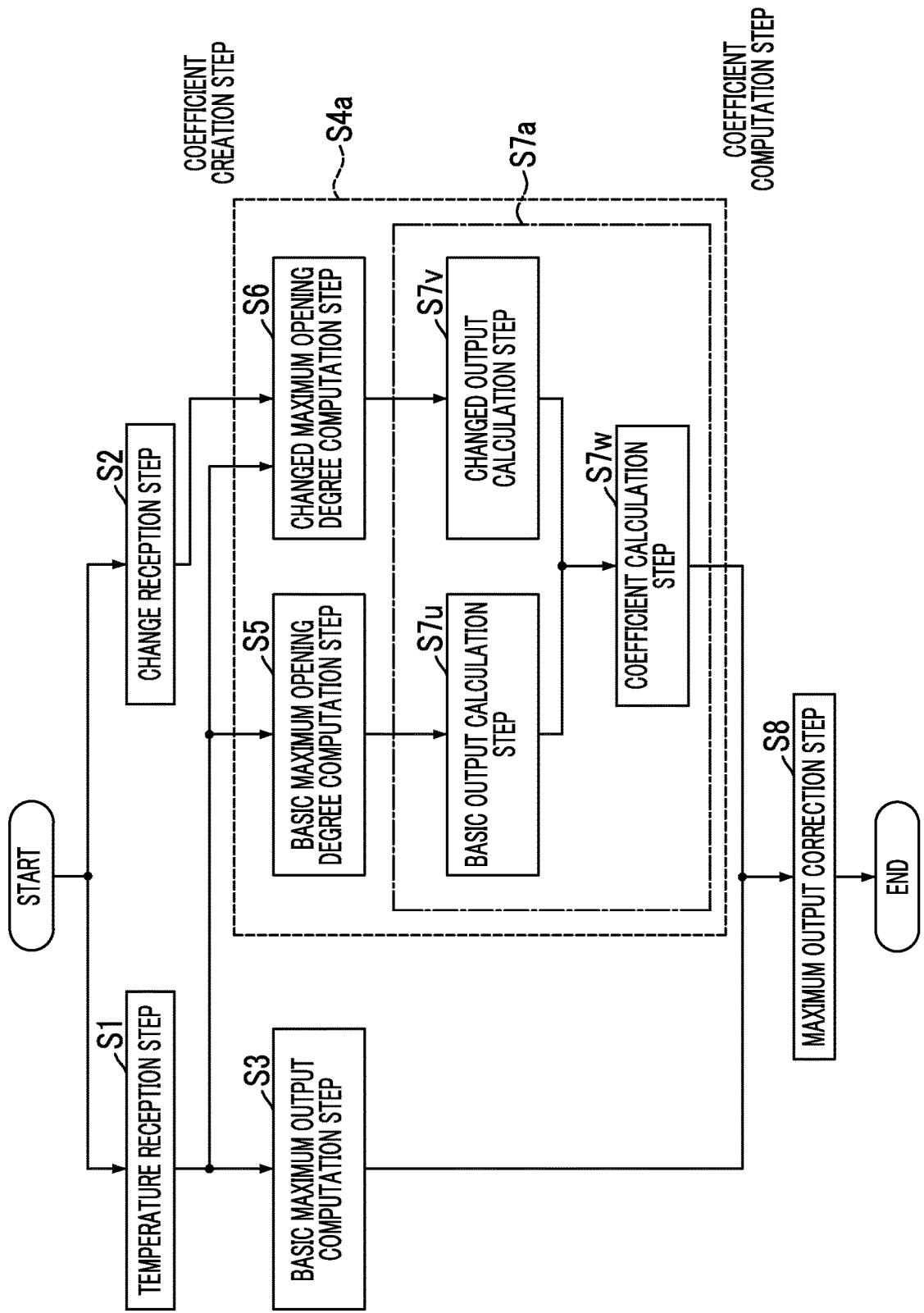
FIG. 28 is a flowchart showing operation of the maximum output creator according to a first modification example of one embodiment of the present disclosure.

Specifically, as shown in FIG. 27, a coefficient computation unit 177a of a maximum output creator 171a may include a basic output calculation unit 177u, a changed output calculation unit 177v, and a coefficient calculation unit 177w. The coefficient computation unit 177a executes a coefficient computation step S7a in a flowchart shown in FIG. 28. The basic output calculation unit 177u has the function F3 shown in FIG. 16, and calculates an output corresponding to the basic maximum opening degree θb obtained by the basic maximum opening degree computation unit 176b, using the function F3 (basic output calculation step S7u). The changed output calculation unit 177v also has the function F3 shown in FIG. 16, and calculates an output corresponding to the changed maximum opening degree θc obtained by the changed maximum opening degree computation unit 176c, using the function F3 (changed output calculation step S7v). The coefficient calculation unit 177w outputs a ratio of the output calculated by the changed output calculation unit 177v to the output calculated by the basic output calculation unit 177u as the correction coefficient Kx. Namely, the coefficient calculation unit 177w divides the output calculated by the changed output calculation unit 177v by the output calculated by the basic output calculation unit 177u to the output calculated by the basic output calculation unit 177u, and outputs the division result as the correction coefficient Kx (coefficient calculation step S7w).

Figure 29:
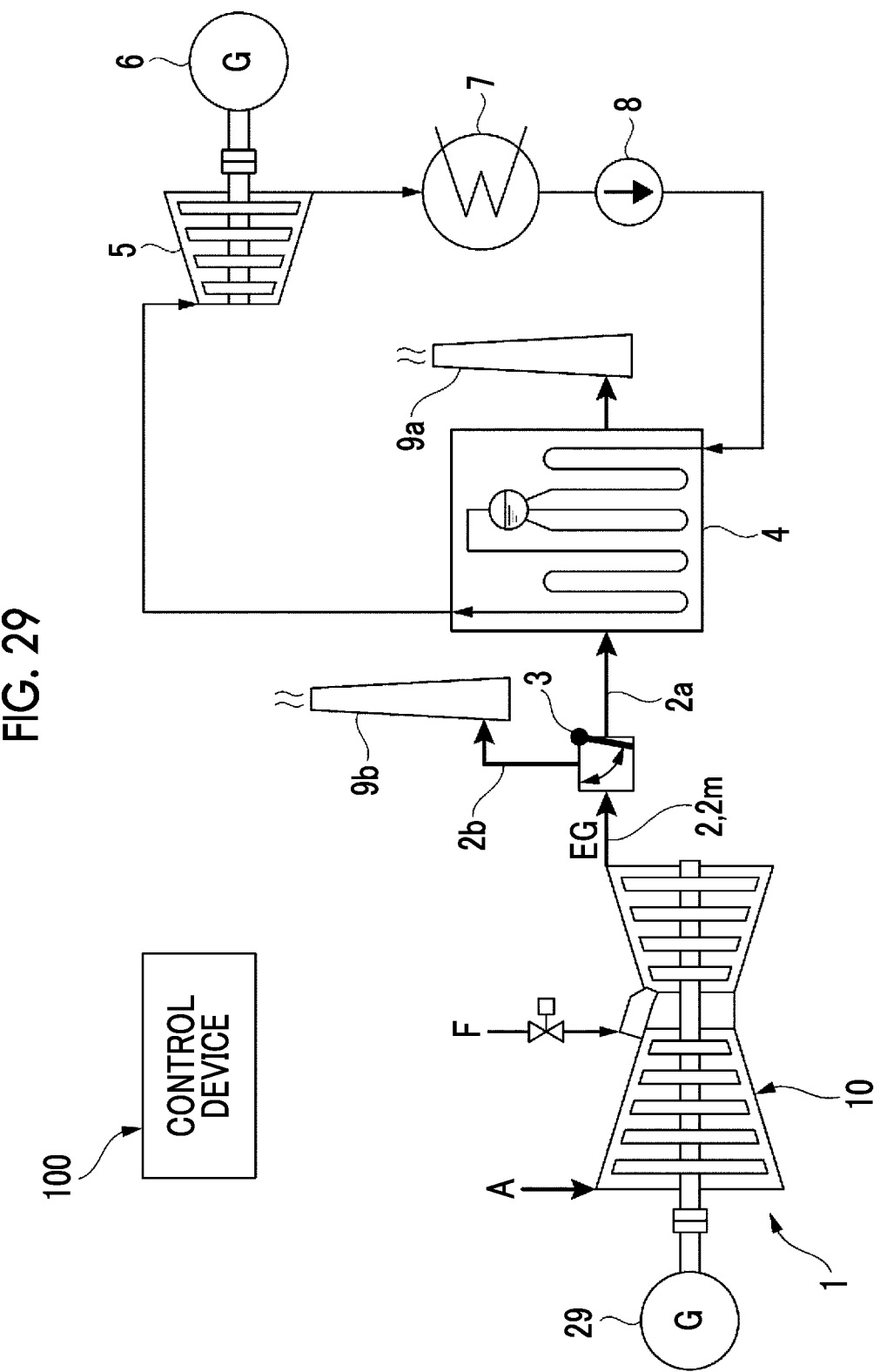
FIG. 29 is a system diagram of a combined cycle plant according to one embodiment of the present disclosure.

The gas turbine equipment described above may be incorporated into a combined cycle plant. As shown in FIG. 29, in addition to gas turbine equipment 1, the combined cycle plant includes a flue gas duct 2, a switching damper 3, a heat recovery steam generator 4, a steam turbine 5, a steam turbine generator 6, a condenser 7, a pump 8, a first chimney 9a, and a second chimney 9b.

As described above, the gas turbine equipment 1 includes the gas turbine 10; the gas turbine generator 29 that generates electricity through driving of the gas turbine 10; and the control device 100 that controls control targets in the gas turbine 10. The flue gas duct 2 includes a main flue gas duct 2m through which exhaust gas EG exhausted from the gas turbine 10 flows, and a first flue gas duct 2a and a second flue gas duct 2b branching from the main flue gas duct 2m. The switching damper 3 is provided at a position where the first flue gas duct 2a and the second flue gas duct 2b branch from the main flue gas duct 2m. The switching damper 3 guides the exhaust gas EG that has flowed through the main flue gas duct 2m, to one flue gas duct of the first flue gas duct 2a and the second flue gas duct 2b. The heat recovery steam generator 4 is connected to the first flue gas duct 2a. The heat recovery steam generator 4 generates steam using heat of the exhaust gas EG that has passed through the main flue gas duct 2m and through the first flue gas duct 2a. The steam turbine 5 is driven by the steam from the heat recovery steam generator 4. The steam turbine generator 6 generates electricity through the driving of the steam turbine 5. The condenser 7 converts the steam exhausted from the steam turbine 5 into water. The pump 8 delivers the water from the condenser 7 to the heat recovery steam generator 4. The first chimney 9a is connected to the heat recovery steam generator 4. The second chimney 9b is connected to the second flue gas duct 2b.

The combined cycle plant is operated in two operation modes. Of the two operation modes, one is a combined cycle mode, and the other is a simple cycle mode. In the combined cycle mode, the generation of electricity by the gas turbine generator 29 is executed by driving the gas turbine 10. Further, in the combined cycle mode, the exhaust gas EG from the gas turbine 10 is guided to the heat recovery steam generator 4 via the main flue gas duct 2m and via the first flue gas duct 2a, and the steam turbine 5 is driven by the steam from the heat recovery steam generator 4, so that the generation of electricity by the steam turbine generator 6 is executed. Namely, the combined cycle mode is a mode in which the generation of electricity by the gas turbine generator 29 and the generation of electricity by the steam turbine generator 6 are executed. In the simple cycle mode, the generation of electricity by the gas turbine generator 29 is executed by driving the gas turbine 10. However, in the simple cycle mode, the exhaust gas EG from the gas turbine 10 is exhausted from the second chimney 9b through the main flue gas duct 2m and through the second flue gas duct 2b instead of being guided to the heat recovery steam generator 4. Namely, the simple cycle mode is a mode in which the generation of electricity by the steam turbine generator 6 is not executed and only the generation of electricity by the gas turbine generator 29 is executed.

A pressure loss of the exhaust gas EG when the combined cycle mode is executed and a pressure loss of the exhaust gas EG when the simple cycle mode is executed are different from each other. When the simple cycle mode is executed, the exhaust gas EG exhausted from the gas turbine 10 is exhausted from the second chimney 9b through the main flue gas duct 2m and through the second flue gas duct 2b. When the combined cycle mode is executed, the exhaust gas EG exhausted from the gas turbine 10 is exhausted from the first chimney 9a through the main flue gas duct 2m, through the first flue gas duct 2a, and through the heat recovery steam generator 4. For this reason, resistance received by the exhaust gas EG until the exhaust gas EG from the gas turbine 10 is exhausted from the first chimney 9a is larger when the combined cycle mode is executed than when the simple cycle mode is executed. Therefore, the pressure loss of the exhaust gas EG when the combined cycle mode is executed is larger than the pressure loss of the exhaust gas EG when the simple cycle mode is executed. In other words, the pressure loss of the exhaust gas EG when the simple cycle mode is executed is smaller than the pressure loss of the exhaust gas EG when the combined cycle mode is executed.

If intake air pressures in the execution of the two modes are the same, a pressure drop inside the gas turbine 10 is larger in a mode in which the pressure of the exhaust gas EG at a gas turbine outlet is lower, so that the gas turbine output increases. As described above, since the pressure loss of the exhaust gas EG when the simple cycle mode is executed is smaller than the pressure loss of the exhaust gas EG when the combined cycle mode is executed, the pressure of the exhaust gas EG at the gas turbine outlet is lower when the simple cycle mode is executed than when the combined cycle mode is executed. Therefore, a gas turbine output when the simple cycle mode is executed is higher than a gas turbine output when the combined cycle mode is executed.

As described above, since the gas turbine output when the combined cycle mode is executed and the gas turbine output when the simple cycle mode is executed are different from each other, it is preferable that the maximum output for control is changed when the mode is switched.

Figure 30:
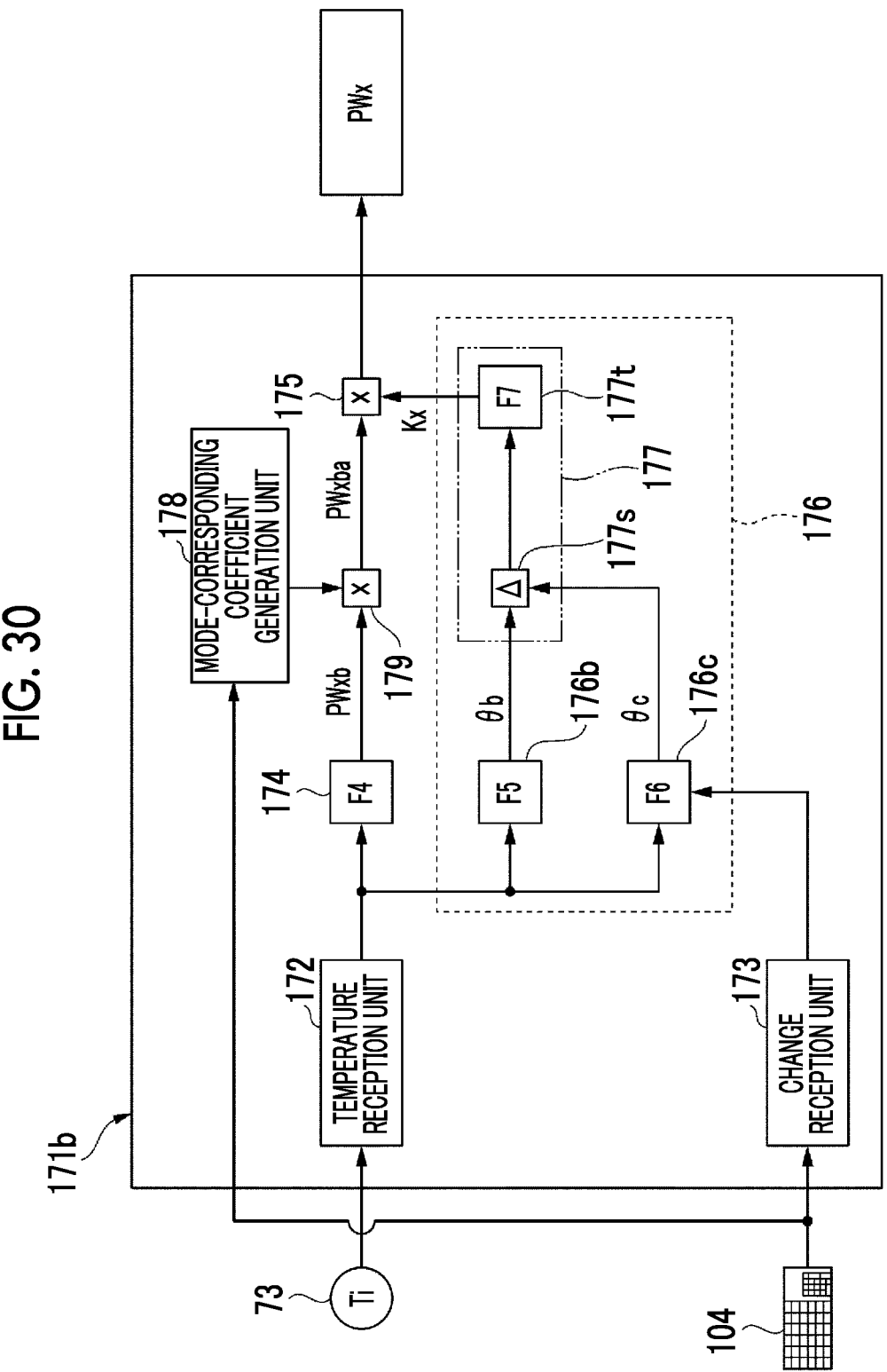
FIG. 30 is a functional block diagram of a maximum output creator according to a second modification example of one embodiment of the present disclosure.

Therefore, as shown in FIG. 30, it is preferable that a maximum output generator 171b in the control device 100 of the combined cycle plant is configured by adding a mode-corresponding coefficient generation unit 178 and a mode-corresponding correction unit 179 to the maximum output creator 171 shown in FIG. 10 or to the maximum output creator 171a shown in FIG. 27.

The mode-corresponding coefficient generation unit 178 has a coefficient when the combined cycle mode is executed, and a coefficient when the simple cycle mode is executed. If the function F4 of the basic maximum output computation unit 174 defines a relationship between the intake air temperature Ti and the maximum output PWx for control of the gas turbine when the combined cycle mode is executed, for example, a coefficient when the combined cycle mode is executed is set to 1.0, and a coefficient when the simple cycle mode is executed is set to 1.1. When instruction for the execution of one mode of the combined cycle mode and the simple cycle mode is sent from the input device 104 such as a keyboard, the mode-corresponding coefficient generation unit 178 outputs a coefficient corresponding to the indicated mode.

The mode-corresponding correction unit 179 corrects the basic maximum output PWxb by multiplying the basic maximum output PWxb from the basic maximum output computation unit 174 by the coefficient from the mode-corresponding coefficient generation unit 178, and outputs the correction result as the basic maximum output PWxba.

The maximum output correction unit 175 corrects the basic maximum output PWxba using the correction coefficient Kx.

As described above, a control failure caused by a mode change in the combined cycle plant can be suppressed by correcting the basic maximum output PWxb with the mode change.

In the above embodiment, as examples of the control outputs as correction targets, the measured output PW, 1500° C. MW, 700° C. MW, and the maximum output PWx are provided. However, another control output may be used as a control output as a correction target.

In the above embodiment, the measured output PW is provided as an example of the control output corrected using the second correction coefficient K2. However, in a case where a relationship between the correction control output, which is the correction result of the control output, and the command value changes during the construction trial operation, a correction control output may be obtained by correcting a control output other than the measured output PW with the second correction coefficient K2.

Supplemental Notes

For example, a maximum output creator 171 for a gas turbine 10 in the above embodiment is understood as follows.

(1) According to a first aspect, there is provided a maximum output creator for a gas turbine 10 which includes a compressor 11 that compresses air to generate compressed air, a combustor 31 that combusts fuel in the compressed air to generate combustion gas, and a turbine 21 to be driven by the combustion gas, and in which the compressor 11 includes an intake air amount regulator 14 that regulates a flow rate of the air suctioned by the compressor.

The maximum output creator 171 includes: a temperature reception unit 172 that receives an intake air temperature which is a temperature of the air suctioned by the compressor 11; a change reception unit 173 that receives a change content of a maximum opening degree of the intake air amount regulator 14; a basic maximum output computation unit 174 that obtains a basic maximum output PWxb of the gas turbine 10 based on the intake air temperature received by the temperature reception unit 172; a coefficient creation unit 176 or 176a that creates a maximum output correction coefficient Kx for correcting the basic maximum output PWxb based on the change content of the maximum opening degree received by the change reception unit 173 and on the intake air temperature received by the temperature reception unit 172; and a maximum output correction unit 175 that corrects the basic maximum output PWxb using the maximum output correction coefficient Kx, and that outputs the corrected basic maximum output PWxb as a maximum output PWx for control.

In this aspect, the change content of the maximum opening degree of the intake air amount regulator 14 can be received. Further, in this aspect, the maximum output for control of the gas turbine 10 is corrected based on the change content and the intake air temperature. For this reason, in this aspect, even when the setting of the maximum opening degree for control is changed, it is possible to suppress a control failure of the gas turbine 10 without causing a decrease in the life span of the gas turbine 10 or a decrease in the output.

(2) According to the maximum output creator for a gas turbine 10 in a second aspect, in the maximum output creator 171 for a gas turbine 10 according to the first aspect, the change reception unit 173 receives a changed relationship F6 that is a relationship between a changed maximum opening degree of the intake air amount regulator 14 and the intake air temperature. The coefficient creation unit 176 includes a basic maximum opening degree computation unit 176b that obtains a basic maximum opening degree corresponding to the intake air temperature received by the temperature reception unit 172, using a basic relationship F5 that is a relationship between the basic maximum opening degree of the intake air amount regulator 14 and the intake air temperature determined in advance, a changed maximum opening degree computation unit 176c that obtains the changed maximum opening degree corresponding to the intake air temperature received by the temperature reception unit 172, using the changed relationship F6 received by the change reception unit 173, and a coefficient computation unit 177 or 177a that obtains the maximum output correction coefficient Kx using the basic maximum opening degree obtained by the basic maximum opening degree computation unit 176b and the changed maximum opening degree obtained by the changed maximum opening degree computation unit 176c.

(3) According to the maximum output creator for a gas turbine 10 in a third aspect, in the maximum output creator 171 for a gas turbine 10 according to the second aspect, the coefficient computation unit 177 includes a deviation calculation unit 177s that calculates a deviation between the basic maximum opening degree obtained by the basic maximum opening degree computation unit 176b and the changed maximum opening degree obtained by the changed maximum opening degree computation unit 176c, and a coefficient calculation unit 177t that calculates the maximum output correction coefficient Kx corresponding to the deviation calculated by the deviation calculation unit 177s, using a relationship between the deviation and the maximum output correction coefficient determined in advance.

(4) According to the maximum output creator for a gas turbine 10 in a fourth aspect, in the maximum output creator 171 for a gas turbine 10 according to the second aspect, the coefficient computation unit 177a includes a basic output calculation unit 177u that calculates an output of the gas turbine 10 corresponding to the basic maximum opening degree obtained by the basic maximum opening degree computation unit 176b, a changed output calculation unit 177v that calculates an output of the gas turbine 10 corresponding to the changed maximum opening degree obtained by the changed maximum opening degree computation unit 176c, and a coefficient calculation unit 177w that outputs a ratio of the output calculated by the changed output calculation unit 177v to the output calculated by the basic output calculation unit 177u as the maximum output correction coefficient Kx.

For example, a control output creator 170 for a gas turbine 10 in the above embodiment is understood as follows.

(5) According to a fifth aspect, there is provided a control output creator for a gas turbine 10, the creator including: the maximum output creator 171 for the gas turbine 10 according to any one of the first to fourth aspects; and an output corrector 180 that corrects a control output of the gas turbine 10. The output corrector 180 includes a correction coefficient creation unit 183 that creates a correction coefficient to be used when the control output is corrected, an output correction unit 188 that corrects the control output using the correction coefficient, and that outputs the corrected control output as a correction control output, an output reception unit 181 that receives at least an output from an output meter 72 that detects an output of the gas turbine 10, and an output storage unit 182 that stores the output received by the output reception unit 181. The correction coefficient creation unit 183 includes a first coefficient element calculation unit 184a that calculates a first coefficient element e1, a second coefficient element calculation unit 184b that calculates a second coefficient element e2, and a correction coefficient calculation unit 187 that calculates the correction coefficient using the first coefficient element e1 and the second coefficient element e2. The output storage unit 182 stores a reference output PWb that is an output under a condition where the gas turbine 10 outputs a maximum output at a reference time in the past, and an immediately preceding output PW1 that the output reception unit 181 receives under a condition where the gas turbine 10 outputs a maximum output in an immediately preceding time period closer to a current time than to the reference time. The first coefficient element e1 is a ratio of the immediately preceding output PW1 stored in the output storage unit 182 to the reference output PWb stored in the output storage unit 182. The second coefficient element e2 is a ratio of a current output PW2 that the output reception unit 181 receives under a condition where the gas turbine 10 outputs a maximum output in a current time period between the immediately preceding time period and the current time, to the immediately preceding output PW1 stored in the output storage unit 182. The output corrector 180 corrects the maximum output PWx for control output from the maximum output creator 171, as one control output.

In this aspect, the correction coefficient is obtained using the first coefficient element e1 and the second coefficient element e2. The correction coefficient is a value indicating the degree of degradation of the output caused by a degradation in performance of the gas turbine. In addition, the first coefficient element e1 and the second coefficient element e2 are also values indicating the degrees of degradation of the output caused by a degradation in performance of the gas turbine. However, the first coefficient element e1 and the second coefficient element e2 indicate the degrees of degradation of the output in different time periods. Specifically, the first coefficient element e1 indicates a degradation in output from the reference time to the immediately preceding time period, and the second coefficient element e2 indicates a degradation in output from the immediately preceding time period to the current time period. As described above, in this aspect, the correction coefficient is obtained using a plurality of the coefficient elements that are different from each other, and the control output is corrected with the correction coefficient.

Therefore, in this aspect, it is possible to obtain the correction control output that appropriately reflects the degree of degradation of the output.

(6) According to the control output creator for a gas turbine 10 in a sixth aspect, in the control output creator 170 for a gas turbine 10 according to the fifth aspect, the first coefficient element calculation unit 184a calculates the first coefficient element e1 using the current output PW2 in the current time period instead of the immediately preceding output PW1 in the immediately preceding time period on a condition that a reset instruction is received. The correction coefficient creation unit 183 further includes a coefficient element storage unit 185 that stores the first coefficient element e1 calculated by the first coefficient element calculation unit 184a, and the second coefficient element e2 calculated by the second coefficient element calculation unit 184b, and a reset unit 186 that resets the second coefficient element e2 stored in the coefficient element storage unit 185, to a value that does not affect a calculation result of the correction coefficient by the correction coefficient calculation unit 187, when the reset instruction is received. The correction coefficient calculation unit 187 calculates the correction coefficient using the second coefficient element e2 and the first coefficient element e1 stored in the coefficient element storage unit 185.

The first coefficient element calculation unit 184a and the reset unit 186 in this aspect receive the reset instruction during a period between when the gas turbine 10 is completely stopped and when a trial operation is started. When the reset instruction is received, during the trial operation, the first coefficient element calculation unit 184a calculates the first coefficient element e1 using the current output PW2 in the current time period instead of using the immediately preceding output PW1 in the immediately preceding time period. In addition, the reset unit 186 resets the second coefficient element e2 stored in the coefficient element storage unit 185, to a value that does not affect a calculation result of the correction coefficient by the correction coefficient calculation unit 187.

If a periodic inspection has been performed before a trial operation and the performance of the gas turbine has been improved by the periodic inspection, even when the first coefficient element e1 and the second coefficient element e2 are calculated using the immediately preceding output PW1 in the immediately preceding time period before the trial operation, the first coefficient element e1 and the second coefficient element e2 do not appropriately represent the degree of degradation of the output. For this reason, when the first coefficient element calculation unit 184a in this aspect receives a reset instruction, the first coefficient element calculation unit 184a calculates the first coefficient element e1 using the current output PW2 in the current time period. Further, when the reset unit 186 in this aspect receives the reset instruction, the reset unit 186 resets the second coefficient element e2 stored in the coefficient element storage unit 185, to a value that does not affect a calculation result of the correction coefficient by the correction coefficient calculation unit 187.

Therefore, in this aspect, even when the trial operation is started from a state where the gas turbine 10 is completely stopped, it is possible to obtain the correction control output that appropriately reflects the degree of degradation of the output.

(7) According to the control output creator for a gas turbine 10 in a seventh aspect, in the control output creator 170 for a gas turbine 10 according to the fifth or sixth aspect, the reference time is a design time for the gas turbine 10, and the reference output PWb is a design output under a condition where the gas turbine 10 outputs a maximum output at the design time.

(8) According to the control output creator for a gas turbine 10 in an eighth aspect, in the control output creator 170 for a gas turbine 10 according to the seventh aspect, the immediately preceding time period includes a time period during a construction trial operation that is a trial operation performed after the gas turbine 10 is constructed, and that excludes a trial operation after the gas turbine 10 is inspected or repaired. The immediately preceding output PW1 includes a construction output PWc that is an output that the output reception unit 181 receives under a condition where the gas turbine 10 outputs a maximum output in the time period during the construction trial operation. The correction coefficient creation unit 183 further includes a third coefficient element calculation unit 184c that calculates a third coefficient element e3. The correction coefficient calculation unit 187 calculates the correction coefficient using the first coefficient element e1, the second coefficient element e2, and the third coefficient element e3. The third coefficient element e3 is a ratio of the construction output PWc stored in the output storage unit 182 to the reference output PWb stored in the output storage unit 182.

A relationship between the correction control output, which is the correction result of the control output, and the command value may change during the construction trial operation depending on a result during the construction trial operation. In this aspect, in the process of calculating the correction coefficient, the reference output PWb used in the computation of the first coefficient element e1 and the reference output PWb used in the computation of the third coefficient element e3 cancel each other out. For this reason, the correction coefficient includes no element of the reference output PWb at the design time, and can indicate the degree of degradation of the output until the current time period, with respect to the construction output PWc that is a measured output during the construction trial operation.

For example, a control device 100 for a gas turbine 10 in the above embodiment is understood as follows.

(9) According to a ninth aspect, there is provided a control device for a gas turbine 10, the device including: the maximum output creator 171 for the gas turbine 10 according to any one of the first to fourth aspects; a command value creation unit 110 that creates a command value for a control target of the gas turbine 10 using the maximum output for control output from the maximum output creator 171; and a control signal output unit 190 that outputs a control signal indicating the command value to the control target.

As described above, the maximum output creator 171 of this aspect receives a change content of the maximum opening degree of the intake air amount regulator 14, and corrects the maximum output for control of the gas turbine 10 based on the change content and the intake air temperature. In this aspect, a command value for a control target is created using the maximum output PWx for control corresponding to the change content of the maximum opening degree of the intake air amount regulator 14, and a control signal indicating the command value is output to the control target. For this reason, in this aspect, even when the setting of the maximum opening degree for control is changed, it is possible to suppress a control failure of the control target.

(10) According to a tenth aspect, there is provided a control device for a gas turbine 10, the device including: the control output creator 170 for the gas turbine 10 according to any one of the fifth to eighth aspects; a command value creation unit 110 that creates a command value for a control target of the gas turbine 10 using the correction control output from the control output creator 170; and a control signal output unit 190 that outputs a control signal indicating the command value to the control target.

As described above, the maximum output creator 171 of the control output creator 170 of this aspect receives a change content of the maximum opening degree of the intake air amount regulator 14, and corrects the maximum output for control of the gas turbine 10 based on the change content and the intake air temperature. In addition, as described above, the output corrector 180 of the control output creator 170 can obtain the correction maximum output PWxm as the correction control output that appropriately reflects the degree of degradation of the output. In this aspect, a command value for a control target is created using the correction control output, and a control signal indicating the command value is output to the control target. For this reason, in this aspect, even when the setting of the maximum opening degree for control is changed, it is possible to suppress a control failure of the control target caused by this change, and a control failure of the control target caused by a degradation in performance of the gas turbine.

For example, a maximum output creation method for a gas turbine 10 in the above embodiment is understood as follows.

(11) According to an eleventh aspect, there is provided a maximum output creation method for a gas turbine 10 which includes a compressor 11 that compresses air to generate compressed air, a combustor 31 that combusts fuel in the compressed air to generate combustion gas, and a turbine 21 to be driven by the combustion gas, and in which the compressor 11 includes an intake air amount regulator 14 that regulates a flow rate of the air suctioned by the compressor.

The maximum output creation method includes: executing a temperature reception step S1 of receiving an intake air temperature which is a temperature of the air suctioned by the compressor 11; executing a change reception step S2 of receiving a change content of a maximum opening degree of the intake air amount regulator 14; executing a basic maximum output computation step S3 of obtaining a basic maximum output PWxb of the gas turbine 10 based on the intake air temperature received in the temperature reception step S1; executing a coefficient creation step S4 or S4a of creating a maximum output correction coefficient Kx for correcting the basic maximum output PWxb based on the change content of the maximum opening degree received in the change reception step S2 and on the intake air temperature received in the temperature reception step S1; and executing a maximum output correction step S8 of correcting the basic maximum output PWxb using the maximum output correction coefficient Kx, and outputting the corrected basic maximum output PWxb as a maximum output PWx for control.

In this aspect, similarly to the maximum output creator 171 according to the first aspect, even when the setting of the maximum opening degree for control is changed, it is possible to suppress a control failure of the gas turbine 10 without causing a decrease in the life span of the gas turbine 10 or a decrease in the output.

(12) According to the maximum output creation method for a gas turbine 10 in a twelfth aspect, in the maximum output creation method according to the eleventh aspect, in the change reception step S2, a changed relationship F6 that is a relationship between a changed maximum opening degree of the intake air amount regulator 14 and the intake air temperature is received. The coefficient creation step S4 includes a basic maximum opening degree computation step S5 of obtaining a basic maximum opening degree corresponding to the intake air temperature received in the temperature reception step S1, using a basic relationship F5 that is a relationship between the basic maximum opening degree of the intake air amount regulator 14 and the intake air temperature determined in advance, a changed maximum opening degree computation step S6 of obtaining the changed maximum opening degree corresponding to the intake air temperature received in the temperature reception step S1, using the changed relationship F6 received in the change reception step S2, and a coefficient computation step S7 or S7a of obtaining the maximum output correction coefficient Kx using the basic maximum opening degree obtained in the basic maximum opening degree computation step S5 and the changed maximum opening degree obtained in the changed maximum opening degree computation step S6.

(13) According to the maximum output creation method for a gas turbine 10 in a thirteenth aspect, in the maximum output creation method for a gas turbine 10 according to the twelfth aspect, the coefficient computation step S7 includes a deviation calculation step S7s of calculating a deviation between the basic maximum opening degree obtained in the basic maximum opening degree computation step S5 and the changed maximum opening degree obtained in the changed maximum opening degree computation step S6, and a coefficient calculation step S7t of calculating the maximum output correction coefficient corresponding to the deviation obtained in the deviation calculation step S7s, using a relationship F7 between the deviation and the maximum output correction coefficient determined in advance.

(14) According to the maximum output creation method for a gas turbine 10 in a fourteenth aspect, in the maximum output creation method for a gas turbine 10 according to the twelfth aspect, the coefficient computation step S7a includes a basic output calculation step S7u of calculating an output of the gas turbine 10 corresponding to the basic maximum opening degree obtained in the basic maximum opening degree computation step S5, a changed output calculation step S7v of calculating an output of the gas turbine 10 corresponding to the changed maximum opening degree obtained in the changed maximum opening degree computation step S6, and a coefficient calculation step S7w of outputting a ratio of the output calculated in the changed output calculation step S7v to the output calculated in the basic output calculation step S7u as the maximum output correction coefficient.

For example, a control output creation method for a gas turbine 10 in the above embodiment is understood as follows.

(15) According to a fifteenth aspect, there is provided a control output creation method for a gas turbine 10, the method including: executing the maximum output creation method for the gas turbine 10 according to any one of the eleventh to fourteenth aspects; and executing an output correction method for correcting a control output of the gas turbine 10. The output correction method includes executing a correction coefficient creation step S20 of creating a correction coefficient to be used when the control output of the gas turbine 10 is corrected, executing an output correction step S25 of correcting the control output using the correction coefficient, and outputting the corrected control output as a correction control output, executing an output reception step S11 of receiving at least an output from an output meter 72 that detects an output of the gas turbine 10, and executing an output storage step S12 of storing the output received in the output reception step S11. The correction coefficient creation step S20 includes a first coefficient element calculation step S21a of calculating a first coefficient element e1, a second coefficient element calculation step S21b of calculating a second coefficient element e2, and a correction coefficient calculation step S24 of calculating the correction coefficient using the first coefficient element e1 and the second coefficient element e2. In the output storage step S12, a reference output PWb that is an output under a condition where the gas turbine 10 outputs a maximum output at a reference time in the past, and an immediately preceding output PW1 received in the output reception step S11 under a condition where the gas turbine 10 outputs a maximum output in an immediately preceding time period closer to a current time than to the reference time are stored. The first coefficient element e1 is a ratio of the immediately preceding output PW1 stored in the output storage step S12 to the reference output PWb stored in the output storage step S12. The second coefficient element e2 is a ratio of a current output PW2 received in the output reception step S11 under a condition where the gas turbine 10 outputs a maximum output in a current time period between the immediately preceding time period and the current time, to the immediately preceding output PW1 stored in the output storage step S12.

In this aspect, similarly to the control output creator 170 according to the fifth aspect, it is possible to obtain the correction control output that appropriately reflects the degree of degradation of the output.

(16) According to the control output creation method for a gas turbine 10 in a sixteenth aspect, in the control output creation method according to the fifteenth aspect, in the first coefficient element calculation step S21a, the first coefficient element e1 is calculated using the current output PW2 in the current time period instead of the immediately preceding output PW1 in the immediately preceding time period on a condition that a reset instruction is received. The correction coefficient creation step S20 further includes a coefficient element storage step S22 of storing the first coefficient element e1 calculated in the first coefficient element calculation step S21a, and the second coefficient element e2 calculated in the second coefficient element calculation step S21b, and a reset step S23 of resetting the second coefficient element e2 stored in the coefficient element storage step S22, to a value that does not affect a calculation result of the correction coefficient in the correction coefficient calculation step S24, when the reset instruction is received. In the correction coefficient calculation step S24, the correction coefficient is calculated using the second coefficient element e2 and the first coefficient element e1 stored in the coefficient element storage step S22.

In this aspect, similarly to the control output creator 170 according to the sixth aspect, even when a trial operation is started from a state where the gas turbine 10 is completely stopped, it is possible to obtain the correction control output that appropriately reflects the degree of degradation of the output.

(17) According to the control output creation method for a gas turbine 10 in a seventeenth aspect, in the control output creation method for a gas turbine 10 according to the fifteenth or sixteenth aspect, the reference time is a design time for the gas turbine 10, and the reference output PWb is a design output under a condition where the gas turbine 10 outputs a maximum output at the design time.

(18) According to the control output creation method for a gas turbine 10 in an eighteenth aspect, in the control output creation method for a gas turbine 10 according to the seventeenth aspect, the immediately preceding time period includes a time period during a construction trial operation that is a trial operation performed after the gas turbine 10 is constructed, and that excludes a trial operation after the gas turbine 10 is inspected or repaired. The immediately preceding output PW1 includes a construction output PWc that is an output received in the output reception step S11 under a condition where the gas turbine 10 outputs a maximum output in the time period during the construction trial operation. The correction coefficient creation step S20 further includes a third coefficient element calculation step S21c of calculating a third coefficient element e3. In the correction coefficient calculation step S24, the correction coefficient is calculated using the first coefficient element e1, the second coefficient element e2, and the third coefficient element e3. The third coefficient element e3 is a ratio of the construction output PWc stored in the output storage step S12 to the reference output PWb stored in the output storage step S12.

In this aspect, similarly to the control output creator 170 according to the eighth aspect, it is possible to indicate the degree of degradation of the output until the current time period, with respect to the construction output PWc that is a measured output during the construction trial operation.

For example, a control method for a gas turbine 10 in the above embodiment is understood as follows.

(19) According to a nineteenth aspect, there is provided a control method for a gas turbine 10, the method including: executing the maximum output creation method for the gas turbine 10 according to any one of the eleventh to fourteenth aspects; executing a command value creation step S33 of creating a command value for a control target of the gas turbine 10 using the maximum output for control obtained by the maximum output creation method; and executing a control signal output step S34 of outputting a control signal indicating the command value to the control target.

In this aspect, similarly to the control device 100 according to the ninth aspect, even when the setting of the maximum opening degree for control is changed, it is possible to suppress a control failure of the control target.

(20) According to a twentieth aspect, there is provided a control method for a gas turbine 10, the method including: executing the control output creation method for the gas turbine 10 according to any one of the fifteenth to eighteenth aspects; executing a command value creation step S33 of creating a command value for a control target of the gas turbine 10 using the correction control output obtained by the control output creation method; and executing a control signal output step S34 of outputting a control signal indicating the command value to the control target.

In this aspect, similarly to the control device 100 according to the tenth aspect, even when the setting of the maximum opening degree for control is changed, it is possible to suppress a control failure of the control target caused by this change, and a control failure of the control target caused by a degradation in performance of the gas turbine.

For example, a maximum output creation program 103paa for a gas turbine 10 in the above embodiment is understood as follows.

(21) According to a 21st aspect, there is provided a maximum output creation program for a gas turbine 10 which includes a compressor 11 that compresses air to generate compressed air, a combustor 31 that combusts fuel in the compressed air to generate combustion gas, and a turbine 21 to be driven by the combustion gas, and in which the compressor 11 includes an intake air amount regulator 14 that regulates a flow rate of the air suctioned by the compressor.

The maximum output creation program 103paa causes a computer to execute: a temperature reception step S1 of receiving an intake air temperature which is a temperature of the air suctioned by the compressor 11; a change reception step S2 of receiving a change content of a maximum opening degree of the intake air amount regulator 14; a basic maximum output computation step S3 of obtaining a basic maximum output PWxb of the gas turbine 10 based on the intake air temperature received in the temperature reception step S1; a coefficient creation step S4 or S4a of creating a maximum output correction coefficient Kx for correcting the basic maximum output PWxb based on the change content of the maximum opening degree received in the change reception step S2 and on the intake air temperature received in the temperature reception step S1; and a maximum output correction step S8 of correcting the basic maximum output PWxb using the maximum output correction coefficient Kx, and outputting the corrected basic maximum output PWxb as a maximum output PWx for control.

In this aspect, similarly to the maximum output creator 171 according to the first aspect, even when the setting of the maximum opening degree for control is changed, it is possible to suppress a control failure of the gas turbine 10 without causing a decrease in the life span of the gas turbine 10 or a decrease in the output.

(22) According to the maximum output creation program for a gas turbine 10 in a 22nd aspect, in the maximum output creation program 103paa for a gas turbine 10 according to the 21st aspect, in the change reception step S2, a changed relationship F6 that is a relationship between a changed maximum opening degree of the intake air amount regulator 14 and the intake air temperature is received. The coefficient creation step S4 includes a basic maximum opening degree computation step S5 of obtaining a basic maximum opening degree corresponding to the intake air temperature received in the temperature reception step S1, using a basic relationship F5 that is a relationship between the basic maximum opening degree of the intake air amount regulator 14 and the intake air temperature determined in advance, a changed maximum opening degree computation step S6 of obtaining the changed maximum opening degree corresponding to the intake air temperature received in the temperature reception step S1, using the changed relationship F6 received in the change reception step S2, and a coefficient computation step S7 or S7a of obtaining the maximum output correction coefficient Kx using the basic maximum opening degree obtained in the basic maximum opening degree computation step S5 and the changed maximum opening degree obtained in the changed maximum opening degree computation step S6.

(23) According to the maximum output creation program for a gas turbine 10 in a 23rd aspect, in the maximum output creation program 103*paa* for a gas turbine 10 according to the 22nd aspect, the coefficient computation step S7 includes a deviation calculation step S7*s* of calculating a deviation between the basic maximum opening degree obtained in the basic maximum opening degree computation step S5 and the changed maximum opening degree obtained in the changed maximum opening degree computation step S6, and a coefficient calculation step S7*t* of calculating the maximum output correction coefficient corresponding to the deviation obtained in the deviation calculation step S7*s*, using a relationship between the deviation and the maximum output correction coefficient determined in advance.

(24) According to the maximum output creation program for a gas turbine 10 in a 24th aspect, in the maximum output creation program 103*paa* for a gas turbine 10 according to the 22nd aspect, the coefficient computation step S7*a* includes a basic output calculation step S7*u* of calculating an output of the gas turbine 10 corresponding to the basic maximum opening degree obtained in the basic maximum opening degree computation step S5, a changed output calculation step S7*v* of calculating an output of the gas turbine 10 corresponding to the changed maximum opening degree obtained in the changed maximum opening degree computation step S6, and a coefficient calculation step S7*w* of outputting a ratio of the output calculated in the changed output calculation step S7*v* to the output calculated in the basic output calculation step S7*u* as the maximum output correction coefficient.

For example, a control output creation program 103*pa* for a gas turbine 10 in the above embodiment is understood as follows.

(25) According to a 25th aspect, there is provided a control output creation program for a gas turbine 10, the program including: the maximum output creation program 103*paa* for the gas turbine 10 according to any one of the 21st to 24th aspects; and an output correction program 103*pab* for correcting a control output of the gas turbine 10. The output correction program 103*pab* causes the computer to execute a correction coefficient creation step S20 of creating a correction coefficient to be used when the control output of the gas turbine 10 is corrected, an output correction step S25 of correcting the control output using the correction coefficient, and outputting the corrected control output as a correction control output, an output reception step S11 of receiving at least an output from an output meter 72 that detects an output of the gas turbine 10, and an output storage step S12 of storing the output received in the output reception step S11. The correction coefficient creation step S20 includes a first coefficient element calculation step S21*a* of calculating a first coefficient element e1, a second coefficient element calculation step S21*b* of calculating a second coefficient element e2, and a correction coefficient calculation step S24 of calculating the correction coefficient using the first coefficient element e1 and the second coefficient element e2. In the output storage step S12, a reference output PWb that is an output under a condition where the gas turbine 10 outputs a maximum output at a reference time in the past, and an immediately preceding output PW1 received in the output reception step S11 under a condition where the gas turbine 10 outputs a maximum output in an immediately preceding time period closer to a current time than to the reference time are stored. The first coefficient element e1 is a ratio of the immediately preceding output PW1 stored in the output storage step S12 to the reference output PWb stored in the output storage step S12. The second coefficient element e2 is a ratio of a current output PW2 received in the output reception step S11 under a condition where the gas turbine 10 outputs a maximum output in a current time period between the immediately preceding time period and the current time, to the immediately preceding output PW1 stored in the output storage step S12.

In this aspect, similarly to the control output creator 170 according to the fifth aspect, it is possible to obtain the correction control output that appropriately reflects the degree of degradation of the output.

For example, a control program 103*p* for a gas turbine 10 in the above embodiment is understood as follows.

(26) According to a 26th aspect, there is provided a control program for a gas turbine 10, which includes the maximum output creation program 103*paa* for the gas turbine according to any one of the 21st to 24th aspects, the program causing the computer to execute: a command value creation step S33 of creating a command value for a control target of the gas turbine 10 using the maximum output for control obtained by executing the maximum output creation program 103*paa*; and a control signal output step S34 of outputting a control signal indicating the command value to the control target.

In this aspect, similarly to the control device 100 according to the ninth aspect, even when the setting of the maximum opening degree for control is changed, it is possible to suppress a control failure of the control target.

(27) According to a 27th aspect, there is provided a control program for a gas turbine 10, which includes the control output creation program 103*pa* for the gas turbine according to the 25th aspect, the program causing the computer to execute: a command value creation step S33 of creating a command value for a control target of the gas turbine 10 using the correction control output obtained by executing the control output creation program 103*pa*; and a control signal output step S34 of outputting a control signal indicating the command value to the control target.

In this aspect, similarly to the control device 100 according to the tenth aspect, even when the setting of the maximum opening degree for control is changed, it is possible to suppress a control failure of the control target caused by this change, and a control failure of the control target caused by a degradation in performance of the gas turbine.

INDUSTRIAL APPLICABILITY

In one aspect of the present disclosure, a change content of the maximum opening degree of the intake air amount regulator can be received. Further, in this aspect, even when the setting of the maximum opening degree is changed, it is possible to suppress a control failure of the gas turbine.

REFERENCE SIGNS LIST

1: gas turbine equipment
2: flue gas duct
2*m*: main flue gas duct

2a: first flue gas duct
2b: second flue gas duct
3: switching damper
4: heat recovery steam generator
5: steam turbine
6: steam turbine generator
7: condenser
8: pump
9a: first chimney
9b: second chimney
10: gas turbine
11: compressor
12: compressor casing
13: compressor rotor
14: IGV (intake air amount regulator)
15: guide vane
16: driver
21: turbine
22: turbine casing
23: turbine rotor
28: gas turbine rotor
24: intermediate casing
25: exhaust casing
29: generator (gas turbine generator)
31: combustor
32: outer cylinder
33: combustion cylinder (or transition piece)
41: fuel nozzle
42: inner cylinder
43: pilot burner
44: pilot nozzle
45: pilot air cylinder
48: pilot air flow path
49: diffusion flame
51: top hat nozzle
52: compressed air flow path
53: main burner
54: main nozzle
55: main air inner cylinder
56: main air outer cylinder
57: partition plate
58: main air flow path
59: premixed flame
60: fuel line
61: pilot fuel line
62: main fuel line
63: top hat fuel line
65: pilot fuel valve
66: main fuel valve
67: top hat fuel valve
71: rotation speed meter
72: output meter
73: intake air temperature sensor
74: intake air pressure gauge
75: blade path temperature sensor
76: exhaust gas temperature sensor
100: control device
101: CPU
102: main storage device
103: auxiliary storage device
103p: control program
103pa: control output creation program
103paa: maximum output creation program
103pab: output correction program
104: input device
105: display device
106: input/output interface
107: device interface
108: communication interface
109: storage and reproduction device
110: command value creation unit
120: combustion load command generator
121a: 700° C. MW computation unit
121b: 1500° C. MW computation unit
122: standard atmospheric pressure generator
123: first divider
124a: first multiplier
124b: second multiplier
125a: first subtractor
125b: second subtractor
126: second divider
127: limiter
130: fuel flow rate command generator
131: governor controller
132: load controller
132a: low value selector
132b: proportional integration computation unit
133: blade path temperature controller
134: exhaust gas temperature controller
135: low value selector
136: limiter
140: load factor computation unit
141: maximum output generator
142: switcher
143: divider
150: flow rate ratio calculator
150p: pilot ratio calculator
151p: PLor computation unit
152p: correction value computation unit
153p: corrector
150t: top hat ratio calculator
151t: THor computation unit
152t: correction value calculator
153t: corrector
155: valve command value creator
156p: first multiplier
156t: second multiplier
156ma: first subtractor
156mb: second subtractor
157p: PL valve command value computation unit
157m: M valve command value computation unit
157t: TH valve command value computation unit
160: IGV command value creator
170: control output creator
171, 171a, 171b: maximum output creator
172: temperature reception unit
173: change reception unit
174: basic maximum output computation unit
175: maximum output correction unit
176: coefficient creation unit
176b: basic maximum opening degree computation unit
176c: changed maximum opening degree computation unit
177, 177a: coefficient computation unit
177s: deviation calculation unit
177t, 177w: coefficient calculation unit
177u: basic output calculation unit
177v: changed output calculation unit
178: mode-corresponding coefficient generation unit
179: mode-corresponding correction unit
180: output corrector
181: output reception unit
182: output storage unit
183: correction coefficient creation unit 184a: first coefficient element calculation unit
184b: second coefficient element calculation unit
184c: third coefficient element calculation unit
185: coefficient element storage unit
185a: first coefficient element storage unit
185b: second coefficient element storage unit
185c: third coefficient element storage unit
186: reset unit
187: correction coefficient calculation unit
187a: first correction coefficient calculation unit
187b: second correction coefficient calculation unit
187s: divider
187t: multiplier
187u: correction coefficient adjustor
188: output correction unit
188a: first output correction unit
188b: second output correction unit
188c: third output correction unit
188s: divider
188t: multiplier
188u: adder
188v: low value selector
188x: first storage unit
188y: second storage unit
190: control signal output unit
IGVc: IGV command value
e1: first coefficient element
e2: second coefficient element
e3: third coefficient element
K1: first correction coefficient
K2: second correction coefficient
PW: output (or actual measured output)
PWr: demand output
PWb: reference output
PWc: construction output
PW1: immediately preceding output
PW2: current output
PWx: maximum output
PWxb: basic maximum output
PWxm: correction maximum output

The invention claimed is:

1. A maximum output creator for a gas turbine which includes a compressor that compresses air to generate compressed air, a combustor that combusts fuel in the compressed air to generate combustion gas, and a turbine to be driven by the combustion gas, and in which the compressor includes an intake air amount regulator that regulates a flow rate of the air suctioned by the compressor, the creator comprising:
a temperature reception unit that receives an intake air temperature which is a temperature of the air suctioned by the compressor;
a change reception unit that receives a change content of a maximum opening degree of the intake air amount regulator;
a basic maximum output computation unit that obtains a basic maximum output of the gas turbine based on the intake air temperature received by the temperature reception unit;
a coefficient creation unit that creates a maximum output correction coefficient for correcting the basic maximum output based on the change content of the maximum opening degree received by the change reception unit and on the intake air temperature received by the temperature reception unit; and
a maximum output correction unit that corrects the basic maximum output using the maximum output correction coefficient, and that outputs the corrected basic maximum output as a maximum output for control.

2. The maximum output creator for a gas turbine according to claim 1,
wherein the change reception unit receives a changed relationship that is a relationship between a changed maximum opening degree of the intake air amount regulator and the intake air temperature, and
the coefficient creation unit includes a basic maximum opening degree computation unit that obtains a basic maximum opening degree corresponding to the intake air temperature received by the temperature reception unit, using a basic relationship that is a relationship between the basic maximum opening degree of the intake air amount regulator and the intake air temperature determined in advance, a changed maximum opening degree computation unit that obtains the changed maximum opening degree corresponding to the intake air temperature received by the temperature reception unit, using the changed relationship received by the change reception unit, and a coefficient computation unit that obtains the maximum output correction coefficient using the basic maximum opening degree obtained by the basic maximum opening degree computation unit and the changed maximum opening degree obtained by the changed maximum opening degree computation unit.

3. The maximum output creator for a gas turbine according to claim 2,
wherein the coefficient computation unit includes a deviation calculation unit that calculates a deviation between the basic maximum opening degree obtained by the basic maximum opening degree computation unit and the changed maximum opening degree obtained by the changed maximum opening degree computation unit, and a coefficient calculation unit that calculates the maximum output correction coefficient corresponding to the deviation calculated by the deviation calculation unit, using a relationship between the deviation and the maximum output correction coefficient determined in advance.

4. The maximum output creator for a gas turbine according to claim 2,
wherein the coefficient computation unit includes a basic output calculation unit that calculates an output of the gas turbine corresponding to the basic maximum opening degree obtained by the basic maximum opening degree computation unit, a changed output calculation unit that calculates an output of the gas turbine corresponding to the changed maximum opening degree obtained by the changed maximum opening degree computation unit, and a coefficient calculation unit that outputs a ratio of the output calculated by the changed output calculation unit to the output calculated by the basic output calculation unit as the maximum output correction coefficient.

5. A control output creator for a gas turbine, the creator comprising:
the maximum output creator for the gas turbine according to claim 1; and
an output corrector that corrects a control output of the gas turbine,
wherein the output corrector includes a correction coefficient creation unit that creates a correction coefficient to be used when the control output is corrected, an output correction unit that corrects the control output using the correction coefficient, and that outputs the corrected control output as a correction control output,
an output reception unit that receives at least an output
from an output meter that detects an output of the gas
turbine, and an output storage unit that stores the output
received by the output reception unit, the correction coefficient creation unit includes a first
coefficient element calculation unit that calculates a
first coefficient element, a second coefficient element
calculation unit that calculates a second coefficient
element, and a correction coefficient calculation unit
that calculates the correction coefficient using the first
coefficient element and the second coefficient element, the output storage unit stores a reference output that is an
output under a condition where the gas turbine outputs
a maximum output at a reference time in the past, and
an immediately preceding output that the output reception unit receives under a condition where the gas
turbine outputs a maximum output in an immediately
preceding time period closer to a current time than to
the reference time, the first coefficient element is a ratio of the immediately
preceding output stored in the output storage unit to the
reference output stored in the output storage unit, the second coefficient element is a ratio of a current output
that the output reception unit receives under a condition
where the gas turbine outputs a maximum output in a
current time period between the immediately preceding
time period and the current time, to the immediately
preceding output stored in the output storage unit, and the output corrector corrects the maximum output for
control output from the maximum output creator, as
one control output.

6. The control output creator for a gas turbine according
to claim 5, wherein the first coefficient element calculation unit calculates the first coefficient element using the current
output in the current time period instead of the immediately preceding output in the immediately preceding
time period on a condition that a reset instruction is
received, the correction coefficient creation unit further includes a
coefficient element storage unit that stores the first
coefficient element calculated by the first coefficient
element calculation unit, and the second coefficient
element calculated by the second coefficient element
calculation unit, and a reset unit that resets the second
coefficient element stored in the coefficient element
storage unit, to a value that does not affect a calculation
result of the correction coefficient by the correction
coefficient calculation unit, when the reset instruction is
received, and the correction coefficient calculation unit calculates the
correction coefficient using the second coefficient element and the first coefficient element stored in the
coefficient element storage unit.

7. The control output creator for a gas turbine according
to claim 5, wherein the reference time is a design time for the gas
turbine, and the reference output is a design output
under a condition where the gas turbine outputs a
maximum output at the design time.

8. The control output creator for a gas turbine according
to claim 7, wherein the immediately preceding time period includes
a time period during a construction trial operation that
is a trial operation performed after the gas turbine is constructed, and that excludes a trial operation after the
gas turbine is inspected or repaired, the immediately preceding output includes a construction
output that is an output that the output reception unit
receives under a condition where the gas turbine outputs a maximum output in the time period during the
construction trial operation, the correction coefficient creation unit further includes a
third coefficient element calculation unit that calculates
a third coefficient element, the correction coefficient calculation unit calculates the
correction coefficient using the first coefficient element,
the second coefficient element, and the third coefficient
element, and the third coefficient element is a ratio of the construction
output stored in the output storage unit to the reference
output stored in the output storage unit.

9. A control device for a gas turbine, the device comprising:

the control output creator for the gas turbine according to
claim 5;

a command value creation unit that creates a command
value for a control target of the gas turbine using the
correction output from the control output creator; and a control signal output unit that outputs a control signal
indicating the command value to the control target.

10. A control device for a gas turbine, the device comprising:

the maximum output creator for the gas turbine according
to claim 1;

a command value creation unit that creates a command
value for a control target of the gas turbine using the
maximum output for control output from the maximum
output creator; and a control signal output unit that outputs a control signal
indicating the command value to the control target.

11. A maximum output creation method for a gas turbine
which includes a compressor that compresses air to generate
compressed air, a combustor that combusts fuel in the
compressed air to generate combustion gas, and a turbine to
be driven by the combustion gas, and in which the compressor includes an intake air amount regulator that regulates
a flow rate of the air suctioned by the compressor, the
method comprising:

executing a temperature reception step of receiving an
intake air temperature which is a temperature of the air
suctioned by the compressor;

executing a change reception step of receiving a change
content of a maximum opening degree of the intake air
amount regulator;

executing a basic maximum output computation step of
obtaining a basic maximum output of the gas turbine
based on the intake air temperature received in the
temperature reception step;

executing a coefficient creation step of creating a maximum output correction coefficient for correcting the
basic maximum output based on the change content of
the maximum opening degree received in the change
reception step and on the intake air temperature
received in the temperature reception step; and executing a maximum output correction step of correcting
the basic maximum output using the maximum output
correction coefficient, and outputting the corrected
basic maximum output as a maximum output for control.

12. The maximum output creation method for a gas
turbine according to claim 11, wherein in the change reception step, a changed relationship that is a relationship between a changed maximum opening degree of the intake air amount regulator and the intake air temperature is received, and the coefficient creation step includes a basic maximum opening degree computation step of obtaining a basic maximum opening degree corresponding to the intake air temperature received in the temperature reception step, using a basic relationship that is a relationship between the basic maximum opening degree of the intake air amount regulator and the intake air temperature determined in advance, a changed maximum opening degree computation step of obtaining the changed maximum opening degree corresponding to the intake air temperature received in the temperature reception step, using the changed relationship received in the change reception step, and a coefficient computation step of obtaining the maximum output correction coefficient using the basic maximum opening degree obtained in the basic maximum opening degree computation step and the changed maximum opening degree obtained in the changed maximum opening degree computation step.

13. The maximum output creation method for a gas turbine according to claim 12, wherein the coefficient computation step includes a deviation calculation step of calculating a deviation between the basic maximum opening degree obtained in the basic maximum opening degree computation step and the changed maximum opening degree obtained in the changed maximum opening degree computation step, and a coefficient calculation step of calculating the maximum output correction coefficient corresponding to the deviation obtained in the deviation calculation step, using a relationship between the deviation and the maximum output correction coefficient determined in advance.

14. The maximum output creation method for a gas turbine according to claim 12, wherein the coefficient computation step includes a basic output calculation step of calculating an output of the gas turbine corresponding to the basic maximum opening degree obtained in the basic maximum opening degree computation step, a changed output calculation step of calculating an output of the gas turbine corresponding to the changed maximum opening degree obtained in the changed maximum opening degree computation step, and a coefficient calculation step of outputting a ratio of the output calculated in the changed output calculation step to the output calculated in the basic output calculation step as the maximum output correction coefficient.

15. A control output creation method for a gas turbine, the method comprising:

executing the maximum output creation method for the gas turbine according to claim 11; and executing an output correction method for correcting a control output of the gas turbine, wherein the output correction method includes executing a correction coefficient creation step of creating a correction coefficient to be used when the control output of the gas turbine is corrected, executing an output correction step of correcting the control output using the correction coefficient, and outputting the corrected control output as a correction control output, executing an output reception step of receiving at least an output from an output meter that detects an output of the gas turbine, and executing an output storage step of storing the output received in the output reception step, the correction coefficient creation step includes a first coefficient element calculation step of calculating a first coefficient element, a second coefficient element calculation step of calculating a second coefficient element, and a correction coefficient calculation step of calculating the correction coefficient using the first coefficient element and the second coefficient element, in the output storage step, a reference output that is an output under a condition where the gas turbine outputs a maximum output at a reference time in the past, and an immediately preceding output received in the output reception step under a condition where the gas turbine outputs a maximum output in an immediately preceding time period closer to a current time than to the reference time are stored, the first coefficient element is a ratio of the immediately preceding output stored in the output storage step to the reference output stored in the output storage step, and the second coefficient element is a ratio of a current output received in the output reception step under a condition where the gas turbine outputs a maximum output in a current time period between the immediately preceding time period and the current time, to the immediately preceding output stored in the output storage step.

16. The control output creation method for a gas turbine according to claim 15, wherein in the first coefficient element calculation step, the first coefficient element is calculated using the current output in the current time period instead of the immediately preceding output in the immediately preceding time period on a condition that a reset instruction is received, the correction coefficient creation step further includes a coefficient element storage step of storing the first coefficient element calculated in the first coefficient element calculation step, and the second coefficient element calculated in the second coefficient element calculation step, and a reset step of resetting the second coefficient element stored in the coefficient element storage step, to a value that does not affect a calculation result of the correction coefficient in the correction coefficient calculation step, when the reset instruction is received, and in the correction coefficient calculation step, the correction coefficient is calculated using the second coefficient element and the first coefficient element stored in the coefficient element storage step.

17. The control output creation method for a gas turbine according to claim 15, wherein the reference time is a design time for the gas turbine, and the reference output is a design output under a condition where the gas turbine outputs a maximum output at the design time.

18. The control output creation method for a gas turbine according to claim 17, wherein the immediately preceding time period includes a time period during a construction trial operation that is a trial operation performed after the gas turbine is constructed, and that excludes a trial operation after the gas turbine is inspected or repaired, the immediately preceding output includes a construction output that is an output received in the output reception step under a condition where the gas turbine outputs a maximum output in the time period during the construction trial operation, the correction coefficient creation step further includes a third coefficient element calculation step of calculating a third coefficient element, in the correction coefficient calculation step, the correction coefficient is calculated using the first coefficient element, the second coefficient element, and the third coefficient element, and the third coefficient element is a ratio of the construction output stored in the output storage step to the reference output stored in the output storage step.

19. A control method for a gas turbine, the method comprising:

executing the control output creation method for the gas turbine according to claim 15;

executing a command value creation step of creating a command value for a control target of the gas turbine using the correction control output obtained by the control output creation method; and executing a control signal output step of outputting a control signal indicating the command value to the control target.

20. A control method for a gas turbine, the method comprising:

executing the maximum output creation method for the gas turbine according to claim 11;

executing a command value creation step of creating a command value for a control target of the gas turbine using the maximum output for control obtained by the maximum output creation method; and executing a control signal output step of outputting a control signal indicating the command value to the control target.

21. A maximum output creation program for a gas turbine which includes a compressor that compresses air to generate compressed air, a combustor that combusts fuel in the compressed air to generate combustion gas, and a turbine to be driven by the combustion gas, and in which the compressor includes an intake air amount regulator that regulates a flow rate of the air suctioned by the compressor, the program causing a computer to execute:

a temperature reception step of receiving an intake air temperature which is a temperature of the air suctioned by the compressor;

a change reception step of receiving a change content of a maximum opening degree of the intake air amount regulator;

a basic maximum output computation step of obtaining a basic maximum output of the gas turbine based on the intake air temperature received in the temperature reception step;

a coefficient creation step of creating a maximum output correction coefficient for correcting the basic maximum output based on the change content of the maximum opening degree received in the change reception step and on the intake air temperature received in the temperature reception step; and a maximum output correction step of correcting the basic maximum output using the maximum output correction coefficient, and outputting the corrected basic maximum output as a maximum output for control.

22. The maximum output creation program for a gas turbine according to claim 21, wherein in the change reception step, a changed relationship that is a relationship between a changed maximum opening degree of the intake air amount regulator and the intake air temperature is received, and the coefficient creation step includes a basic maximum opening degree computation step of obtaining a basic maximum opening degree corresponding to the intake air temperature received in the temperature reception step, using a basic relationship that is a relationship between the basic maximum opening degree of the intake air amount regulator and the intake air temperature determined in advance, a changed maximum opening degree computation step of obtaining the changed maximum opening degree corresponding to the intake air temperature received in the temperature reception step, using the changed relationship received in the change reception step, and a coefficient computation step of obtaining the maximum output correction coefficient using the basic maximum opening degree obtained in the basic maximum opening degree computation step and the changed maximum opening degree obtained in the changed maximum opening degree computation step.

23. The maximum output creation program for a gas turbine according to claim 22, wherein the coefficient computation step includes a deviation calculation step of calculating a deviation between the basic maximum opening degree obtained in the basic maximum opening degree computation step and the changed maximum opening degree obtained in the changed maximum opening degree computation step, and a coefficient calculation step of calculating the maximum output correction coefficient corresponding to the deviation obtained in the deviation calculation step, using a relationship between the deviation and the maximum output correction coefficient determined in advance.

24. The maximum output creation program for a gas turbine according to claim 22, wherein the coefficient computation step includes a basic output calculation step of calculating an output of the gas turbine corresponding to the basic maximum opening degree obtained in the basic maximum opening degree computation step, a changed output calculation step of calculating an output of the gas turbine corresponding to the changed maximum opening degree obtained in the changed maximum opening degree computation step, and a coefficient calculation step of outputting a ratio of the output calculated in the changed output calculation step to the output calculated in the basic output calculation step as the maximum output correction coefficient.

25. A control output creation program for a gas turbine, the program comprising:

the maximum output creation program for the gas turbine according to claim 21; and an output correction program for correcting a control output of the gas turbine, wherein the output correction program causes the computer to execute a correction coefficient creation step of creating a correction coefficient to be used when the control output of the gas turbine is corrected, an output correction step of correcting the control output using the correction coefficient, and outputting the corrected control output as a correction control output, an output reception step of receiving at least an output from an output meter that detects an output of the gas turbine, and an output storage step of storing the output received in the output reception step, the correction coefficient creation step includes a first coefficient element calculation step of calculating a first coefficient element, a second coefficient element calculation step of calculating a second coefficient element, and a correction coefficient calculation step of calculating the correction coefficient using the first coefficient element and the second coefficient element, in the output storage step, a reference output that is an output under a condition where the gas turbine outputs a maximum output at a reference time in the past, and an immediately preceding output received in the output reception step under a condition where the gas turbine outputs a maximum output in an immediately preceding time period closer to a current time than to the reference time are stored, the first coefficient element is a ratio of the immediately preceding output stored in the output storage step to the reference output stored in the output storage step, and the second coefficient element is a ratio of a current output received in the output reception step under a condition where the gas turbine outputs a maximum output in a current time period between the immediately preceding time period and the current time, to the immediately preceding output stored in the output storage step.

26. A control program for a gas turbine, which comprises the control output creation program for the gas turbine according to claim 25, the program causing the computer to execute:
- a command value creation step of creating a command value for a control target of the gas turbine using the correction control output obtained by executing the control output creation program; and
- a control signal output step of outputting a control signal indicating the command value to the control target.

27. A control program for a gas turbine, which comprises the maximum output creation program for the gas turbine according to claim 21, the program causing the computer to execute:
- a command value creation step of creating a command value for a control target of the gas turbine using the maximum output for control obtained by executing the maximum output creation program; and
- a control signal output step of outputting a control signal indicating the command value to the control target.

* * * * *